(12) United States Patent
Kusaka

(10) Patent No.: US 8,004,593 B2
(45) Date of Patent: Aug. 23, 2011

(54) DIGITAL IMAGE APPARATUS AND DIGITAL IMAGE SYSTEM INCLUDING TRANSMISSION HISTORY INFORMATION

(75) Inventor: Yosuke Kusaka, Yokohama (JP)

(73) Assignee: Nikon Corporation, Tokyo (JP)

( * ) Notice: Subject to any disclaimer, the term of this patent is extended or adjusted under 35 U.S.C. 154(b) by 426 days.

(21) Appl. No.: 11/979,521

(22) Filed: Nov. 5, 2007

(65) Prior Publication Data

US 2008/0068486 A1    Mar. 20, 2008

Related U.S. Application Data

(63) Continuation of application No. 10/479,587, filed as application No. PCT/JP02/04948 on May 22, 2002, now abandoned.

(30) Foreign Application Priority Data

Jun. 6, 2001  (JP) ................................. 2001-170876
Jun. 6, 2001  (JP) ................................. 2001-171007

(51) Int. Cl.
    *H04N 5/222*      (2006.01)
    *H04N 5/232*      (2006.01)
    *H04N 5/76*       (2006.01)
(52) U.S. Cl. ........... 348/333.02; 348/333.05; 348/211.1; 348/231.1; 348/231.3
(58) Field of Classification Search ............... 348/211.2, 348/231.1, 231.2, 231.3
    See application file for complete search history.

(56) References Cited

U.S. PATENT DOCUMENTS

| | | | |
|---|---|---|---|
| 5,802,510 A | * | 9/1998 | Jones .................................... 1/1 |
| 6,178,442 B1 | | 1/2001 | Yamazaki |
| 6,346,937 B1 | * | 2/2002 | Sasaki et al. .................. 345/211 |
| 6,412,689 B1 | | 7/2002 | Horiguchi et al. |
| 6,476,933 B1 | * | 11/2002 | Honma .......................... 358/1.9 |
| 6,522,354 B1 | * | 2/2003 | Kawamura et al. ......... 348/231.2 |
| 6,792,082 B1 | * | 9/2004 | Levine .......................... 379/67.1 |

(Continued)

FOREIGN PATENT DOCUMENTS

JP       10-293732       11/1998

(Continued)

OTHER PUBLICATIONS

Feb. 15, 2011 Office Action issued in Japanese Patent Application No. 2001-170876 (with translation).

*Primary Examiner* — Lin Ye
*Assistant Examiner* — Chia-Wei A Chen
(74) *Attorney, Agent, or Firm* — Oliff & Berridge, PLC

(57) ABSTRACT

A digital image apparatus includes: a storage unit in which digital image information is stored; a display unit that displays the digital image information stored in the storage unit; a setting unit that sets a recipient of the digital image information; and a communication unit that transmits the digital image information stored in the storage unit to a recipient set through the setting unit, and further includes: an updating unit that updates transmission history information including recipient information indicating a recipient of the digital image information each time the digital image information is transmitted by the communication unit and stores the updated transmission history information into the storage unit in correspondence to the digital image information, and when the digital image information stored in the storage unit is displayed, the display unit also displays transmission history information pertaining to the digital image information in correspondence to the digital image information.

4 Claims, 55 Drawing Sheets

U.S. PATENT DOCUMENTS

| | | |
|---|---|---|
| 6,947,182 B1 * | 9/2005 | Kumagai ................... 358/402 |
| 6,956,832 B1 * | 10/2005 | Muhonen et al. ............ 370/310 |
| 7,010,144 B1 * | 3/2006 | Davis et al. ................. 382/100 |
| 7,605,849 B1 | 10/2009 | Hatanaka |
| 2003/0076427 A1 | 4/2003 | Kawamura et al. |

FOREIGN PATENT DOCUMENTS

| JP | 10-327396 | 12/1998 |
|---|---|---|
| JP | A 10-341364 | 12/1998 |
| JP | A 11-164282 | 6/1999 |
| JP | A 11-243526 | 9/1999 |
| JP | A 2000-112799 | 4/2000 |
| JP | 2000-206602 | 7/2000 |
| JP | A 2000-209536 | 7/2000 |
| JP | 2000-251393 | 9/2000 |
| JP | 2000-253364 | 9/2000 |
| JP | 2000-307788 | 11/2000 |
| JP | A 2001-069296 | 3/2001 |

\* cited by examiner

FIG.7

IMAGE 0001 (IMAGE FILE)

| CONTENTS |
|---|
| IMAGE DATA |
| ADDITIONAL INFORMATION DATA |

FIG.8

ADDITIONAL INFORMATION DATA

| CONTENTS |
|---|
| TRANSMISSION INFORMATION DATA |
| RECEPTION INFORMATION DATA |
| PHOTOGRAPHING INFORMATION DATA |
| IMAGE FILE NAME DATA |
| AUDIO INFORMATION DATA |
| POSITION INFORMATION DATA |
| ATTITUDE DATA |
| PHOTOGRAPHING TIME POINT DATA |
| MESSAGE INFORMATION DATA |
| KEYWORD INFORMATION DATA |
| PERSONAL IDENTIFICATION DATA |
| ATTACHED IMAGE DATA |

FIG.9

TRANSMISSION IMAGE DATA

| ITEM | CONTENTS |
|---|---|
| IMAGE TYPE | PHOTOGRAPHED IMAGE/RECEIVED IMAGE |
| TRANSMISSION RECORD | UNTRANSMITTED / ALREADY TRANSMITTED |
| TRANSMISSION DISALLOW | ALLOWED / DISALLOWED |
| ERASE DISALLOW | ALLOWED / DISALLOWED |
| ATTACHMENT SETTING | SET / NOT SET |
| TRANSMISSION HISTORY | |

FIG.10

TRANSMISSION HISTORY

| ITEM | CONTENTS |
|---|---|
| TRANSMISSION DATE / TIME POINT DATA 1 | |
| RECIPIENT DATA 1 | |
| RECIPIENT REPRODUCTION RECORD 1 | NOT REPRODUCED / REPRODUCED |
| REPRODUCTION TIME POINT 1 | |
| TRANSMISSION DATE / TIME POINT DATA 2 | |
| RECIPIENT DATA 2 | |
| RECIPIENT REPRODUCTION RECORD 2 | NOT REPRODUCED / REPRODUCED |
| REPRODUCTION TIME POINT 2 | |
| . . | |

FIG.11

RECEPTION INFORMATION DATA

| ITEM | CONTENTS |
|---|---|
| ATTACHED IMAGE SETTING | NOT SET / SET |
| TRANSFER DISALLOW | ALLOWED / DISALLOWED |
| REPRODUCTION RECORD | NOT REPRODUCED / REPRODUCED |
| RECEPTION DATE / TIME POINT DATA | |
| ORIGINATOR DATA | |

FIG.12

PHOTOGRAPHING INFORMATION DATA

| ITEM | CONTENTS |
|---|---|
| PHOTOGRAPHING CAMERA IDENTIFICATION DATA | N B A 0 0 2 8 1 5 |
| PHOTOGRAPHIC LENS | 50-100mm / f 4 |
| PHOTOGRAPHING FOCAL LENGTH | 80mm |
| PHOTOGRAPHING DISTANCE | 1. 5 m |
| PHOTOGRAPHING APERTURE VALUE | f 4 |
| SHUTTER SPEED | 1/250 |
| STROBE | YES |
| STROBE LIGHT OUTPUT | G N 1 4 |
| SUBJECT BRIGHTNESS | E V 8 |
| EXPOSURE MODE | APERTURE PRIORITY |
| EXPOSURE CORRECTION | LEVEL +1 |
| PHOTOMETERING MODE | CENTRAL AREA |
| FOCUS MODE | A F — S |
| FLASH CONTROL MODE | TTL FLASH CONTROL |
| SYNCHRO MODE | NORMAL |
| FLASH CONTROL CORRECTION | LEVEL −1 |
| CONTINUOUS SHOOTING MODE | SINGLE SHOOTING |
| RECORDING MODE | HIGH DEFINITION |
| DYNAMIC / STILL | STILL |
| ... | ... |

FIG. 13

OPERATING MODE

- PHOTOGRAPHING MODE
- REPRODUCTION MODE
  - PHOTOGRAPHED IMAGE REPRODUCTION MODE FOR REPRODUCING ONLY IMAGES PHOTOGRAPHED IN THE CAMERA
  - RECEIVED IMAGE REPRODUCTION MODE FOR REPRODUCING ONLY IMAGES RECEIVED FROM OUTSIDE
  - ALL IMAGE REPRODUCTION MODE FOR REPRODUCING ALL IMAGES
- ERASE MODE
  - INDIVIDUAL ERASE MODE FOR ERASING INDIVIDUALLY SELECTED IMAGES
  - BATCH ERASE MODE: ALL IMAGES, FOR ERASING ALL IMAGES IN A BATCH
  - BATCH ERASE MODE: PHOTOGRAPHED IMAGES, FOR ERASING PHOTOGRAPHED IMAGES IN A BATCH
  - BATCH ERASE MODE: RECEIVED IMAGES, FOR ERASING IMAGE RECEIVEDFROM A SPECIFIC ORIGINATOR IN A BATCH
  - BATCH ERASE MODE: TRANSMITTED IMAGES, FOR ERASING TRANSMITTED IMAGES IN A BATCH
  - BATCH ERASE MODE: TRANSMITTED PHOTOGRAPHED IMAGES, FOR ERASING PHOTOGRAPHED IMAGES TRANSMITTED TO A SPECIFIC RECIPIENT IN A BATCH
  - BATCH ERASE MODE: TRANSMITTED RECEIVED IMAGES, FOR ERASING RECEIVED IMAGES TRANSMITTED TO A SPECIFIC RECIPIENT IN A BATCH
- TRANSMISSION MODE
  - INDIVIDUAL TRANSMISSION MODE FOR TRANSMITTING INDIVIDUALLY SELECTED IMAGES
  - BATCH TRANSMISSION MODE: ALL IMAGES, FOR TRANSMITTING ALL IMAGES IN A BATCH
  - BATCH TRANSMISSION MODE: PHOTOGRAPHED IMAGES, FOR TRANSMITTING PHOTOGRAPHED IMAGES IN A BATCH
  - BATCH TRANSMISSION MODE: RECEIVED IMAGES, FOR TRANSMITTING IMAGES RECEIVED FROM A SPECIFIC ORIGINATOR IN A BATCH
  - BATCH TRANSMISSION MODE: UNTRANSMITTED IMAGES, FOR TRANSMITTING UNTRANSMITTED IMAGES IN A BATCH
  - BATCH TRANSMISSION MODE: UNTRANSMITTED PHOTOGRAPHED IMAGES, FOR TRANSMITTING UNTRANSMITTED PHOTOGRAPHED IMAGES IN A BATCH
  - BATCH TRANSMISSION MODE: UNTRANSMITTED RECEIVED IMAGES, FOR TRANSMITTING UNTRANSMITTED RECEIVED IMAGES IN A BATCH

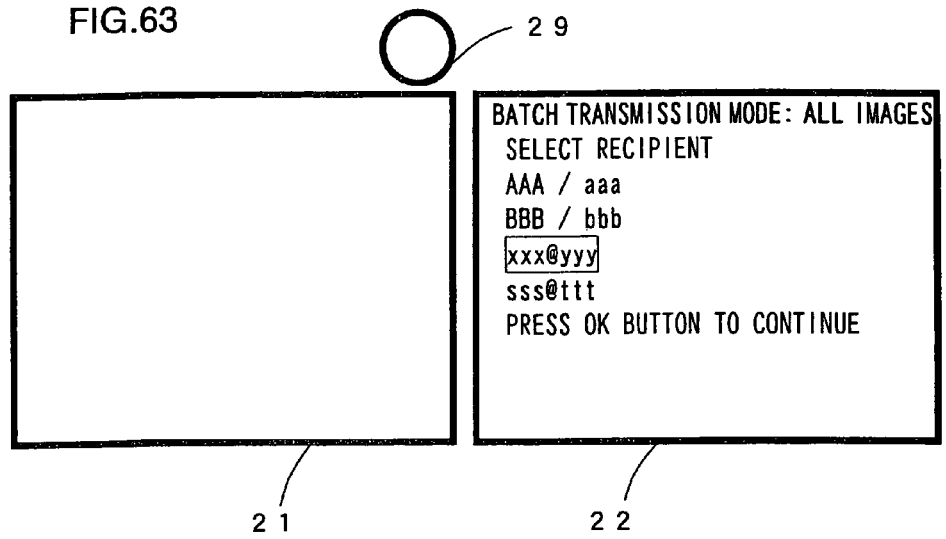

2 1

2 1

FIG.82
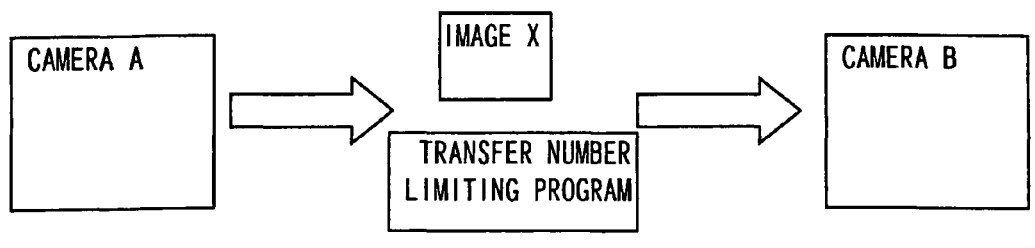
LIMIT TO NUMBER OF TRANSFERS: 1
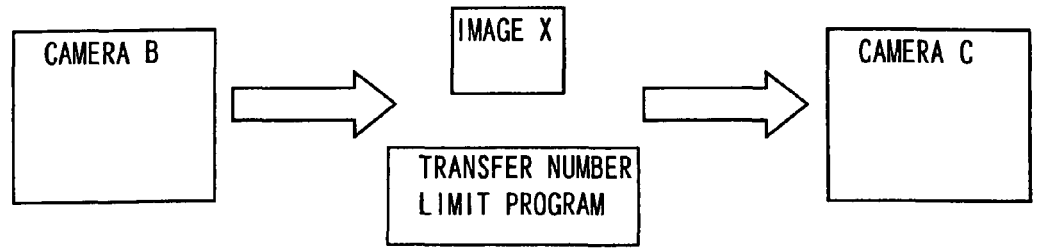
LIMIT TO NUMBER OF TRANSFERS: 0 (TRANSFER DISALLOWED)

FIG.92

```
                INDIVIDUAL TRANSMISSION MODE

RECIPIENT: 00

LINE TYPE        TRANSMISSION TIME LENGTH    TRANSMISSION FEE
  LINE A           10 MIN                       ¥800
  LINE B           20 MIN                       ¥600
  LINE C           30 MIN                       ¥400
  LINE D           40 MIN                       ¥200

SELECT LINE TYPE WITH DIRECTION BUTTONS
PRESS OK BUTTON TO CONTINUE
```

```
                INDIVIDUAL TRANSMISSION MODE

RECIPIENT: 00

TIME BLOCK       TRANSMISSION TIME LENGTH    TRANSMISSION FEE
  IMMEDIATE        40 MIN                       ¥800
  TIME BLOCK A     30 MIN                       ¥600
  TIME BLOCK B     20 MIN                       ¥400
  TIME BLOCK C     10 MIN                       ¥200
SELECT TIME BLOCK WITH DIRECTION BUTTONS
PRESS OK BUTTON TO CONTINUE
```

| INDIVIDUAL TRANSMISSION MODE | | |
|---|---|---|
| RECIPIENT: 00 | | |
| COMMUNICATION MODE | TRANSMISSION TIME LENGTH | TRANSMISSION FEE |
| TRANSMISSION FEE PRIORITY | 40 MIN | ¥200 |
| TRANSMISSION TIME LENGTH PRIORITY | 10 MIN | ¥800 |

SELECT TIME WITH DIRECTION BUTTONS
PRESS OK BUTTON TO CONTINUE 2 2

FIG.95

INDIVIDUAL TRANSMISSION MODE

RECIPIENT: 00

| IMAGE COMPRESSION RATE | TRANSMISSION TIME LENGTH | TRANSMISSION FEE |
|---|---|---|
| NO COMPRESSION | 40 MIN | ¥800 |
| LOW COMPRESSION | 30 MIN | ¥600 |
| MEDIUM COMPRESSION | 30 MIN | ¥400 |
| HIGH COMPRESSION | 10 MIN | ¥200 |

IMAGE TO BE TRANSMITTED   SELECT COMPRESSION RATE WITH DIRECTION BUTTONS
PRESS OK BUTTON TO CONTINUE 2 2

DIGITAL IMAGE APPARATUS AND DIGITAL IMAGE SYSTEM INCLUDING TRANSMISSION HISTORY INFORMATION

This application is a Continuation of application Ser. No. 10/479,587 filed Dec. 4, 2003, which is a National Stage of International Application No. PCT/JP02/04948 filed May 22, 2002. The entire disclosure of the prior applications is hereby incorporated by reference herein in its entirety.

TECHNICAL FIELD

The present invention relates to a digital image apparatus that may be, for instance, an electronic camera and a digital image system achieved by using such digital image apparatuses, and more specifically, it relates to a digital image apparatus and a digital image system that transmit or receive digital images to/from the outside and reproduce, erase and the like the digital images transmitted or received to/from the outside.

BACKGROUND ART

There are electronic cameras known in the related art that record electronic images (digital images) captured via an image-capturing element into a recording medium such as a memory card. Since such electronic images obtained by converting image signals to electrical signals are suited to the electronic processing such as communication, there are also digital image systems known in the related art that achieve communication among users of portable digital image apparatuses such as electronic cameras having a communication function and portable telephones with an image display function by allowing the portable digital image apparatuses to transmit and receive photographed electronic images, and to reproduce and erase the transmitted/received images via telephone lines or the Internet. Since faster and larger-capacity communication lines have become available, it has become increasingly occurring for individuals to exchange images of relatively large data volumes by using portable telephones and the like.

However, the following problems must be addressed with regard to the digital image apparatuses and the digital image systems in the related art described above.

When images are transmitted and received frequently between individuals via a communication line by using compact portable digital image apparatus such as PDA (personal digital assistant), portable telephones with an image display function and the like, the storage capacity of the image storage memory in each of the digital image apparatuses becomes in a state of shortage and, as a result, it is necessary to frequently perform processing for extracting necessary images among the images stored in the image storage memory on a temporary basis, transmitting those images that will be needed later to the outside for backup and erasing unnecessary images. However, the digital image apparatuses and the digital image systems in the related art do not allow such processing to be efficiently and quickly executed.

In addition, if too many images are packed into the image storage memory of a compact portable digital image apparatus for personal use, it becomes necessary to perform numerous complicated operations and spend a great deal of time to execute the processing such as reproduction, transmission and erasure of a selected image and thus, spontaneous and casual communication in which images are exchanged is not possible. Furthermore, if all the images are processed in a batch in order to simplify the processing such as image reproduction, erasure and transmission, there arises a risk of erroneous operations which will result in an image other than a desired image being inadvertently reproduced, erased or transmitted.

While a compact portable digital image apparatus for personal use is often shared by a plurality of users, full security is not always assured for the individual users pertaining to image operations for saving, reproducing, erasing, transmitting and receiving images exchanged between specific individuals. This gives rise to a risk of another person viewing an image received by a specific user, and also that of an t image transmitted to a specific recipient being transferred to a stranger, and these risks are holding back communication achieved via images from realizing its full potential.

In addition, due to a lack of sufficient-user-interface information available at the time of image transmission and reception when images are exchanged between individuals as described above, images cannot be transmitted/received efficiently (with respect to the communication time, the transmission fee), and it is often a slow process to select various settings such as the correct image recipient and the images to be exchanged. At the same time, it is frequently an inefficient process in the sense that a single image is often transmitted twice to a single recipient unnecessarily to cost the sender an unnecessarily high transmission fee.

Moreover, when images are exchanged between individuals, the sender, the photographer or the owner of the receive image cannot be verified in an efficient and intuitive manner as necessary and it takes a great deal of time to verify the sender, the photographer or the owner.

DISCLOSURE OF THE INVENTION

The present invention provides a digital image apparatus that makes it possible to transmit, receive, save, reproduce, erase and the like electronic images in an efficient and error-free manner by addressing the problems discussed above and a digital image system achieved by utilizing such digital image apparatuses.

A digital image apparatus according to the present invention comprises: a storage unit in which digital image information is stored; a display unit that displays the digital image information stored in the storage unit; a setting unit that sets a recipient of the digital image information; and a communication unit that transmits the digital image information stored in the storage unit to a recipient set through the setting unit, further comprises: an updating unit that updates transmission history information including recipient information indicating a recipient of the digital image information each time the digital image information is transmitted by the communication unit and stores the updated transmission history information into the storage unit in correspondence to the digital image information, wherein: when the digital image information stored in the storage unit is displayed, the display unit also displays transmission history information pertaining to the digital image information in correspondence to the digital image information.

It is preferable that, in the digital image apparatus, the display unit includes a substantially quadrangular display screen at which digital image information stored in the storage unit is displayed and the transmission history information is superimposed over the digital image information in a peripheral area of the display screen in a size smaller than the display screen.

It is also preferable that the display unit ends display of the transmission history information when a predetermined length of time elapses following a start of the display of the transmission history information.

It is preferable that the storage unit stores recipient information that enables a visual identification of the recipient; and the display unit displays the recipient information that enables a visual identification stored in the storage unit when the recipient of digital image information is manually set through the setting unit.

It is preferable that the recipient information is icon image information that enables a visual identification of the recipient. In this case, it is preferable that the icon image information is face image information depicting a face of a communication partner at the recipient.

Also, it is preferable that the communication unit receives digital image information transmitted from outside and stores the received digital image information into the storage unit; and the digital image apparatus further includes a recipient information-preparing unit that prepares the recipient information for an originator of the received digital image information based upon the received digital image information.

Also, it is preferable that the transmission history information includes image reproduction information indicating a reproduction record at the recipient of the digital image information having been transmitted; the communication unit receives the image reproduction information from the recipient of the digital image information; and the updating unit updates the image reproduction information included in the transmission history information based upon the image reproduction information that has been received.

Another digital image apparatus according to the present invention comprises: a storage unit in which digital image information and additional information related to the digital image information are stored; a communication unit that receives digital image information from an outside image originator and stores the digital image information into the storage unit; a recording unit that records reception information related to reception of digital image information at the communication unit as additional information related to the digital image information; and a batch processing unit that extracts digital image information satisfying a predetermined condition pertaining to image transmission or image reception from a plurality of sets of digital image information stored in the storage unit based upon reception information recorded by the recording unit as the additional information and executes batch processing on all sets of the digital image information thus extracted.

In this digital image apparatus, it is preferable that the recording unit records originator information indicating originators of digital image information that has been received as additional information; and the batch processing unit extracts digital image information received from a specific originator from the storage unit based upon the additional information and transmits all the received digital image information that has been extracted to the outside in a batch via the communication unit.

Also, it is preferable that the recording unit records originator information indicating originators of digital image information that has been received as additional information; and the batch processing unit extracts digital image information received from a specific originator from the storage unit based upon the additional information and erases all the received digital image information that has been extracted from the storage unit in a batch.

It is also preferable that a personal identification unit that identifies a user of the digital image apparatus is further provided; when digital image information received at the communication unit is recorded into the storage unit, the recording unit records personal information indicating an individual to whom the received digital image information has been addressed as the additional information; and the batch processing unit extracts received digital image information satisfying a predetermined condition pertaining to image reception, from received digital image information with additional information constituted of personal information which corresponds to results of an identification executed by the personal identification unit based upon personal information and reception information recorded as the additional information by the recording unit, and executes batch processing on all the received digital image information that has been extracted.

It is also preferable that a personal identification unit that identifies users of the digital image apparatus is further provided; the storage unit is constituted of individual user folders, each provided in correspondence to an individual; when recording digital image information received at the communication unit into the storage unit, the recording unit records the received digital image information into an individual user folder corresponding to the individual to whom the received digital image information has been addressed; and the batch processing unit extracts received digital image information satisfying a predetermined condition pertaining to image reception based upon reception information recorded by the recording unit as additional information from received digital image information in an individual user folder corresponding to results of an identification executed by the personal identification unit and executes batch processing on all the received digital image information that has been extracted.

Another digital image apparatus according to the present invention comprises: a storage unit in which digital image information and additional information related to the digital image information are stored; a communication unit that transmits digital image information stored in the storage unit to outside image recipients; a recording unit that records recipient information indicating a recipient of digital image information transmitted by the communication unit as additional information related to the digital image information; and a batch processing unit that extracts digital image information which has been previously transmitted to a specific recipient from a plurality of sets of digital image information stored in the storage unit based upon recipient information recorded by the recording unit as additional information and erases all the digital image information that has been extracted from the storage unit in a batch.

Another digital image apparatus according to the present invention comprises: a storage unit in which digital image information and additional information related to the digital image information are stored; a communication unit that transmits digital image information stored in the storage unit to outside image recipients; a recording unit that records recipient information indicating a recipient of digital image information transmitted by the communication unit as additional information related to the digital image information; and a batch processing unit that extracts from the storage unit digital image information that has never been transmitted to a specific recipient among a plurality of sets of digital image information stored in the storage unit based upon recipient information recorded as additional information by the recording unit and transmits all the digital image information that has been extracted to the specific recipient through the communication unit in a batch.

In these digital image apparatuses, it is preferable that there are further provided an image-capturing unit that captures digital image information and a personal identification unit that identifies users of the digital image apparatus; when recording digital image information captured by the image-capturing unit into the storage unit, the recording unit records personal identification information corresponding to results of an identification executed by the personal identification unit as additional information; and the batch processing unit extracts digital image information satisfying a predetermined condition pertaining to image transmission from digital image information with additional information constituted of personal identification information which corresponds to the results of the identification executed by the personal identification unit based upon personal identification information and transmission information recorded by the recording unit as additional information and executes batch processing on all the digital image information that has been extracted.

It is preferable that there are further provided an image-capturing unit that captures digital image information and a personal identification unit that identifies users of the digital image apparatus; the storage unit is constituted of individual user folders each provided in correspondence to an individual; when recording digital image information captured by the image-capturing unit into the storage unit, the recording unit records the captured digital image information into an individual folder corresponding to results of an identification executed by the personal identification unit; and the batch processing unit extracts digital image information satisfying a predetermined condition pertaining to image transmission based upon transmission information recorded by the recording unit as additional information among sets of digital image information contained in the individual user folder corresponding to the results of the identification executed by the personal identification unit and executes batch processing on all the digital image information that has been extracted.

In the above digital image apparatuses, it is preferable that there is further provided an image verification unit that displays at least part of the digital image information extracted by the batch processing unit before the batch processing unit executes the batch processing on the extracted digital image information.

It is also preferable that there is further provided a startup unit that automatically starts up the batch processing unit under a predetermined startup condition.

A digital image system according to the present invention has a first digital image apparatus and a second digital image apparatus. The first digital image apparatus comprises: a first storage unit in which digital image information is stored; and a first communication unit transmits digital image information stored in the first storage unit to the outside and also transmits control information for restricting a further transmission of the digital image information to an outside party from a recipient by attaching the control information to the digital image information, and the second digital image apparatus comprises: a second storage unit in which digital image information is stored; a second communication unit that receives digital image information transmitted from the first communication unit and control information attached to the digital image information, stores the received digital image information and control information into the second storage unit and transmits digital image information stored in the second storage unit to the outside; and a control unit that imposes restrictions on transmission executed by the second communication unit of the received digital image information to the outside based upon the control information attached to the received digital image information.

In this digital image system, it is preferable that the control information is transfer disallow information that disallows further transmission of the digital image information from the recipient to the outside; and the control unit at the second digital image apparatus disallows transmission of the received digital image information to which the transfer disallow information is attached by the second communication unit to the outside in conformance to the transfer disallow information.

It is also preferable that, the control information is transmission number limit information that sets a limit to the number of further transmissions of the digital image information that can be made from the recipient to the outside; and the control unit at the second digital image apparatus limits the number of further transmissions of the received digital image information to which the transmission-number-limit information is attached that can be made through the second communication unit to the outside in conformance to the transmission-number-limit information.

Another digital image apparatus according to the present invention comprises: a storage unit in which digital image information is stored; a communication unit that receives digital image information transmitted from the outside and control information attached to the digital image information, stores the received digital image information and control information into the storage unit and transmits received digital image information stored in the storage unit to the outside; and a control unit that imposes restrictions on a transmission executed by the communication unit of received digital image information stored in the storage unit to the outside, based upon the control information attached to the received digital image information.

In this digital image apparatus, it is preferable that the control information includes time length information or date/time point information; and when received digital image information stored in the storage unit is transmitted to the outside by the communication unit, the control unit disallows transmission of the received digital image information having the control information attached to the outside by the communication unit during a period corresponding to the time length information or the date/time point information.

It is also preferable that, the control information includes address information; and when received digital image information stored in the storage unit is transmitted to the outside by the communication unit, the control unit disallows transmission of the received digital image information having the control information attached to parties other than a recipient corresponding to the address information.

Another digital image system according to the present invention has a first digital image apparatus and a second digital image apparatus. The first digital image apparatus comprises: a first storage unit in which digital image information is stored; and a first communication unit that transmits digital image information stored in the first storage unit to the outside and also transmits control information that sets restrictions on processing to be executed on the digital image information at a recipient by attaching the control information to the digital image information being transmitted, and the second digital image apparatus comprises: a second storage unit in which digital image information is stored; a second communication unit that receives digital image information transmitted from the first communication unit and control information attached to the digital image information and stores the received digital image information and control information into the second storage unit; and a processing unit that executes a specific processing on received digital image information stored in the storage unit; and a control unit that controls the processing executed by the processing unit on the received digital image information having the control information attached based upon the control information.

In this digital image system, it is preferable that the processing unit includes a printing device that prints digital image information stored in the second storage unit; the control information is print disallow information disallowing printing of digital image information being transmitted at a recipient; and the control unit disallows printing at the printing device of received digital image information to which the print disallow information is attached, based upon the print disallow information.

It is also preferable that, the processing unit is a process unit that processes digital image information stored in the second storage unit; the control information is processing disallow information that disallows processing of digital image information being transmitted to at a recipient; and the control unit disallows processing at the process unit received digital image information to which the processing disallow information is attached, based upon the processing disallow information.

It is also preferable that, the processing unit is a display unit that displays digital image information stored in the second storage unit; the control information is display restrict information that sets restrictions on the display at the recipient of digital image information being transmitted; and the control unit restricts display at the display unit of received digital image information having the display restrict information attached in conformance to the display restrict information.

It is also preferable that, the processing unit is an erase unit that erases digital image information stored in the second storage unit; the control information is time length information indicating a specific length of time after which digital image information being transmitted is to be to erased at the recipient; and the control unit measures a length of time elapsing after the digital image information is received and engages the erase unit to erase the received digital image information having the time length information attached from the second storage unit when the length of elapsed time matches the specific length of time indicated in the time length information stored in the second storage unit.

It is also preferable that, the processing unit is an erase unit that erases digital image information stored in the second storage unit; the control information is date/time point information indicating a specific date/time point at which digital image information being transmitted is to be erased at the recipient; and the control unit detects a current date/time point through a time count and engages the erase unit to erase the received digital image information having the date information attached from the second storage unit when the detected date/time point matches the date/time point information stored in the storage unit.

It is also preferable that the second digital image apparatus includes a display unit at which digital image information stored in the second storage unit is reproduced and displayed; the processing unit is an erase unit that erases digital image information stored in the second storage unit; the control information is reproduction-number information indicating a predetermined number of reproductions after which digital image information being transmitted is to be erased at the recipient; and the control unit counts the number of reproductions executed for each set of digital image information at the display unit and when a reproduction count matches the number of reproductions indicated in the reproduction number information stored in the second storage unit, the control unit engages the erase unit to erase the received digital image information having the reproduction number information attached from the second storage unit after a current reproduction of the received digital image information is completed.

Another digital image apparatus according to the present invention comprises: a storage unit in which digital image information is stored; a communication unit that receives digital image information transmitted from outside and control information attached to the digital image information and stores the received digital image information and control information into the storage unit; a processing unit that executes predetermined processing on digital image information stored in the storage unit; and a control unit that controls the processing executed by the processing unit on received digital image information having the control information attached in conformance to the control information.

In this digital image apparatus, it is preferable that the control information includes time length information or date/time point information; and the control unit sets restrictions on a control period over which the processing executed by the processing unit on the received digital image information having the control information attached is controlled in conformance to the control information based upon the time length information or the date/time point information.

It is also preferable that, the control information includes time length information or date/time point information; and the control unit disallows of the processing executed by the processing unit on the received digital image information having the control information attached over a period corresponding to the time length information or the date/time point information.

It is preferable that, in these digital image systems or digital image apparatuses, a rewrite of the control information attached to received digital image information by the digital image apparatus having received the digital image information is disallowed.

Another digital image system according to the present invention has a first digital image apparatus and a second digital image apparatus. The first digital image apparatus comprises: a first storage unit in which digital image information is stored; and a first communication unit that transmits digital image information stored in the first storage unit to an outside recipient and transmits image identification information for enabling identification of the digital image information; and command information for directing the recipient of the digital image information to execute processing on the digital image information to the recipient of the digital image information after the digital image information is transmitted to the outside, and the second digital image apparatus comprises: a second storage unit in which digital image information is stored; a second communication unit that receives digital image information transmitted by the first communication unit and stores the received digital image information into the second storage unit, detects sender information indicating the sender of the digital image information, stores the detected sender information in correspondence to the digital image information into the second storage unit, and receives the command information and the image identification information transmitted from the first communication unit after receiving the digital image information; a processing unit that executes predetermined processing on digital image information stored in the second storage unit; and a control unit that detects originator information indicating an originator of command information received by the second communication unit and engages the processing unit to execute processing on received digital image information specified by using the image identification information based upon the command information if the detected sender information matches the sender information stored in the second storage unit in correspondence to the received digital image information.

In this digital image system, it is preferable that the processing unit is an erase unit that erases digital image information stored in the second storage unit; the command information is erase command information in conformance to which the transmitted digital image information is erased; and the control unit engages the erase to erase received digital image information specified by using the image identification information from the second storage unit based upon the erase command information.

It is also preferable that the processing unit is a transfer unit that transfers digital image information stored in the second storage unit to the outside via the second communication unit; the command information is transfer disallow information disallowing further transfer of the transmitted digital image information from a recipient; and the control unit disallows transfer of received digital image information specified by using the image identification information to the outside by the transfer unit based upon the transfer disallow information.

Another digital image apparatus according to the present invention comprises: a storage unit in which digital image information is stored; a communication unit that receives digital image information transmitted from the outside and stores the received digital image information into the storage unit, also detects originator information indicating an originator of the digital image information, stores the originator information in correspondence to the digital image information into the storage unit and receives command information transmitted from the outside to execute processing on the digital image information and the image identification information enabling identification of the digital image information after receiving the digital image information; a processing unit that executes predetermined processing on digital image information stored in the storage unit; and a control unit that detects originator information indicating an originator of command information received by the communication unit and engages the processing unit to execute processing on received digital image information specified by using the image identification information based upon the command information if the detected originator information matches the originator information stored in the storage unit in correspondence to the received digital image information.

Another digital image system according to the present invention has a first digital image apparatus and a second digital image apparatus. The first digital image apparatus comprises: a first storage unit, in which digital image information is stored; and a first communication unit that transmits digital image information stored in the first storage unit to the outside and also transmits icon image information which enables a visual identification of a sender, a photographer or an owner of the digital image information by attaching the icon image information to the digital image information, and the second digital image apparatus comprises: a second storage unit in which digital image information is stored; a display unit that displays digital image information stored in the second storage unit; a second communication unit that receives digital image information transmitted from the first communication unit and icon image information attached to the digital image information and stores the received digital image information and icon image information into the second storage unit; and a control unit that engages the display unit to display the icon image information attached to the received digital image information in correspondence to the received digital image information when displaying the digital image information received by the second communication unit at the display unit.

In this digital image system, it is preferable that the display unit includes a substantially quadrangular display screen and displays digital image information stored in the second storage unit at the display screen; and the control unit engages the display unit to display the icon image information attached to the received digital image information by superimposing the icon image information over the received digital image information in a peripheral area of the display screen, in a size smaller than the received digital image information when displaying the digital image information received by the second communication unit at the display unit.

It is also preferable that the icon information is face image information. In this case, it is preferable that the first communication unit transmits message information attached to the digital image information; the second communication unit receives the message information attached to the digital image information and stores the received message information into the second storage unit; and the control unit engages the display unit to display the message information near the face image information.

It is also preferable that, sets of icon information are stored in the first storage unit, each in correspondence to an individual; the first digital image apparatus further comprises a personal identification unit that identifies a user of the first digital image apparatus; and the first communication unit selects an icon image corresponding to results of an identification executed by the personal identification unit from the icon images stored in the first storage unit when transmitting the digital image information to the outside and automatically transmits the selected icon image by attaching the icon image to the digital image information.

It is also preferable that the control unit ends display of the icon image information when a predetermined length of time elapses after the start of the display of the icon image information.

It is also preferable that the second digital image apparatus further comprises a decision-making unit that makes a decision as to whether or not digital image information stored in the second storage unit has been previously displayed at the display unit; and when displaying received digital image information at the display unit, the control unit disallows display of icon image information attached to the received digital image information at the display unit if results of a decision made by the decision-making unit indicate that the received digital image information has been previously displayed.

Another digital image apparatus according to the present invention comprises: a storage unit in which digital image information is stored; a display unit that displays digital image information stored in the storage unit; a communication unit that receives digital image information transmitted from the outside and icon image information attached to the digital image information to enable a visual identification of an originator, a photographer or an owner of the digital image information and stores the received digital image information and icon information into the storage unit; and a control unit that engages the display unit to display the icon image information attached to received digital image information received through the communication unit in correspondence to the received digital image information when displaying the received digital image information at the display unit.

Another digital image apparatus according to the present invention comprises: a storage unit in which digital image information is stored; a display unit having a substantially quadrangular display screen and displays digital image information stored in the storage unit at the display screen; a communication unit that receives digital image information transmitted from the outside and icon image information attached to the digital image information to enable a visual identification of an originator, a photographer or an owner of the digital image information and stores the received digital image information and icon image information into the storage unit; and a control unit that engages the display unit to display the icon image information attached to digital image information received by the communication unit by superimposing the icon image information over the received digital image information in a peripheral area of the display screen in a size smaller than the received digital image information when displaying the received digital image information at the display unit.

Another digital image apparatus according to the present invention comprises: a storage unit in which digital image information and icon image information that enables a visual identification of originators of digital image information are stored in correspondence to the individual originators; a display unit that displays digital image information stored in the storage unit; a communication unit that receives digital image information transmitted from an outside originator, stores the received digital image information into a storage unit and also stores originator information indicating the originators of the digital image information into the storage unit by attaching the originator information to the digital image information; and a control unit that reads out icon image information corresponding to the originator information attached to digital image information received by the communication unit when displaying the received a digital image information at the display unit and engages the display unit to display the icon image information in correspondence to the received digital image information.

Another digital image apparatus according to the present invention comprises: a storage unit in which digital image information and icon image information that enables a visual identification of originators of digital image information are stored in correspondence to the individual originators; a display unit that includes a substantially quadrangular display screen and displays digital image information stored in the storage unit at the display screen; a communication unit that receives digital image information transmitted from an outside originator, stores the received digital image information into the storage unit and also stores originator information indicating the originator of the digital image information into the storage unit by attaching the originator information to the digital image information; and a control unit that reads out icon image information corresponding to the originator information attached to digital image information received by the communication unit from the storage unit, when displaying the received digital image information at the display unit, and engages the display unit to display the icon image information by superimposing the icon image information over the received digital image information in a peripheral area of the display screen in a size smaller than the received digital image information.

Another digital image apparatus according to the present invention comprises: a storage unit in which digital image information is stored; an image-capturing unit that captures digital image information and stores the captured digital image information into the storage unit; a communication unit that receives digital image information transmitted from the outside and stores the received digital image information into the storage unit; a decision-making unit that makes a decision as to whether a given set of digital image information stored in the storage unit is digital image information captured by the image-capturing unit or digital image information received from the outside by the communication unit; a display unit that displays digital image information stored in the storage unit; and a notification unit that provides a notification if digital image information stored in the storage unit, which is brought up on display at the display unit, is digital image information having been received from the outside based upon results of a decision made by the decision-making unit.

Another digital image apparatus according to the present invention comprises: a storage unit in which digital image information is stored; an image-capturing unit that captures digital image information and stores the captured digital image information into the storage unit; a communication unit that receives digital image information transmitted from the outside and stores the received digital image information into the storage unit; a display unit that displays digital image information stored in the storage unit; a first decision-making unit that makes a decision as to whether a given set of digital image information stored in the storage unit is digital image information captured by the image-capturing unit or digital image information received from the outside by the communication unit; a second decision-making unit that makes a decision as to whether or not the digital image information stored in the storage unit has ever been displayed at the display unit; and a notification unit that provides a notification if any set of received digital image information that has never been displayed at the display unit is present among the digital image information received by the communication unit based upon results of a decision made by the first decision-making unit and results of a decision made by the second decision-making unit.

Another digital image apparatus according to the present invention comprises: a storage unit in which a plurality of sets of digital image information are stored; a display unit that displays digital image information stored in the storage unit; a selection unit that selects a desired set of digital image information by referencing the digital image information displayed at the display unit; a processing unit that executes predetermined processing on digital image information selected by the selection unit; a setting unit that individually sets disallow information for digital image information to disallow the processing by the processing unit on the digital image information; and a control unit that disallows display of digital image information for which the disallow information is set by the setting unit at the display unit when selecting digital image information through the selection unit.

In this digital image apparatus, it is preferable that the processing unit is a communication unit that transmits the digital image information selected by the selection unit to the outside; and the disallow information is transmission disallow information used to disallow a transmission of the digital image information to the outside by the communication unit.

It is also preferable that, the processing unit is an erase unit that erases the digital image information selected by the selection unit from the storage unit; and the disallow information is erase disallow information used to disallow an erasure of digital image information by the erase unit.

Another digital image apparatus according to the present invention comprises: a storage unit in which a plurality of sets of digital image information are stored; a setting unit that sets a recipient of digital image information to be transmitted by the communication unit; a display unit that displays digital image information stored in the storage unit after the digital image information recipient is set by the setting unit; a selection unit that selects desired digital image information by referencing the digital image information displayed by the display unit; the communication unit that transmits the digital image information selected by the selection unit to the recipient set by the setting unit; a recording unit that records recipient information indicating the recipient to which the digital image information is transmitted for the transmitted digital image information when the communication unit transmits the digital image information to the recipient set by the setting unit; and a control unit that disallows a display of digital image information for which recipient information indicating a recipient matching the recipient set by the setting unit at the display unit.

Another digital image apparatus according to the present invention comprises: a storage unit in which digital image information is stored; a communication unit that receives digital image information transmitted from outside and stores the received digital image information into the storage unit; a display unit that displays digital image information stored at the storage unit; an erase unit that erases digital image information stored in the storage unit; a recording unit that records "displayed" information for digital image information displayed at the display unit; and a control unit that disallows an erasure by the erase unit of received digital image information for which the "displayed" information has not been recorded from the storage unit.

Another digital image apparatus according to the present invention comprises: a storage unit in which digital image information is stored; a communication unit that receives digital image information transmitted from outside and stores the received digital image information into the storage unit; an erase unit that erases digital image information stored in the storage unit; an automatic setting unit that automatically sets digital image information being received by the communication unit as erase disallowed to disallow an erasure by the erase unit of the received digital image information; and a control unit that disallows an erasure by the erase unit of received digital image information set as erase disallowed from the storage unit.

In this digital image apparatus, it is preferable that there is further provided a display unit that displays digital image information stored in the storage unit; and the automatic setting unit automatically clears an erase-disallowed setting selected for received digital image information displayed at the display unit if the received digital image information has been set as erase disallowed.

Another digital image apparatus according to the present invention comprises: a storage unit in which digital image information is stored; a communication unit that transmits digital image information stored in the storage unit to the outside; an erase unit that erases digital image information stored in the storage unit; a disallow unit that individually sets digital image information stored in the storage unit as erase disallowed to disallow an erasure of the digital image information by the erase unit; a clearing unit that automatically clears an erase-disallow setting for digital image information being transmitted by the communication unit if the digital image information being transmitted has been set as erase disallowed; and a control unit that disallows or allows an erasure by the erase unit of the digital image information from the storage unit based upon information indicating whether the erase-disallowed setting has been selected for the digital image information or the erase-disallowed setting for the digital image information has been cleared by the disallow unit or the clearing unit.

In the above digital image apparatuses, it is preferable that there is further provided a clock unit and a startup unit that automatically starts up the erase unit based upon time point information or time length information generated by the clock unit.

Another digital image apparatus according to the present invention comprises: a storage unit in which digital image information is stored; an image selection unit that selects desired digital image information from sets of digital image information stored in the storage unit; a communication unit that transmits the digital image information selected by the image selection unit to the outside through a communication line; an estimating unit that estimates lengths of transmission time required to transmit the selected digital image transmission each in correspondence to one of a plurality of image transmission conditions which differently affect the transmission time when the selected digital image information is transmitted by the communication unit to the outside; a display unit that displays the plurality of image transmission conditions and the estimated lengths of transmission time each corresponding to one of the image transmission conditions; an image transmission condition selection unit that manually selects an image transmission condition by referencing the plurality of image transmission conditions and the estimated lengths of transmission time each corresponding to one the image transmission conditions displayed at the display unit; and a control unit that engages the communication unit to transmit the digital image information to the outside through the communication line in conformance to the image transmission condition selected by the image transmission condition selection unit.

Another digital image apparatus according to the present invention comprises: a storage unit in which digital image information is stored; an image selection unit that selects desired digital image information from sets of digital image information stored in the storage unit; a communication unit that transmits the digital image information selected by the image selection unit to the outside through a communication line; an estimating unit that estimates lengths of transmission time required to transmit the selected digital image information each in correspondence to one of a plurality of image transmission conditions which differently affect the transmission time when the selected digital image information is transmitted by the communication unit to the outside; an image transmission condition selection unit that automatically selects an image transmission condition achieving a shortest estimated transmission time length based upon the plurality of image transmission conditions and the estimated lengths of transmission time each corresponding to one of the image transmission conditions; and a control unit that engages the communication unit to transmit the digital image information to the outside through the communication line in conformance to the image transmission condition selected by the image transmission condition selection unit.

Another digital image apparatus according to the present invention comprises: a storage unit in which digital image information is stored; a communication unit that automatically transmits the digital image information stored in the storage unit to the outside through a communication line; an estimating unit that estimates lengths of transmission time required to transmit the digital image information each in correspondence to one of a plurality of image transmission conditions which differently affect the transmission time when the digital image information is transmitted by the communication unit to the outside; an image transmission condition selection unit that automatically selects an image transmission condition achieving a shortest estimated transmission time length based upon the plurality of image transmission conditions and the estimated lengths of transmission time each corresponding to the individual image transmission conditions; and a control unit and engages the communication unit to automatically transmit the digital image information to the outside through the communication line in conformance to the image transmission condition selected by the image transmission condition selection unit.

In these digital image apparatuses, it is preferable that the plurality of image transmission conditions are various data formats that may be adopted for the digital image information for transmission; and the estimating unit calculates data volumes resulting from converting the digital image information selected by the image selection unit to the plurality of different data formats and estimates lengths of transmission time required to transmit the digital image information converted into of the plurality of data formats based upon the data volumes and a data transmission speed of the communication line.

It is also preferable that the communication unit is capable of transmitting the digital image information selected by the image selection unit through a plurality of different communication lines; the plurality of image transmission conditions is the plurality of different communication lines; and the estimating unit estimates lengths of transmission time required to transmit the digital image information through the plurality of communication lines, based upon both a data volume of the digital image information selected by the image selection unit, and data transmission speeds of the plurality of communication lines.

It is also preferable that the plurality of image transmission conditions is a plurality of different recipients; and the estimating unit estimates lengths of transmission time required to transmit the digital image information to the plurality of recipients based upon a data volume of the digital image information selected by the image selection unit and data transmission speeds each corresponding to one of the plurality of recipients.

It is also preferable that the plurality of image transmission conditions is a plurality of different time blocks during which the digital image information may be transmitted by the communication unit through the communication line; the estimating unit estimates lengths of transmission time required to transmit the digital image information during the plurality of time blocks through the communication line based upon a data volume of the digital image information selected by the image selection unit and data transmission speeds of the communication line during the plurality of time blocks; the image transmission condition selection unit selects one time block based upon the estimated lengths of transmission time each estimated in correspondence to one of the time blocks by the estimating unit; and the control unit engages the communication unit to transmit the digital image information to the outside through the communication line during the time block selected by the image transmission condition selection unit.

Another digital image apparatus according to the present invention comprises: a storage unit in which digital image information is stored; an image selection unit that selects desired digital image information from sets of digital image information stored in the storage unit; a communication unit that transmits the digital image information selected by the image selection unit to the outside through a communication line; an estimating unit that estimates transmission fees to be incurred to transmit the digital image information each in correspondence to one of a plurality of image transmission conditions which differently affect the transmission fee to be incurred when the selected digital image information is transmitted by the communication unit to the outside; a display unit that displays the plurality of image transmission conditions and the estimated transmission fees each corresponding to one of the image transmission conditions; an image transmission condition selection unit that manually selects one image transmission condition by referencing the plurality of image transmission conditions and the estimated transmission fees each corresponding to one of the image transmission conditions displayed at the display unit; and a control unit that engages the communication unit to transmit the digital image information to the outside through the communication line in conformance to the image transmission condition selected by the image transmission condition selection unit.

Another digital image apparatus according to the present invention comprises: a storage unit in which digital image information is stored; an image selection unit that selects desired digital image information from sets of digital image information stored in the storage unit; a communication unit that transmits the digital image information selected by the image selection unit to the outside through a communication line; an estimating unit that estimates transmission fees to be incurred to transmit the digital image information each in correspondence to one of a plurality of image transmission conditions which a differently affect the transmission fee to be incurred the selected digital image information is transmission by the communication unit to the outside; an image transmission condition selection unit that automatically selects an image transmission condition with a lowest estimated transmission fee based upon the plurality of image transmission conditions and the estimated transmission fees each corresponding to one of the image transmission conditions; and a control unit that engages the communication unit to transmit the digital image information to the outside through the communication line in conformance to the transmission condition selected by the image transmission condition selection unit.

Another digital image apparatus according to the present invention comprises: a storage unit in which digital image information is stored; a communication unit that automatically transmits digital image information stored in the storage unit to the outside through a communication line; an estimating unit that estimates transmission fees to be incurred to transmit the digital image information each in correspondence to one of a plurality of image transmission conditions which a differently affect the transmission fee to be incurred the digital image information is transmitted by the communication unit to the outside; an image transmission condition selection unit that automatically selects an image transmission condition with a lowest estimated transmission fee based upon the plurality of image transmission conditions and the estimated transmission fees each corresponding to one of the image transmission conditions; and a control unit that engages the communication unit to automatically transmit the digital image information to the outside through the communication line in conformance to the image transmission condition selected by the image transmission condition selection unit.

In these digital image apparatuses, it is preferable that there is further provided a setting unit that sets a recipient of digital image information to be transmitted by the communication unit; the plurality of image transmission conditions are various data formats that may be adopted for the digital image information for transmission; and the estimating unit calculates various data volumes resulting from converting the digital image information selected by the image selection unit to the plurality of different data formats and estimates transmission fees to be incurred to transmit the digital image information converted into the plurality of data formats based upon the data volumes, a data transmission speed of the communication line and a transmission fee charged per unit time for using the communication line to communicate with the recipient.

It is also preferable that there is further provided a setting unit that sets a recipient of digital image information to be transmitted by the communication unit; the communication unit is capable of transmitting the digital image information selected by the image selection unit through a plurality of different communication lines; the plurality of image transmission conditions is the plurality of different communication lines; and the estimating unit estimates transmission fees to be incurred to transmit the digital image information through the plurality of communication lines, based upon a data volume of the digital image information selected by the image selection unit, data transmission speeds of the plurality of communication lines and transmission fees charged per unit time for using the individual communication lines to communicate with the recipient.

It is also preferable that the plurality of image transmission conditions is a plurality of different recipients; and the estimating unit estimates transmission fees to be incurred to transmit the digital image information to the plurality of recipients based upon a data volume of the digital image information selected by the image selection unit, the data transmission speeds each corresponding to one of the plurality of recipients and transmission fees charged per unit time for using the communication line to communicate with the plurality of recipients.

It is also preferable that there is further provided a setting unit that sets a recipient of digital image information to be transmitted by the communication unit; the plurality of image transmission conditions is a plurality of different time blocks during which the digital image information may be transmitted by the communication unit through the communication line; the estimating unit estimates transmission fees to be incurred to transmit the digital image information through the communication line based upon a data volume of the digital image information selected by the image selection unit, data transmission speeds of the communication line during the plurality of time blocks and transmission fees charged per unit time during the plurality of time blocks for using the communication line to communicate with the recipient; the image transmission condition selection unit selects one time block based upon the estimated transmission fees each estimated in correspondence to one of the time blocks by the estimating unit; and the control unit engages the communication unit to transmit the digital image information to the outside through the communication line during the time block selected by the image transmission condition selection unit.

BRIEF DESCRIPTION OF THE DRAWINGS

FIG. 7 shows the structure of an image file;

FIG. 8 shows the structure of the additional information data;

FIG. 9 shows the structure of the transmission information data;

FIG. 10 shows the structure of the transmission history;

FIG. 11 shows the structure of the reception information data;

FIG. 12 shows the structure of the photographing information data;

FIG. 13 shows the structure of the operating modes;

FIG. 63 presents an example of a screen display that may be brought up in the batch transmission mode: all images;

FIG. 64 presents an example of a screen display that may be brought up in the batch transmission mode: all images;

FIG. 82 illustrates yet another embodiment of the present invention;

FIG. 92 presents an example of a screen display that may be brought up to enable a communication-line selection in the transmission mode;

FIG. 93 presents an example of a screen display that may be brought up to enable a communication time of day selection in the transmission mode;

FIG. 94 presents an example of a screen display that may be brought up to enable a communication-mode selection in the transmission mode;

FIG. 95 presents an example of a screen display that may be brought up to enable a compression-rate selection in the transmission mode.

BEST MODE FOR CARRYING OUT THE INVENTION

Figure 1:
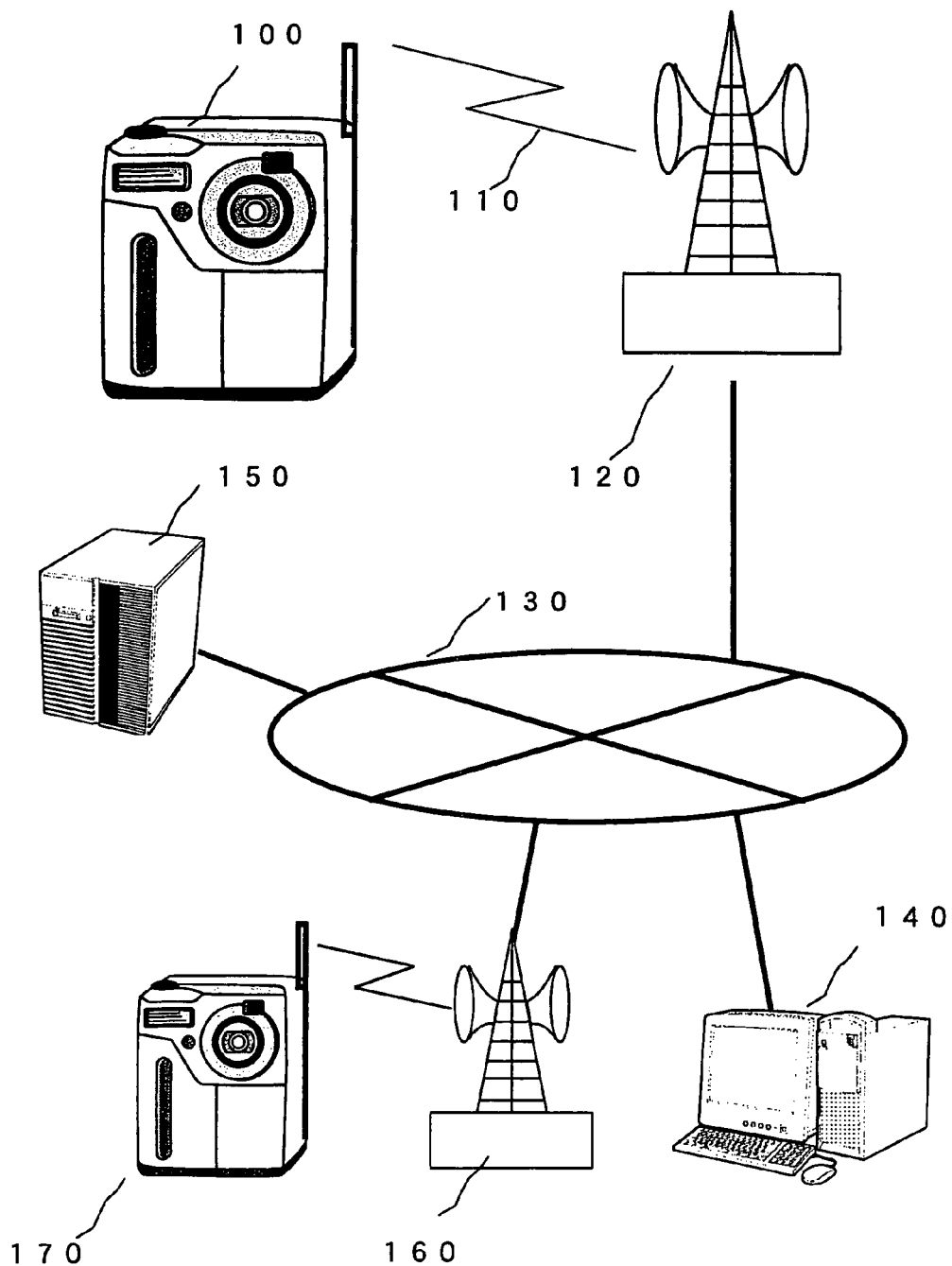
FIG. 1 is a conceptual diagram of the system configuration adopted in an embodiment of the present invention.

The following is an explanation of embodiments of the present invention, referring the drawings. FIG. 1 is a conceptual diagram of an electronic camera adopting the present invention and a digital image transmission/reception system achieved by using the electronic camera. In FIG. 1, the electronic camera 100, which has a wireless communication function, communicates with a wireless base station 120 through a wireless portable telephone line (or link) 110. The wireless base station 120 is connected with a personal computer 140 for personal use and an image database 150 via a wired or wireless public telephone line or the Internet 130 and is further connected with another electronic camera 170 via a wireless base station 160.

In the system configured as described above, electronic (digital) image data photographed by the electronic camera 100 are transmitted to the personal computer 140 and saved in the image database 150, via the wireless portable telephone line 110, the wireless base station 120 and the public telephone line or the Internet 130, and they are also transmitted to and saved in the electronic camera 170 via the wireless base station 120. In addition, image data saved in the personal computer 140 and the image database 150 and image data photographed in the electronic camera 170 are received and saved at the electronic camera 100 via the public telephone line or the Internet 130, the wireless base stations 120 and 160 and the wireless portable telephone line 110.

Figure 2:
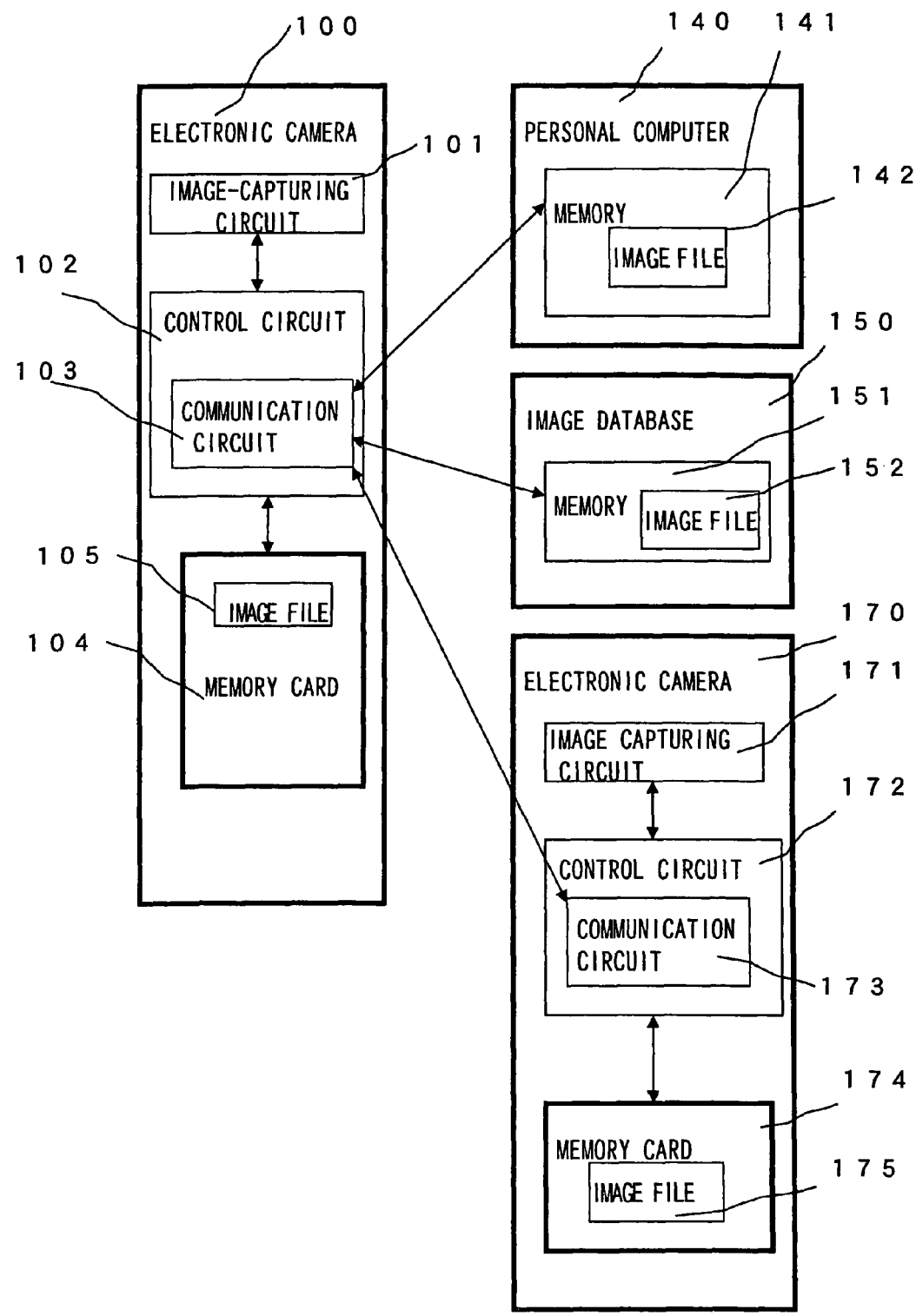
FIG. 2 is a block diagram of the system configuration adopted in the embodiment of the present invention.

In FIG. 2, showing the block diagram of the digital image transmission/reception system adopting the present invention in FIG. 1, communication media through which image data are transmitted (the wireless portable telephone line 110, the wireless base stations 120 and 160, the public telephone line and the Internet 130) are not included in the illustration. In FIG. 2, the electronic camera 100 stores image data which of obtained through a photographing operation executed in an image-capturing circuit 101, as an image file 105 into a memory card 104 loaded at the electronic camera 100, by means of a control circuit 102. In addition, the control circuit 102 includes a communication circuit 103 for transmitting/receiving image files containing image data. The electronic camera 170 adopting a structure similar to that of the electronic camera 100 stores image data obtained through a photographing operation executed in an image-capturing circuit 171 as an image file 175 into a memory card 174 loaded at the electronic camera 170 via a control circuit 172. The control circuit 172 includes a communication circuit 173 for transmitting/receiving image files containing image data as well.

In a memory 141 of the personal computer 140 for personal use, an image file 142 is saved. An image file 152 is stored into a memory 151 of the image database 150.

In the configuration described above, the image data photographed in the electronic camera 100 are first saved into the memory card 104, and are then transmitted as an image file to the personal computer 140, the image database 150 and the electronic camera 170 via the communication circuit 103, and are finally saved into their respective memories. In addition, the electronic camera 100 receive image files transmitted by the personal computer 140, the image database 150 and the electronic camera 170 via the communication circuit 103 and saves the received image files into the memory card 104.

Figure 3:
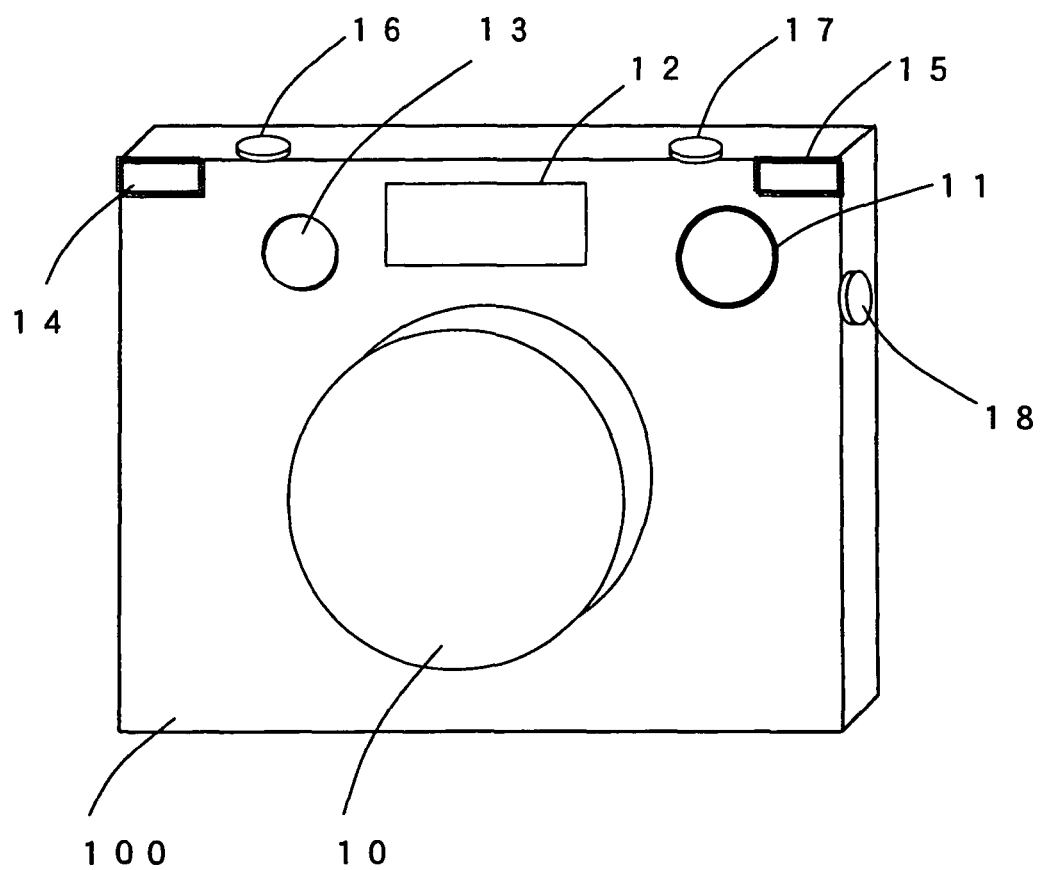
FIG. 3 is an external view (front view) of an electronic camera achieved in an embodiment of the present invention.
Figure 4:
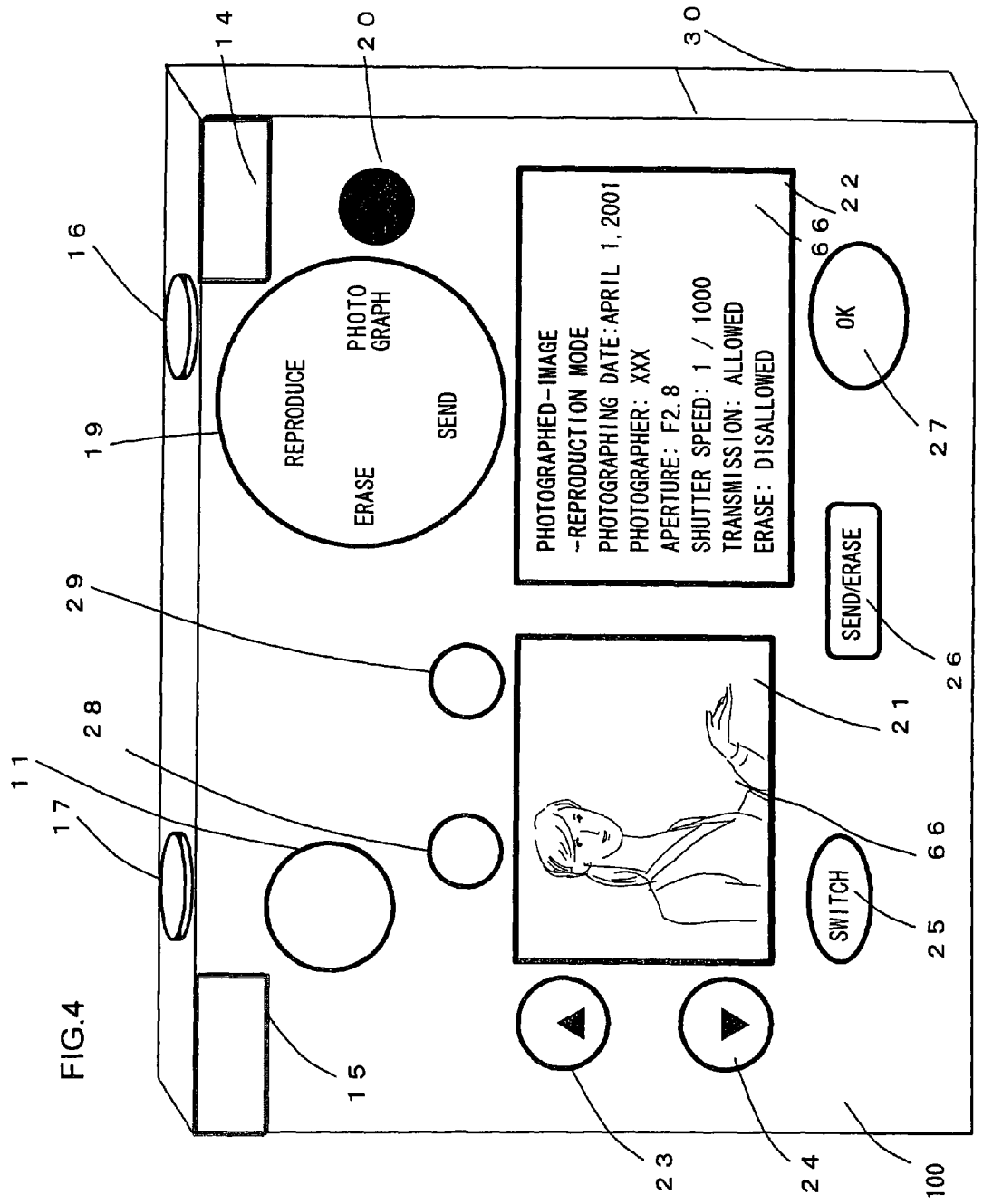
FIG. 4 is an external view (rear view) of the electronic camera achieved in the embodiment of the present invention.

FIGS. 3 and 4 present external views (a front view and a rear view) of the electronic camera 100 in FIG. 2 achieved in an embodiment. As shown in FIG. 3, at the front surface of the electronic camera 100, a photographic lens 10 for forming a subject image, a viewfinder 11 through which the photographed image plane is checked, a strobe 12 for illuminating the subject during a photographing operation, a photometering circuit 13 that detects the brightness of the subject, a speaker 14 through which audio information that has been recorded is output and a microphone 15 through which audio information is input are provided, where as at the upper surface of the electronic camera 100, a shutter release button 16 through which a photographing start instruction is issued and a power switch 17 through which on/off control for the power to the electronic camera 100 is implemented are provided and at a side surface of the electronic camera 100, an audio recording switch 18 through which on/off control for audio information recording is implemented is provided.

As shown in FIG. 4, an eyepiece portion of the viewfinder 11, a speaker 14, a microphone 15, a mode dial 19 that is operated to select the operating mode of the electronic camera, a dot 20 that indicates the setting position selected for the mode dial 19, a left LCD (left screen) 21 having a substantially quadrangular screen for text and image display and a right LCD (right screen) 22 having a substantially quadrangular screen for text and image display are provided at the rear surface of the electronic camera 100. To the left of the left LCD 21 close to the side surface, an "up" button 23 and a "down" button 24 for switching the images displayed at the left screen 21 or moving up/down through the selection options displayed at the right screen 22 are provided, and below the right LCD 22 and the left LCD 21, a "SWITCH" button 25 used to switch display operations and the like when the camera is set in a given operating mode, a "send/erase" button 26 used transmit or erase the image data and an OK button 27 used to execute a confirm operation or the like while the camera is set in a given operating mode are provided. Above the left LCD 21, an LED 28 is located and indicating that there is a received image, sent to a camera user from an originator other than the electronic camera 100, to be reproduced in the memory card 104 loaded at the electronic camera 100, and an LED 29 is also located and indicating that the image currently displayed in the left screen 21 is an image received from an originator other than the electronic camera 100. At a side surface, a memory card slot 30 in which the memory card 104 is loaded is provided.

It is to be noted that the shutter release button 16, the audio recording switch 18, the operating mode dial 19, the "up" button 23, the "down" button 24, the "SWITCH" button 25, the "send/erase" button 26 and the "OK" button 27 are all operating keys operated by the user.

It is also to be noted that over the surfaces of the right LCD 22 and the left LCD 21, so-called touch tablets 66 that output position data corresponding to a position indicated through a finger contact operation are provided to enable selection of an item displayed on the screen and text data input. Through the touch tablets 66 constituted of a transparent material such as glass resin, images and text formed on the inside of the touch tablets 66 can be observed by the user.

Figure 5:
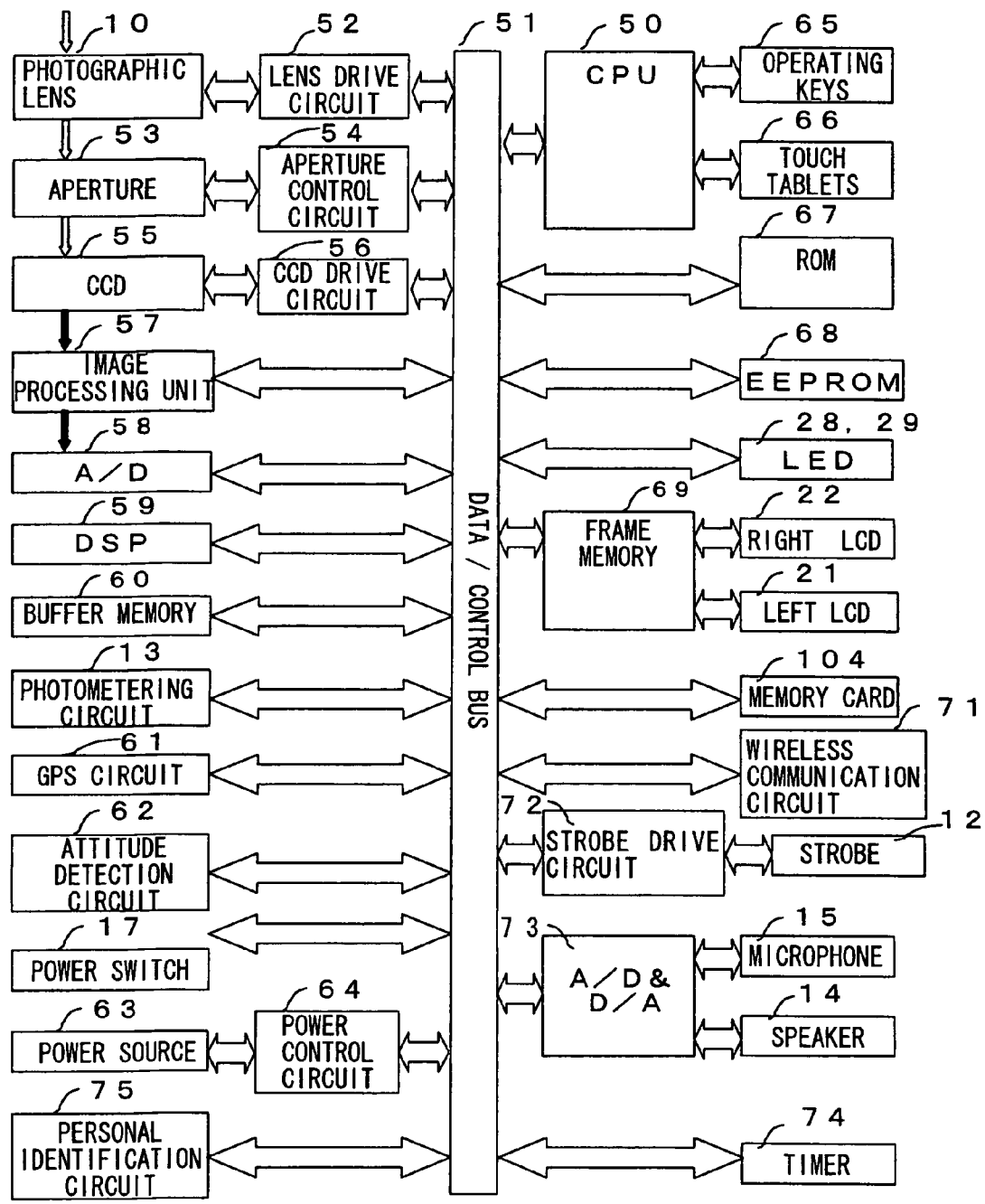
FIG. 5 is a block diagram of the electrical structure adopted in the electronic camera achieved in the embodiment of the present invention.

In FIG. 5 presenting a block diagram of the internal electrical structure which may be assumed in the electronic camera 100 shown in FIGS. 3 and 4, the individual components are connected with one another via a data/control bus 57 through which various types of information data and control data are exchanged.

A CPU 50 (central processing unit) is a means for implementing overall control of the electronic camera 100 by controlling the operations of the electronic camera 100 in conformance to information input through operating keys 65 and information input through the touch tablets 66.

When the electronic camera 100 is currently set in a photographing mode, a subject image is formed onto a CCD 55 (charge coupled device) via an aperture 53 provided for a light quantity adjustment by the photographic lens 10 with a light flux from the subject, and the subject image is then captured by the CCD 55. The CCD 55 having a plurality of pixels in a charge storage type image sensor provided to capture the subject image and outputs electrical image signals corresponding to the intensity level of the subject image formed on the CCD 55. A DSP 59 (digital signal processor) supplies a horizontal drive pulse to the CCD 55 and also ensures that a CCD vertical drive pulse is supplied to the CCD 55 by controlling a CCD drive circuit 56.

An image processing unit 57 that is controlled by the CPU 50 samples image signals having undergone photoelectric conversion at the CCD 55 with predetermined timing and amplifies the sampled signals to a predetermined level. The CPU 50 controls the various components in conformance to a control program stored in a ROM 67 (read only memory). An A/D conversion circuit 58 (analog to digital conversion circuit) converts the image signals sampled at the image processing circuit 57 to image data through digitization and provides the digitized image data to a buffer memory 60 where they are temporarily stored. The CPU 50 converts the image data stored in the buffer memory 60 to display data which are then stored into a frame memory 69 and are displayed at the left screen 21. It is to be noted that the buffer memory 60 and the frame memory 69 are each constituted of a volatile memory such as a DRAM (dynamic random access memory). The operation described above is repeatedly executed and a through screen is continuously displayed at the left screen 21 until the shutter release button 15 is operated.

The photometering circuit 13 measures the brightness of the subject and outputs photometric data obtained through the measurement to the CPU 50. Based upon the photometric data, the CPU 50 sets the exposure time and the sensitivity of the CCD 55 via the CCD drive circuit 56 and also controls the aperture value for the aperture 53 via an aperture control circuit 54.

In the photographing mode, the CPU 50 executes a photographing operation in response to an operation of the shutter release button 15. If the photometric data indicate that the subject is dark, the CPU 50 engages a strobe drive circuit 72 to cause the strobe 12 to emit light during the photographing operation. The CPU 50 transfers and stores the image data provided to and stored at the buffer memory 60 from the CCD 55 by performing the photographing operation into the memory card 104. The CPU 50 also transfers and stores photographing information data pertaining to the photographing operation (the aperture value, the shutter speed, etc.) into the memory card 104 by appending the photographing information data onto the image data.

Audio information originating from the subject or the photographer is input through the microphone 15 and the audio information thus input is provided to an A/D and D A circuit 73 (digital to analog circuit). The A/D and D/A circuit 73 obtains audio data by digitizing the audio information and outputs the audio data to the CPU 50. During the image photographing operation, the CPU 50 transfers and stores the audio data together with the image data into the memory card 104.

A GPS circuit 61 (global positioning system circuit) detects position information indicating the current position of the electronic camera 100 based upon information provided by a plurality of satellites orbiting around the Earth and provides the position information thus detected to the CPU 50. During the image photographing operation, the CPU 50 may transfer and store this position information or processed position information (the location name, the geographic name, etc.) together with the image data into the memory card 104.

An attitude detection circuit 62, which is constituted of an attitude sensor or the like of the known art to enable detection of the attitude of the electronic camera 100 during the photographing operation, provides the attitude information to the CPU 50. The attitude information indicates which side of the image plane is turned upward (up/down or top/bottom information) during the photographing operation. During the image photographing operation, the CPU 50 may transfer and store this attitude information (up/down information) together with the image data into the memory card 104.

A personal identification circuit 75 is a circuit that identifies the current user of the electronic camera 100. For instance, it may execute a personal identification by communicating via a wireless communication circuit 71 with a portable terminal carried by the user which has a wireless communication function and obtaining personal identification data stored and saved at the portable terminal. A restriction is imposed with regard to the access area in the memory card 104 based upon such personal identification data.

A timer 74 having an internal clock circuit provides time information indicating the current time to the CPU 50. During the image photographing operation, the CPU 50 may transfer and store the time information indicating the photographing operation time point together with the image data into the memory card 104.

In addition, the CPU 50 engages a lens drive circuit 52 in operation in conformance to the focal adjustment state of the subject image detected based upon the contrast of the image data stored in the buffer memory 60 to execute an automatic focal adjustment for the photographic lens 10.

The CPU 50 transmits an image file stored in the memory card 104 to the outside or receives an image file from the outside via the wireless communication circuit 71 and saves an image file that has been received into the memory card 104 together with reception information data indicating the image sender and the like.

In a reproduction mode for producing and displaying image data, a certain erase mode (an individual erase mode) and a certain transmission mode (an individual transmission mode), the CPU 50 reads out image data from the memory card 104, generates display data by processing the image data, sets the display data in the frame memory 69 and displays the display data at the left screen 21. In addition, in response to an operation of an operating key 65, the CPU 50 switches the image data to be reproduced.

If the reproduced image data are received image data having been received from an outside sender, the CPU 50 turns on the LED 29 to indicate that the image currently on display is a received image. In addition, regardless of which operating mode the camera is currently set in, the CPU 50 makes a decision as to whether or not there is any received image file present in the memory card 104 based upon the personal identification data, the file being to be reproduced to the camera user. If it is decided that there is a unreproduced received image file to be sent to the camera user present in the memory card, the LED 28 is turned on to indicate that there is a unreproduced received image file, prompting the user to reproduce the unreproduced image data for verification.

When reproducing and displaying image data, the CPU 50 ensures that the upward side of the image data to be displayed at the right LCD 22 or the left LCD 21 matches the upper side of the electronic camera 100 based upon the attitude information stored together with the image data and also the current attitude information detected by the attitude detection circuit 62.

When reproducing and displaying image data, the CPU 50 displays if necessary the photographing information data, the transmission information data, the reception information data and the like stored together with the image data at the right screen 22.

When reproducing and displaying image data, the CPU 50 outputs via the A/D and D/A conversion circuit 73 the audio information stored together with the image data to the speaker 14, which, in turn, outputs the audio to the outside.

In the erase mode, the CPU 50 erases an image file saved in the memory card 104 in response to an operation of an operating key 65.

In the transmission mode, the CPU 50 transmits an image file saved in the memory card 104 to the outside personal-computer 140, the outside image database 150, the outside electronic camera 170 or the like through the wireless communication circuit 71 in response to an operation of an operating key 65.

An EEPROM 68 (electrically eras able programmable ROM) is a nonvolatile memory in which recipient information and the light necessary for the operations of the electronic camera 100 are stored.

The CPU 50 also allows a message keyword related to image data and an image data recipient to be input to the memory card 104 or the EEPROM 68, based upon text information input through the touch tablets 66, and the text information thus input is appended to the image data and stored in it.

In addition, the operational settings for the electronic camera 100 are effected by the CPU 50 based upon information input through the operating keys 65 in correspondence to the items displayed on the right screen 22.

The power switch 17 is an operating member operated by the user for power control, and the operational information with regard to this switch is provided to the CPU 50. In conformance to this operational information, the CPU 50 engages a power control circuit 64 to implement on/off control on a power source 63 of the electronic camera system. Furthermore, the CPU 50 is capable of checking the power supply capability status of the power source 63 constituted of batteries or the like via the power control circuit 64.

FIGS. 6 through 12 show the hierarchical structure of image files saved in the memory card 104 and the internal data structure adopted in each image file.

Figure 6:
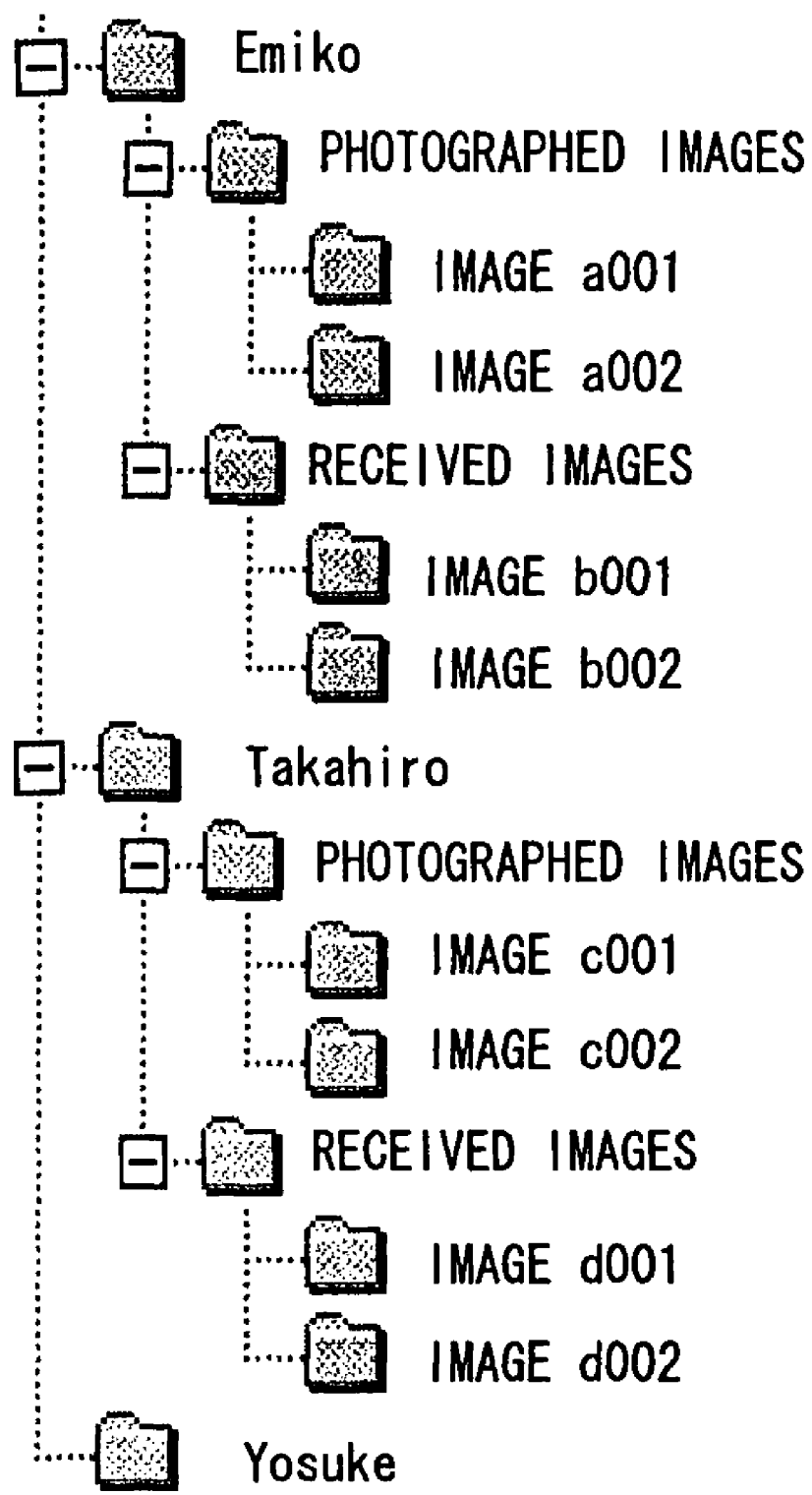
FIG. 6 shows the folder structure assumed within the memory card.

In the hierarchical structure of image files saved in the memory card 104 shown in FIG. 6, folders, each provided for one of the individual users, constitute the highest order stratum (layer), and the second stratum includes folders corresponding to different image attributes in each individual users folder (a folder containing photographed images photographed in the electronic camera 100 and a folder containing received images received by the electronic camera 100 from the outside). In the stratum under each photographed image folder or received image folder, individual image files are stored.

As shown in FIG. 7, each image file is constituted of image data and additional information data (image attribute information data) appended to the image data.

As shown in FIG. 8, the additional information data include transmission information data with regard to an image data transmission to the outside, reception information data with regard to an image data reception, photographing information data obtained when the image data photographing operation is performed, image filename data which is set either automatically or manually to enable file identification, audio information data input through the microphone 15 either during or after the photographing operation, position information data detected at the GPS circuit 61 during the photographing operation, attitude data detected by the attitude detection circuit 62 during the photographing operation, photographing time point data output from the timer 74 during the photographing operation, message information data input through the touch tablets 66 or the like by the photographer after the photographing operation, keyword information data input either automatically or manually to facilitate image search, personal identification data for enabling identification of the photographer, attached image data provided to allow easy and quick identification of the sender and the like.

As shown in FIG. 9, the transmission information data include items such as the image type (indicating whether the image data are photograph image data or received image data), the transmission record (indicating whether or not the image data have been previously transmitted), the transmission-disallow setting (indicating whether or not "transmission disallow (inhibition)" is set for the image data), erase-disallow (inhibition) setting (indicating whether or not "erase disallow" is set for the image data), the attachment setting (indicating whether or not the image data are set to be transmitted as an attachment to other image data) and the transmission history (information indicating past recipients of the image data and the like).

As shown in FIG. 10, the transmission history includes sets of data each constituted of transmission-time-point data indicating a date/time at which the image data were transmitted, recipient data indicating the recipient, recipient reproduction/non-reproduction data indicating whether or not the transmitted data were reproduced at the recipient and reproduction-time-point data. When the image is transmitted, the transmission-time-point data and the recipient data are recorded, "not reproduced" is set for the recipient reproduction record data and "not known" is set for the reproduction-time-point data. As a notification that the image has been reproduced is delivered from the image recipient, the reproduction time point data are recorded accordingly and the recipient reproduction record data are rewritten as "reproduced".

As shown in FIG. 11, the reception information data include items such as the presence/absence of an attached image (indicating whether or not an image for enabling a sender identification is attached to the received image data), the transfer disallow setting (indicating whether or not "transfer disallow" is set for the received image data. The transfer disallow data cannot be rewritten), the reproduction record (indicating whether or not the received image data have been reproduced), the reception date/time-point data, the originator data (data indicating the originator of the received image data: telephone number, IP address, URL: uniform resource locator, etc.).

As shown in FIG. 12, the photographing-information data include identification data used to identify the electronic camera 100 in which the image was photographed and information indicating the various settings selected for the photographing operation.

The following is an explanation of the operations executed in the electronic camera 100 and the CPU 50 described above, given in reference to the drawings.

It is to be noted that the electronic camera 100 can be set in one of four operating modes (the photographing mode, the reproduction mode, the erase mode and the transmission mode) which can be selected with the mode dial 19, as shown in FIG. 13. It is to be also noted that the operations are executed in the four operating modes for one of the individual user's folders shown in FIG. 6 selected based upon the results of the personal identification executed by the personal identification circuit 75.

In the photographing mode, a photographing operation is performed in response to an operation of the shutter release button 16, and an image file constituted of the image data obtained through the photographing operation and the additional information data is stored into the memory card 104.

In the reproduction mode, image data and additional information data stored in the memory card 104 are displayed at the left LCD 21 and the right LCD 22. The image data to be reproduced can be selected by operating the direction buttons 23 and 24. The reproduction mode further includes three reproduction modes, i.e., a photographed image reproduction mode (in which the image files obtained through photographing operations executed in the camera alone can be reproduced), a received image reproduction mode (in which the image files received at the camera alone can be reproduced) and an all image reproduction mode (in which all the image files can be reproduced).

In the erase mode, image files set as erase allowed among the image files stored in the memory card 104 are erased by operating the send/erase button 26. The erase mode further includes seven erase modes, i.e., an individual erase mode (in which the image files individually selected from all the image files are erased), a batch erase mode: all images (in which all the image files are erased in a batch), a batch erase mode: photographed images (in which the photographed image files are erased in the batch), a batch erase mode: received images (in which the received image files from a specific originator are erased in a batch), a batch erase mode: transmitted images (in which all the image files that have already been transmitted are erased in a batch), a batch erase mode: transmitted photographed images (in which the photographed image files that have already been transmitted to a specific recipient are erased in a batch) and a batch erase mode: transmitted received images (in which the received image files that have already been transmitted to a specific recipient are erased in a batch).

In the transmission mode, image files set as transmission allowed among the image files stored in the memory card 104 are transmitted to an outside personal computer, an outside image database, an outside electronic camera or the like, selected as the image recipient by operating the send/erase button 26. The transmission mode further includes seven transmission modes, i.e., an individual transmission mode (in which image files individually selected from all the image files are transmitted), a batch transmission mode: all images (in which all the image files are transmitted in a batch), a batch transmission mode: photographed images (in which the photographed image files are transmitted in a batch), a batch transmission mode: received images (in which the received image files from a specific originator are transmitted in a batch), a batch transmission mode: untransmitted images (in which all the untransmitted image files are transmitted in a batch), a batch transmission mode: untransmitted photographed images (in which the photographed image files that have not been transmitted are transmitted in a batch) and a batch transmission mode: untransmitted received images (in which the received image files that have not been transmitted are transmitted in a batch). It is to be noted that recipient data are input in advance into the electronic camera 100 through the touch tablets 66 or the like and are stored in the form of a recipient list in the EEPROM 68.

Figure 14:
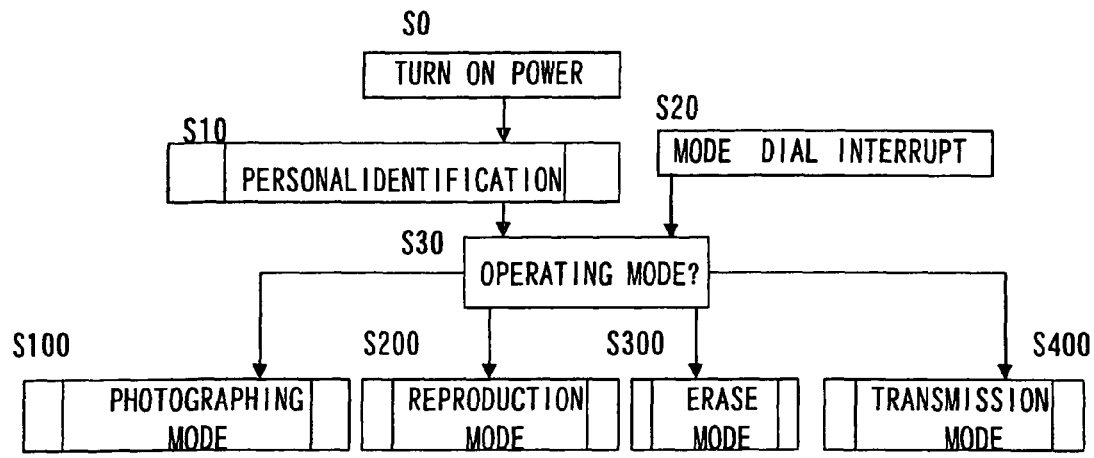
FIG. 14 presents a flowchart of the main operations.

In FIG. 14 presenting a flowchart of the main operations of the CPU 50, the operational flow is started up when the power switch 17 is turned on in S0. In a personal identification subroutine in S10, a personal identification is executed at the personal identification circuit 75. Subsequently, the operations in the following subroutines become focused on image files contained in the individual user folder corresponding to the results of the personal identification. In S30, the operating mode which is currently set is detected based upon the setting position of the mode dial 19 and, based upon the results of this detection, the operation branches off to a photographing mode subroutine in S100, a reproduction mode subroutine in S200, an erase mode subroutine in S300 or a transmission mode subroutine in S400.

It is to be noted that if the mode dial 19 is operated during the execution of a given subroutine, a mode dial interrupt in S20 is effected to prompt the operation to return to S30.

Figure 15:
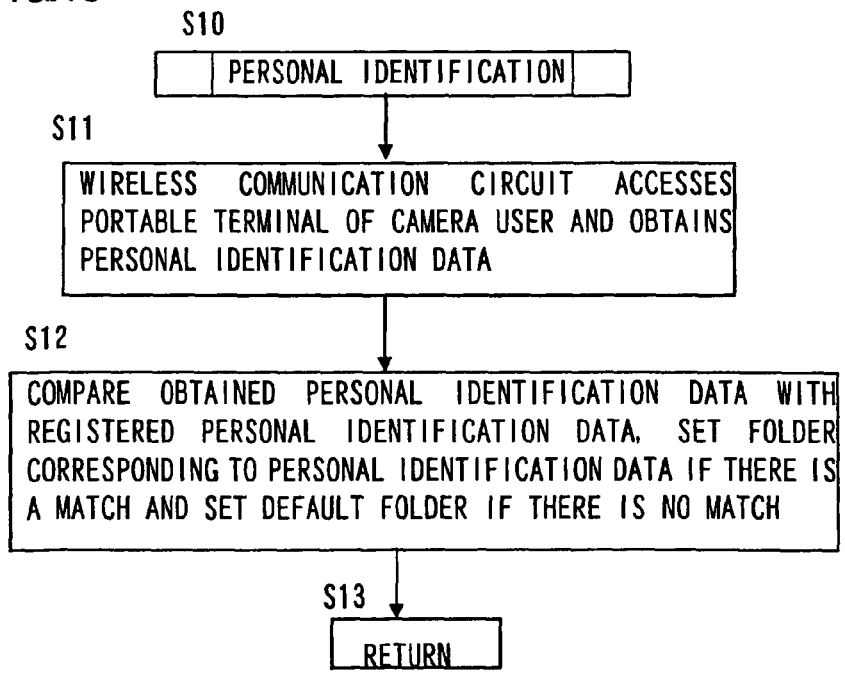
FIG. 15 presents a flowchart of the personal identification subroutine operation.

FIG. 15 shows the personal identification subroutine. After the subroutine is started up in S10, communication is achieved between a wireless portable terminal carried by the user of the electronic camera 100 in which the personal identification data are stored and the wireless communication circuit 71 and the personal identification circuit 75 obtains the personal identification data in S11. In S12, the personal identification circuit 75 compares the personal identification data that have been obtained with personal identification data pre-registered and recorded in the EEPROM 68 and sets the folder corresponding to the obtained personal identification data if there is a match. If there is no matching, on the other hand, the personal identification circuit 75 sets the default folder. In addition, the personal identification data are recorded as the personal identification data corresponding to the image file subsequently obtained through the photographing operation. The operation makes a return in S13.

Figure 16:
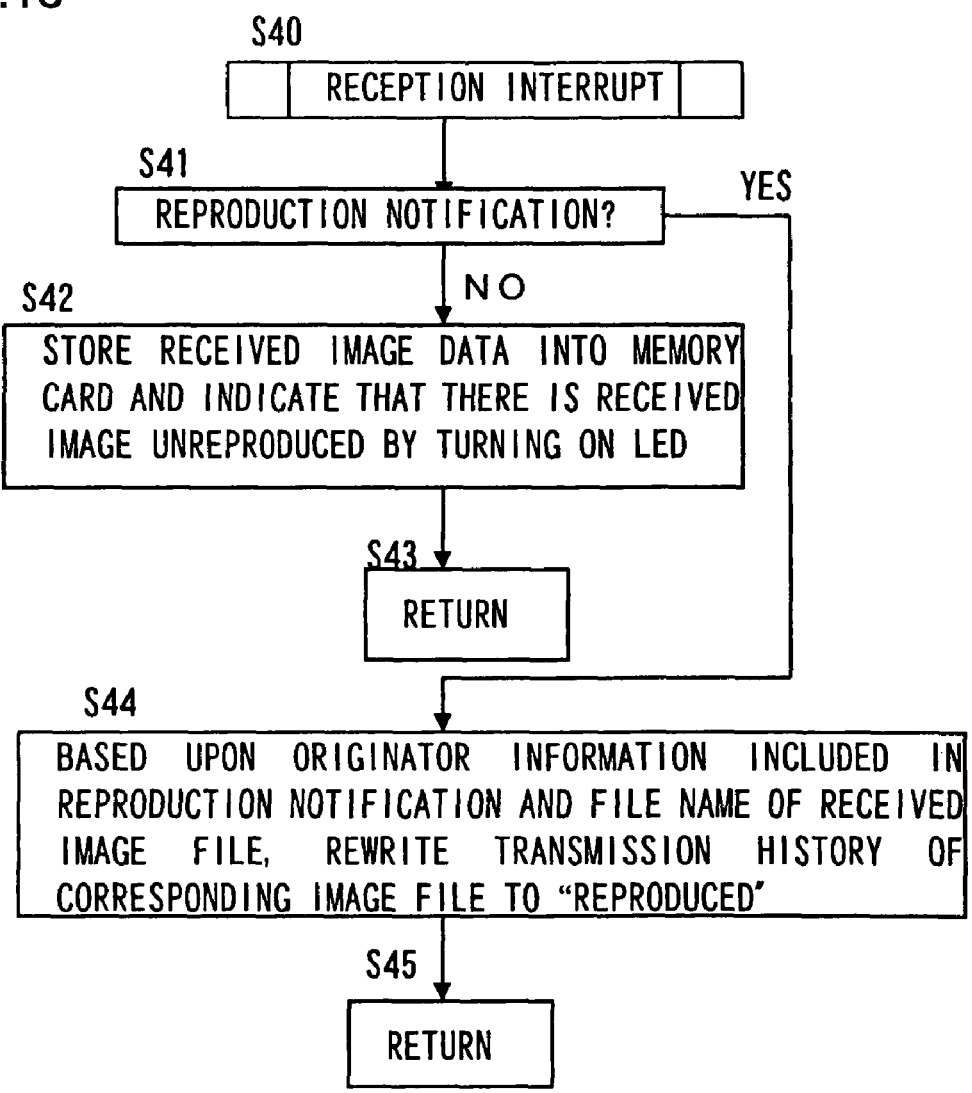
FIG. 16 presents a flowchart of the reception-interrupt-processing operation.

In the reception interrupt processing shown in FIG. 16, which is executed in response to a request for an information transmission received at the wireless communication circuit 71 from the outside, after a reception interrupt occurs in S40, a verification is made in S41 as to whether or not a transmission request has been received in the form of an image reproduction notification, and if it is judged that the transmission request is not constituted of an image reproduction notification, an image file is received in S42. In addition, the transmission information data (image type: received image, transmission record: untransmitted, transmission-disallow setting: allowed. However, transmission is disallowed if "transfer disallowed" is indicated in the transfer disallow data attached to the received image data, erase-disallow setting: allowed, attachment setting: not set and transmission history: no transmission) and the reception information data (reproduction record: not reproduced, reception date/time point data, originator data, transfer disallow setting: as indicated in the transfer disallow data attached to the received image data, attached image: set in conformance to whether or not there are any attached image data) are prepared, and the information data thus prepared are stored together with the received image file into the received image folder in the individual user folder in the memory card 104 corresponding to the recipient data attached to the image file. In addition, if the received image file has been addressed to the current user of the electronic camera 100, the LED 28 is turn on to indicate that there is an image file unreproduced. The operation then makes a return in S43.

If, on the other hand, it is decided in S41 that the transmission request has been received in the form of an image reproduction notification, the image file name data, data indicating the sender of the image reproduction notification and the reproduction time point data included in the image reproduction notification are referenced, the reproduction time-point data are recorded into the transmission history of the image file and the recipient reproduction record is rewritten as "reproduced" in S44. For instance, if the sender of the image reproduction notification corresponds to recipient data 1 in FIG. 10, reproduction time-point data 1 are written into the transmission history and the recipient reproduction record 1 is rewritten as "reproduced".

Figure 17:
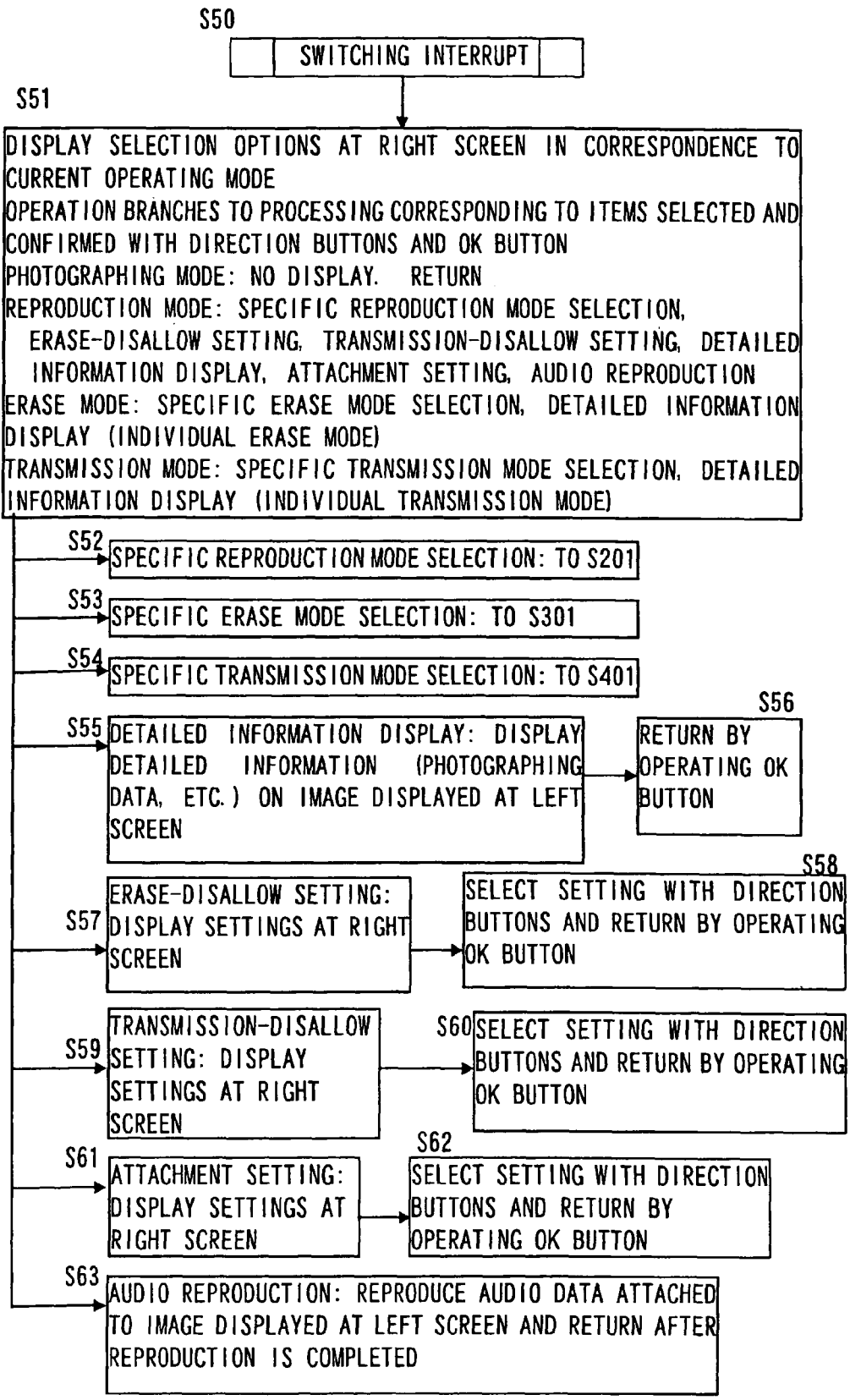
FIG. 17 presents a flowchart of the switching-interrupt-processing operation.

In a switching interrupt shown in FIG. 17, which is started up in response to an operation of the SWITCH button 25, after a switching interrupt occurs in S50, selection options are brought up on display at the right screen 22 in correspondence to the operating mode setting effective at the time of the switching operation performed through the SWITCH button 25 in S51.

If the SWITCH button 25 is operated in the photographing mode, an operation makes a return without updating the display at right screen 22.

Figure 18:
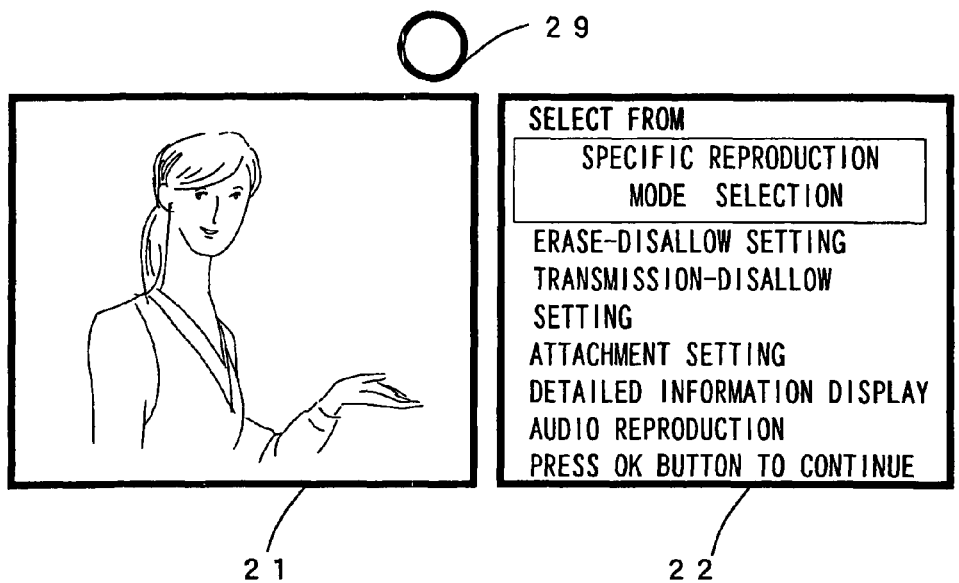
FIG. 18 presents an example of a screen display that may be brought up at the time of a switching interrupt.

If the SWITCH button 25 is operated in the reproduction mode, selection options, "specific reproduction mode selection", "erase disallowed setting", "transmission disallowed setting", "attachment setting", "detailed information display" and "audio reproduction", are displayed at the right screen 22 as shown in FIG. 18.

Figure 19:
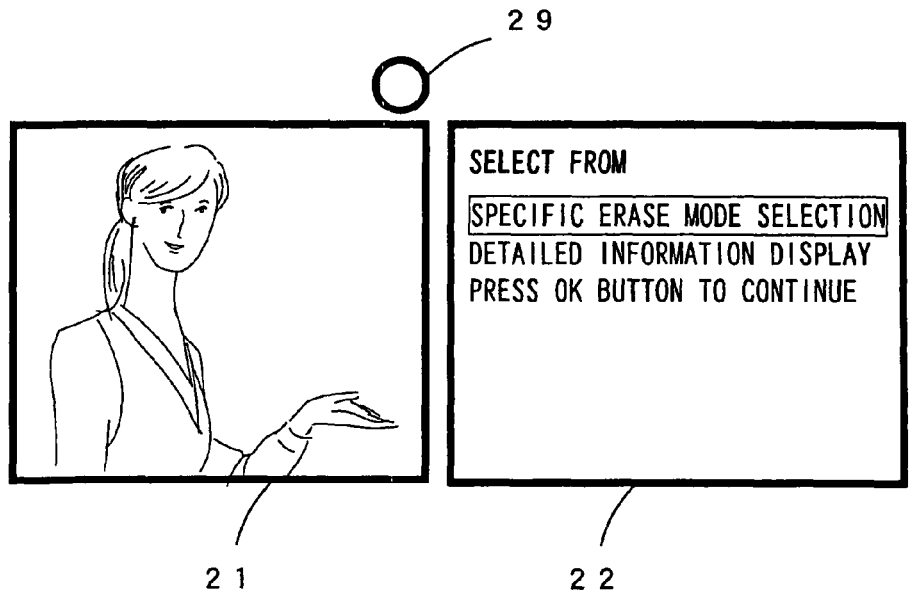
FIG. 19 presents an example of a screen display that may be brought up at the time of a switching interrupt.

If the SWITCH button 25 is operated in the erase mode, selection options including, "specific erase mode selection" and "detailed information display" (only in the individual erase mode) are displayed at the right screen 22, as shown in FIG. 19.

Figure 20:
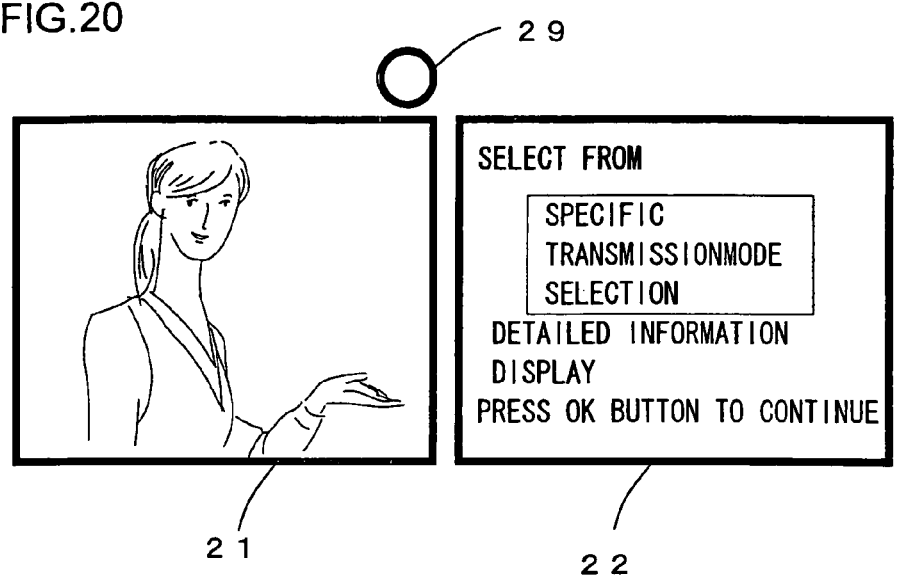
FIG. 20 presents an example of a screen display that may be brought up at the time of a switching interrupt.

If the SWITCH button 25 is operated in the transmission mode, selection options including, "specific transmission mode selection" and "detailed information display" (only in the individual transmission mode) are displayed at the right screen 22 as shown in FIG. 20.

A selection is made from the items displayed at the right screen 22 by operating the direction buttons 23 and 24 (the selected item is enclosed within a square on the display and the position of the square is moved up/down by operating the direction buttons 23 and 24) in FIG. 18, 19 or 20, and the selection of a given item is confirmed by operating the OK button 27. Subsequently, the operation branches to the processing corresponding to the selected and confirmed item.

If the item "specific reproduction mode selection" is selected, the operation makes a jump in S52 in FIG. 17 to S201 to select a specific reproduction mode. If the item, "specific erase mode selection" is selected, the operation makes a jump in S53 to S301 to select a specific erase mode. If the item "specific transmission mode selection" is selected, the operation makes a jump in S54 to S401 to select a specific transmission mode.

Figure 21:
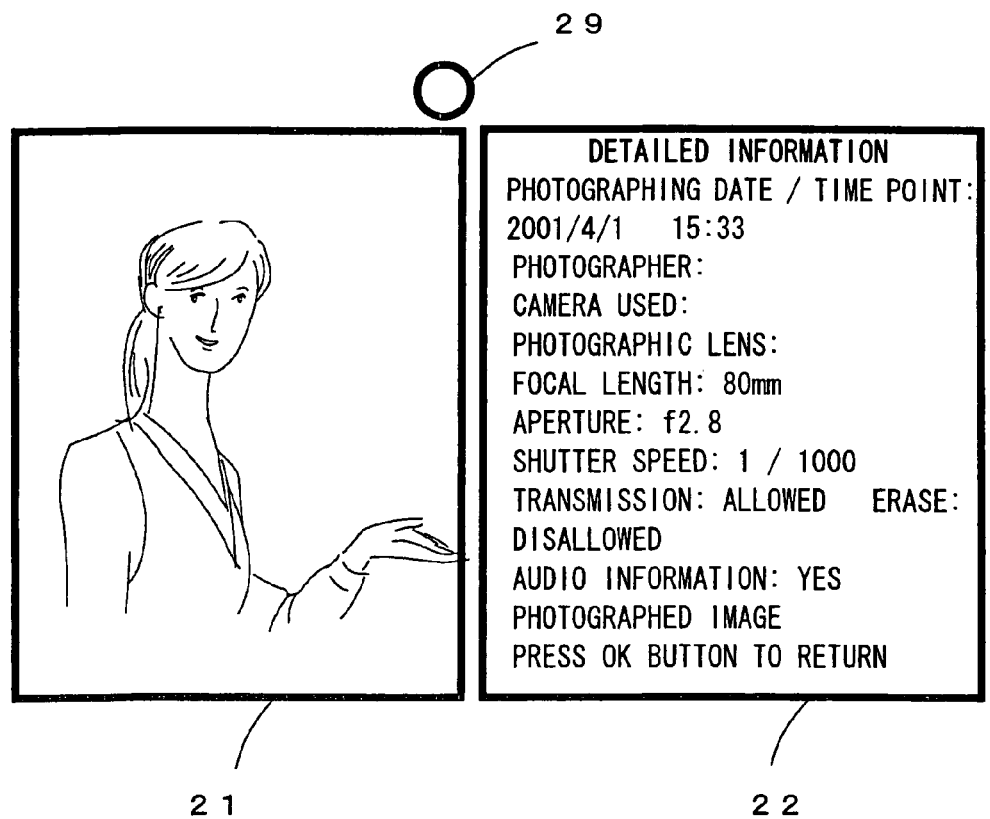
FIG. 21 presents an example of a screen display that may be brought up at the time of a switching interrupt.

If the item "detailed information display" is selected, detailed information (photographing data and the like) on the image currently displayed at the left screen 21 is brought up on display at the right screen 22 as shown in FIG. 21. Then, in S56, the operation makes a return from the switching interrupt in response to an operation of the OK button 27.

Figure 22:
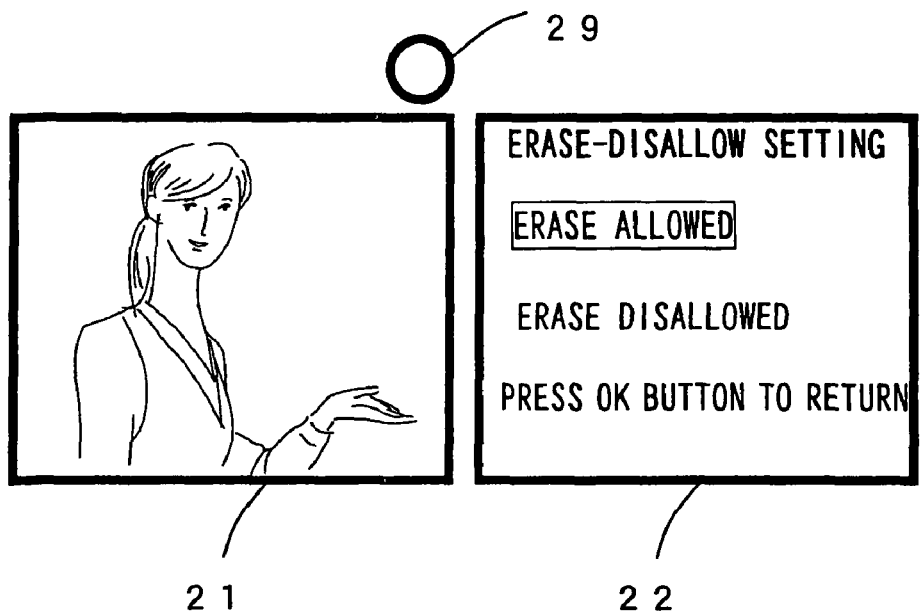
FIG. 22 presents an example of a screen display that may be brought up at the time of a switching interrupt.

If the item "erase-disallow setting" is selected, erase disallowed/allowed settings are displayed at the right screen 22 for the image currently displayed at the left screen 21 in S57 as shown in FIG. 22. In S58, either erase disallowed or erase allowed is selected by using the direction buttons 23 and 24, the selected setting is written into the transmission information data in response to an operation of the OK button 27 and then the operation makes a return from the switching interrupt.

Figure 23:
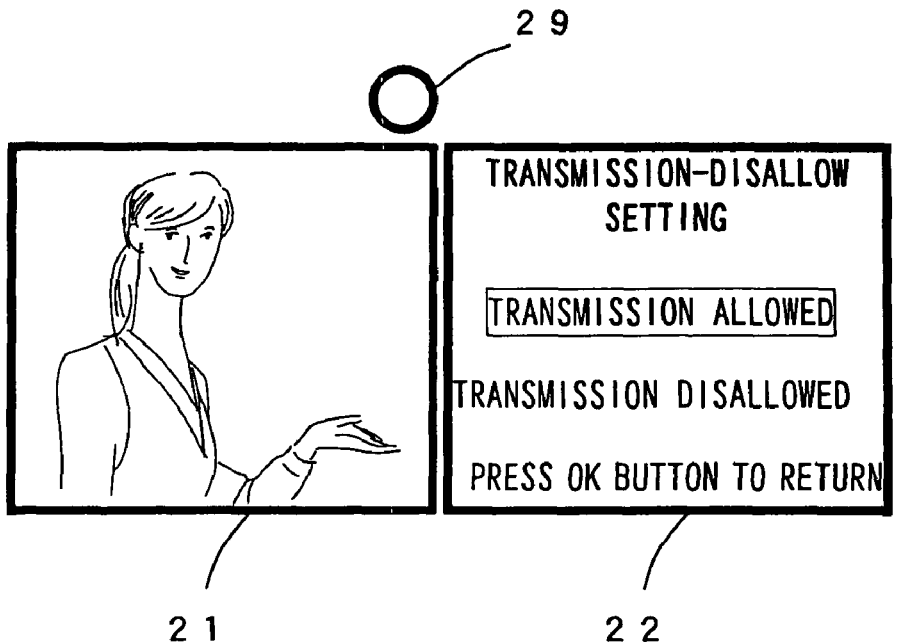
FIG. 23 presents an example of a screen display that may be brought up at the time of a switching interrupt.

If the item "transmission-disallow setting" is selected, transmission disallowed/allowed settings are displayed at the right screen 22 in S59, as shown in FIG. 23. Either transmission disallowed or transmission allowed is selected with the direction buttons 23 and 24, the selected setting is written into the transmission information data in response to an operation of the OK button 27 and then the operation makes a return from the switch interrupt in S60. It is to be noted that once a received image file is set as transfer disallowed, the setting cannot be changed to "transmission allowed" by selecting "transmission allowed" for the transmission-disallow setting. In addition, the data set to disallow transfer cannot be overwritten.

Figure 24:
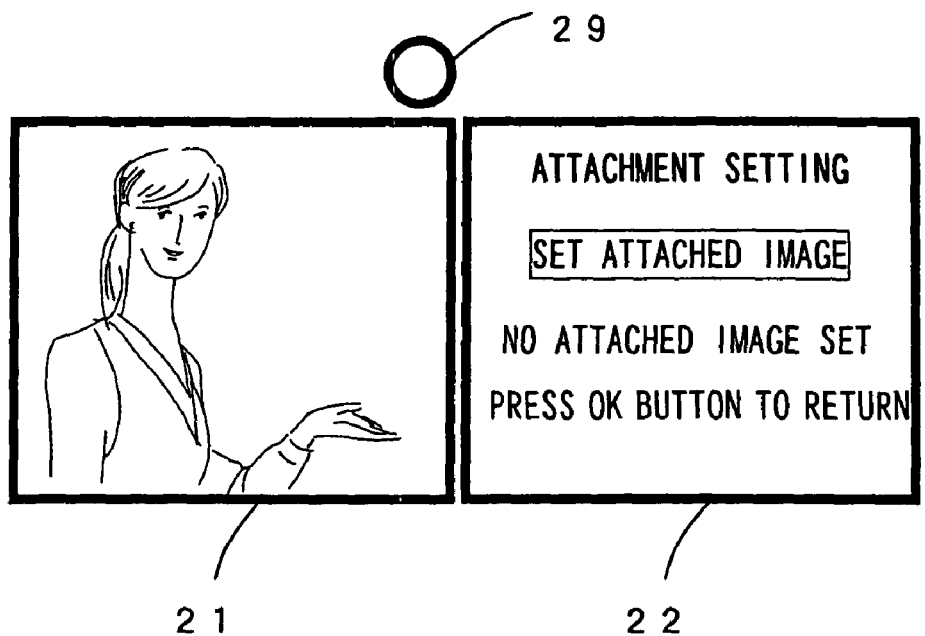
FIG. 24 presents an example of a screen display that may be brought up at the time of a switching interrupt.

If the item "attachment setting" is selected, options for setting/not setting the image as an attached image are displayed at the right screen 22 in S61 as shown in FIG. 24. In S62, either of the options for setting/not setting the image as an attached image is selected with the direction buttons 23 and 24, the selected setting is written into the transmission of information data by operating the OK button 27 and the operation makes a return from the switching interrupt. It is to be noted that only a single set of image data can be set as an attached image and that the image data most recently set as an attached image are a valid attached image.

If the item "audio reproduction" is selected, the audio data attached to the image currently displayed at the left screen 21 are reproduced through the speakers 14 and then the operation makes a return from the switching interrupt when the audio reproduction is completed in S63.

Figure 25:
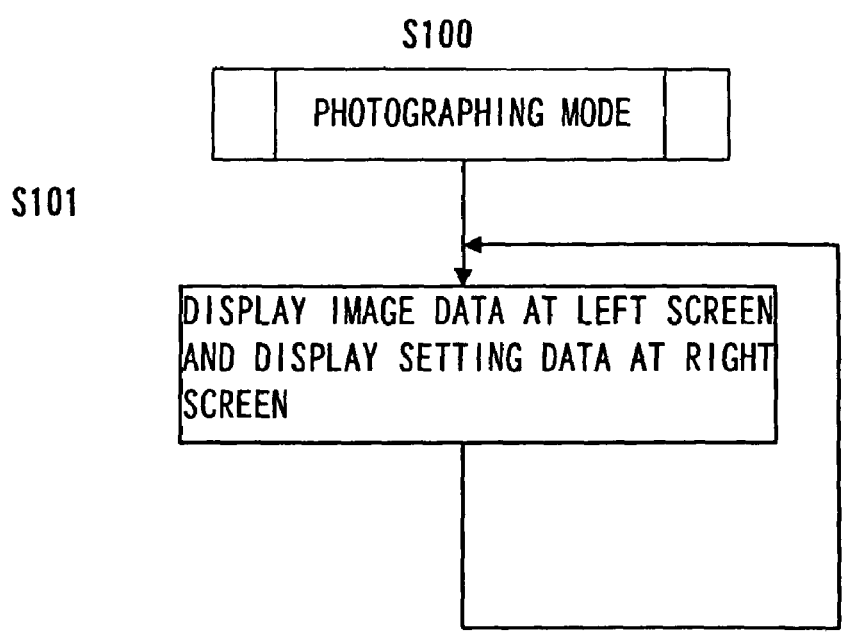
FIG. 25 presents a flowchart of the photographing mode subroutine operation.
Figure 26:
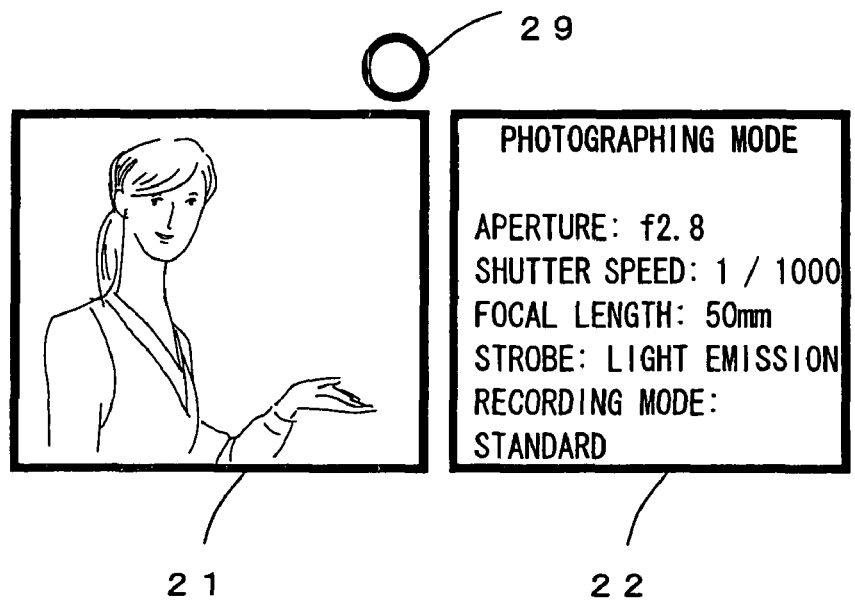
FIG. 26 presents an example of a screen display brought up in the photographing mode.

FIG. 25 presents a flowchart of the photographing mode subroutine. After the subroutine is started up in S100, the operation proceeds to S101 in which through image data of the image currently captured by the CCD 55 are displayed at the left screen 21 and the photographing data indicating the current settings are continuously displayed at the right screen 22, as shown in FIG. 26.

Figure 27:
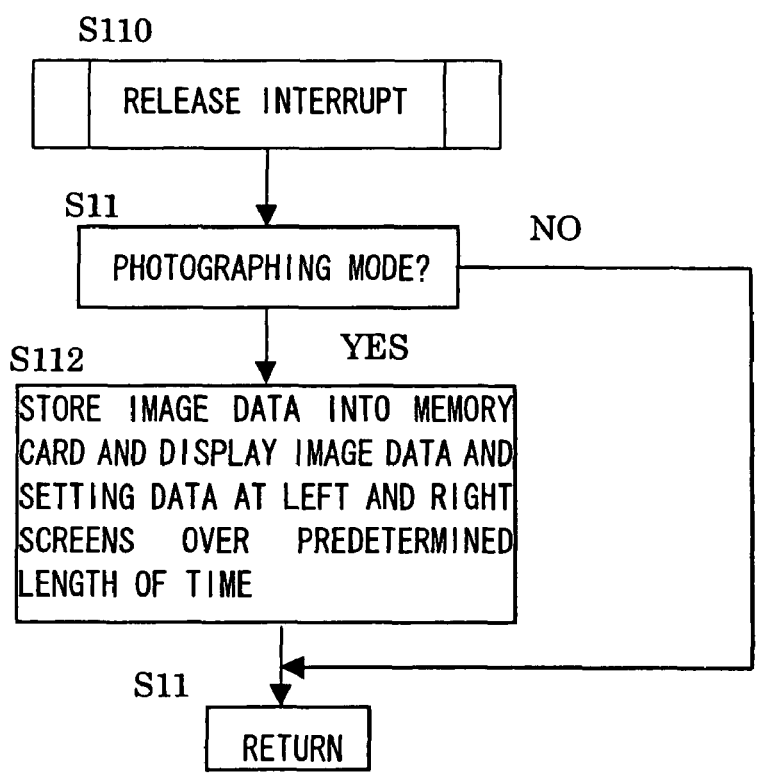
FIG. 27 presents a flowchart of the release interrupt processing operation.

If the shutter release button 16 is operated in the photographing mode, the release interrupt processing shown in FIG. 27 is executed. After a release interrupt is started up in S110, the operating mode is checked in S111 and the operation makes a return in S113 if the camera is a set in a mode other than the photographing mode. If, on the other hand, it is verified that the electronic camera is set in the photographing mode, an image-capturing operation is executed at the CCD 55 in S112 to obtain image data. In addition, the transmission information data (image type: photographed image, transmission record: not transmitted, transmission-disallow setting: allowed, erase-disallow setting: allowed, attachment setting: not set, no transmission history) and the reception information data (attached image: no past transmission), transfer disallow setting: allowed, reproduction record: reproduced, reception date/time point data: none, sender data: none), the photographing information data and other data (image file name data, audio information data, position information data, attitude data, photographing time point data, message information data, keyword information data, personal identification data) and the like are prepared as the additional information data and an image file containing the additional information data as well as the image data is stored into the photographed image folder in the individual user folder in the memory card 104. After the stored image data and the photographing data are displayed over a predetermined length of time at the left screen 21 and at right screen 22 respectively for a verification, the operation makes a return in S113.

Figure 28:
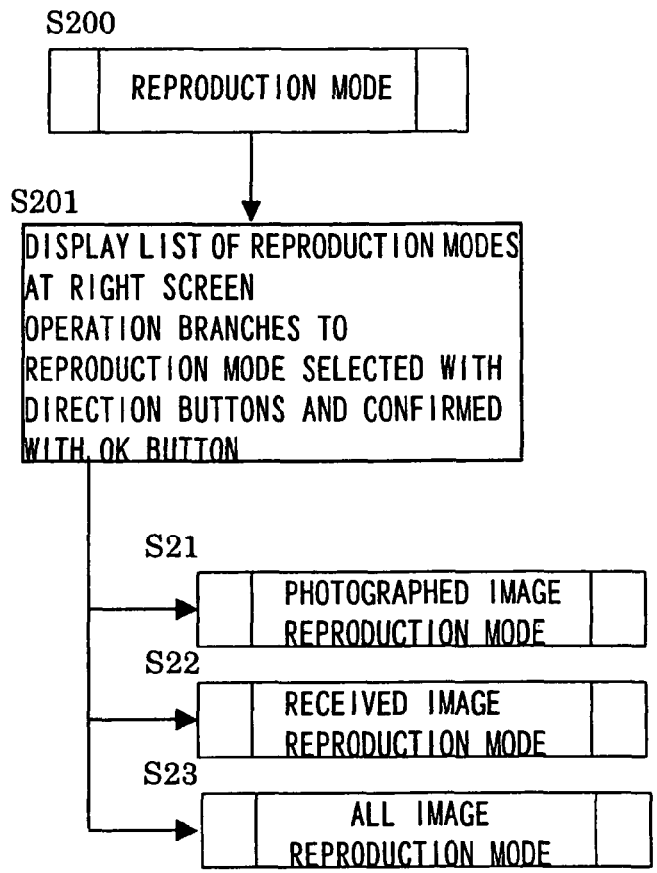
FIG. 28 presents a flowchart of the reproduction mode subroutine operation.
Figure 29:
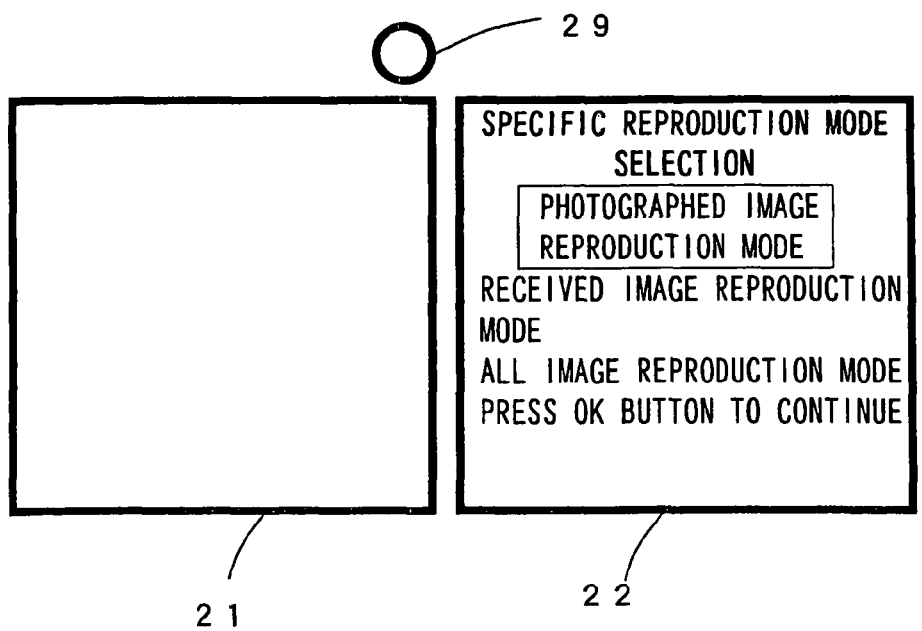
FIG. 29 presents an example of a screen display that may be brought up in the reproduction mode.

FIG. 28 presents a flowchart of the reproduction mode subroutine. After the subroutine is started up in S200, a list of various reproduction modes is brought up on display at the right screen 22, as shown in FIG. 29, to allow the user to select a specific reproduction mode in S201. After one of the reproduction modes displayed at the right screen 22 is selected by operating the direction buttons 23 and 24 (the selected item is enclosed by the square in the display shown in FIG. 29 and the position of the square is moved up/down by operating of the direction buttons 23 and 24), the selection of the reproduction mode is confirmed by operating the OK button 27. If the photographed image reproduction mode is selected, the operation branches to the photographed image reproduction mode subroutine in S210. If the received image reproduction mode is selected, the operation branches to the received image reproduction mode subroutine in S220. If the all image reproduction mode is selected, the operation branches to the all image reproduction mode subroutine in S230.

Figure 30:
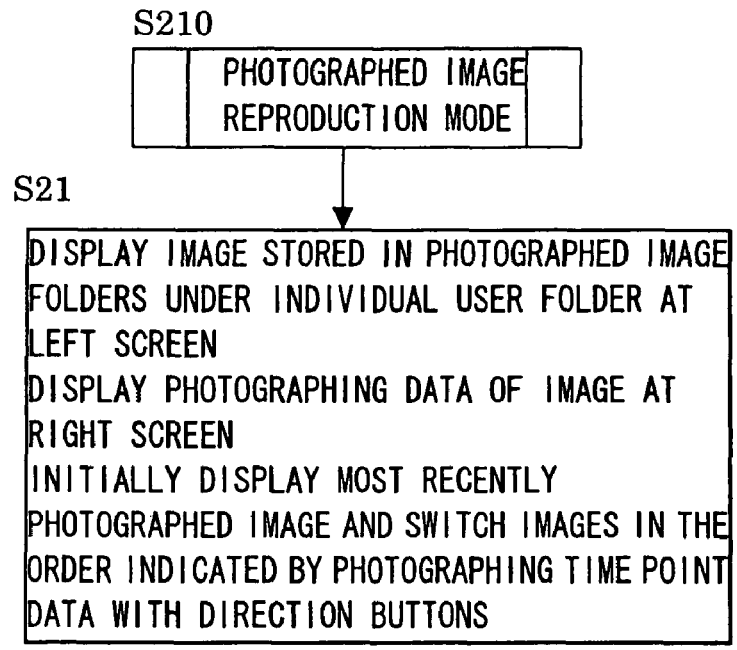
FIG. 30 presents a flowchart of the photographed-image-reproduction mode subroutine operation.
Figure 31:
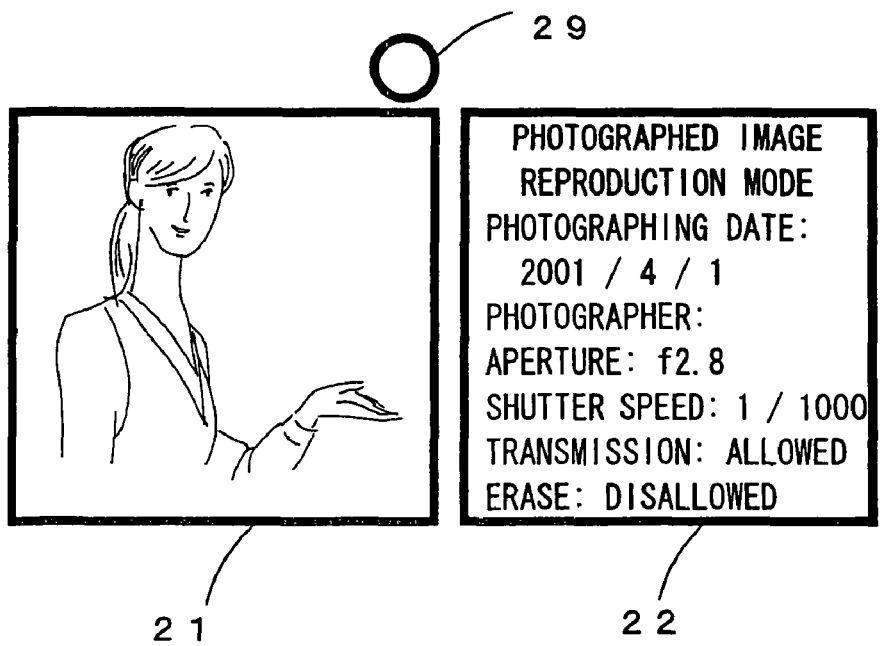
FIG. 31 presents an example of a screen display that may be brought up in the photographed-image-reproduction mode.

FIG. 30 shows the photographed image reproduction mode subroutine. After the subroutine is started up in S210, the image data stored in the photographed image folder under the individual user folder in the memory card 104 are displayed, one image at a time, at the left screen 21, as shown in FIG. 31, in S211. In addition, the photographing data, the erase-disallow setting state and the transmission-disallow (prohibition)

setting state corresponding to the photograph image data currently on display at the left screen 21 are displayed at the right screen 22. The image data with the most recent photographing date/time are displayed first and, subsequently, the direction buttons 23 and 24 are operated to switch the display to bring up older image data or newer (more recent) image data in conformance to the chronological order of the photographing date/times.

Figure 32:
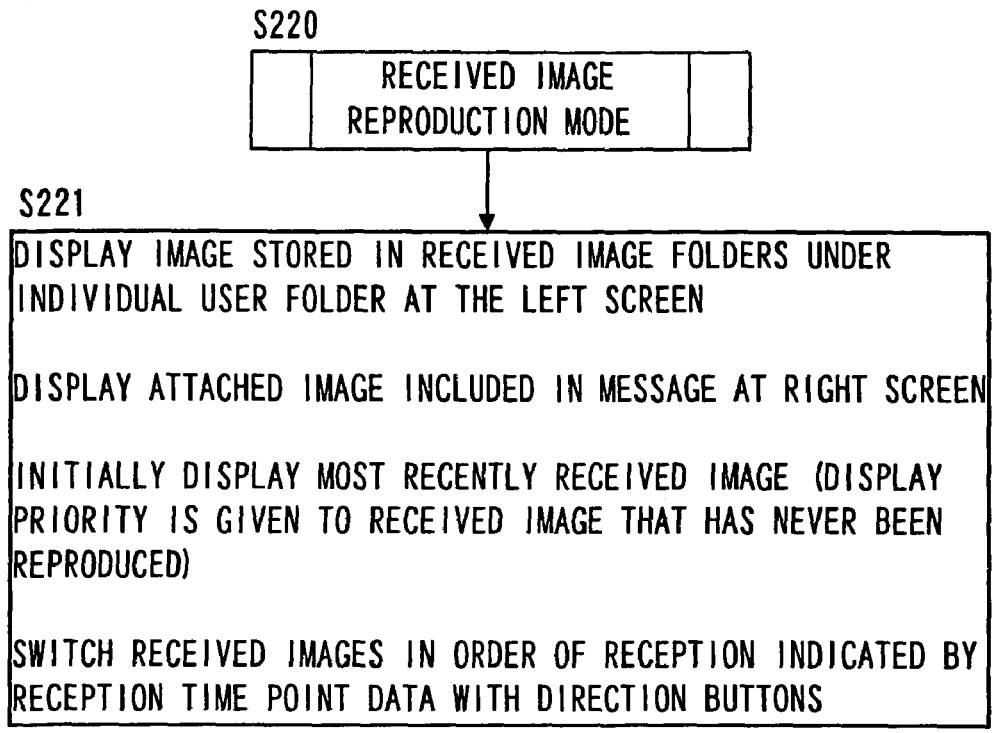
FIG. 32 presents a flowchart of the received image reproduction mode subroutine operation.
Figure 33:
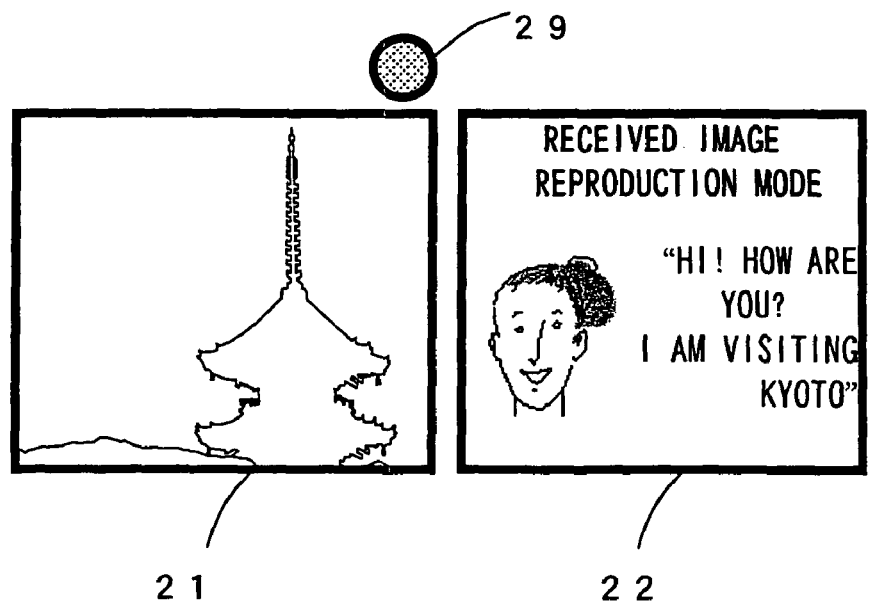
FIG. 33 presents an example of a screen display that may be brought up in received image reproduction mode.

FIG. 32 shows the received image reproduction mode subroutine. After the subroutine is started up in S220, the image data stored in the received image folder in the individual user folder in the memory card 104 are displayed, one image at a time, at the left screen 21, as shown in FIG. 33, in S221. In addition, attached image data (such as a face image) and a message corresponding to the received image data currently on display at the left screen 21 are displayed at the right screen 22. If there are no attached image data, the data indicating the image originator or the personal identification data corresponding to the image originator are displayed. The image data with the most recent reception date/time are displayed first and, subsequently, the direction buttons 23 and 24 are operated to switch the display to bring up older image data or newer image data in conformance to the chronological order of the reception date/times. In addition, when received image data are displayed at the left screen 21, the LED 29 is turned on to indicate that the image data on display are of received image data.

It is to be noted that if there are received image data addressed to the user, which have not been reproduced in the electronic camera 100, the received image data that have not been reproduced are given priority for display regardless of the chronological reception date/time order. In addition, if such received image data that have never been reproduced are reproduced, the reproduction record in the reception information data appended to the image data is changed to "reproduced" and a notification indicating that the received image has been reproduced is issued to the originator of the received image. This image reproduction notification includes the image file name data, data indicating the sender of the notification and data indicating the reproduction time point. When there are no more received and unreproduced image data addressed to the user left after the image reproduction, the LED 28 is turned off to indicate that there are no received image data left in unreproduced state. It is to be noted that an image file is judged to have been reproduced/not reproduced based upon the reproduction record setting in the transmission information data shown in FIG. 9.

Figure 34:
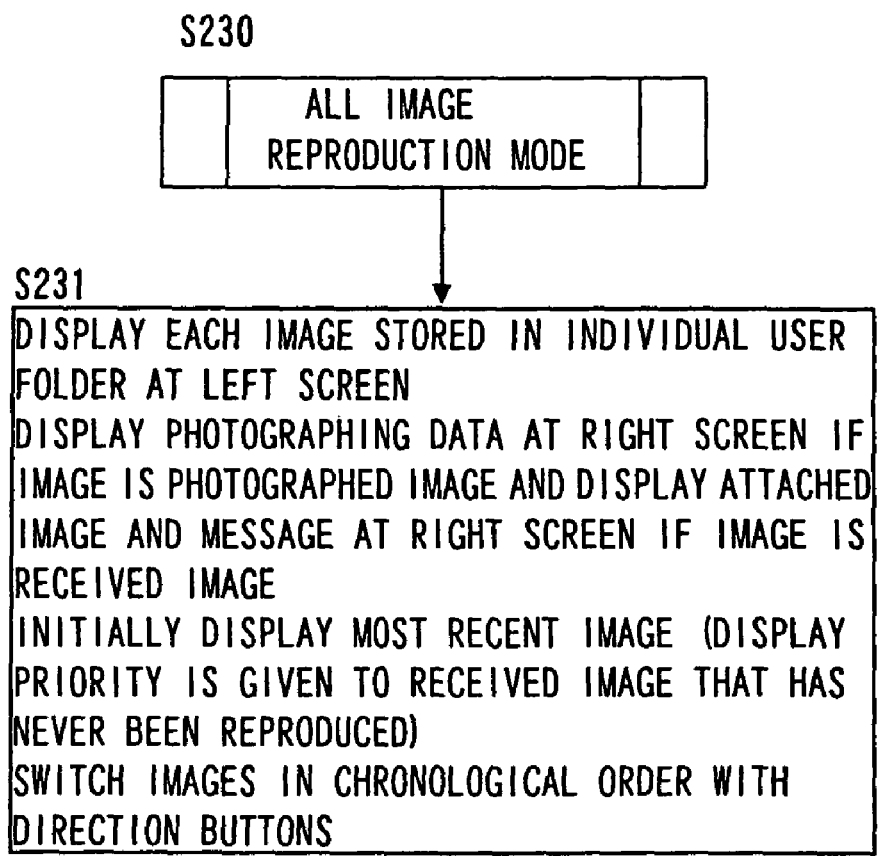
FIG. 34 presents a flowchart of the all image reproduction mode subroutine operation.

FIG. 34 shows the all image reproduction mode subroutine. After the subroutine is started up in S230, all the image data (the photographed images and the received images) stored in the individual user folder in the memory card 104 are displayed, one image at a time, at the left screen 21 in S231. In addition, depending upon the type of image data currently on display at the left screen 21 (photographed image/received image), the photographing data, the erase-disallow setting and the transmission-disallow setting are displayed for photograph image data or attached image data and a message are displayed for received image data at the right screen 22. If there are no attached image data, the data indicating the image originator or the personal identification data corresponding to the image originator are displayed. The image data are displayed in chronological order, with the image data with the most recent photographing date/time or the most recent reception date/time displayed first and, subsequently, the display is switched after an operation of the direction buttons 23 and 24 to show older image data or newer image data in the chronological order. In addition, the LED 29 is turned on when displaying received image data at the left screen 21 to indicate that the image data on display are received image data.

It is to be noted that if there are any received image data addressed to the user which have not been reproduced, the received image data that have not been reproduced are given priority for display regardless of the chronological order of photographing date/times or reception date/times. In addition, when received image data that have never been reproduced are reproduced, the reproduction record setting in the reception information data appended to the image data is changed to "reproduced" and a notification indicating that the received image has been reproduced is issued to the originator of the received image. This image reproduction notification includes the image file name data, data indicating the sender of the notification and data indicating the reproduction time point. When there are no more received image data addressed to the user that are unreproduced following the image reproduction, the LED 28 is turned off to indicate that there are no received image data unreproduced. It is to be noted that an image file is judged to have been reproduced/not reproduced based upon the reproduction record setting in the transmission information data shown in FIG. 9.

It is to be noted that if there is no image file that can be reproduced in any of the reproduction modes, a message indicating that there is no image file for reproduction is displayed at the right screen 22.

Figure 35:
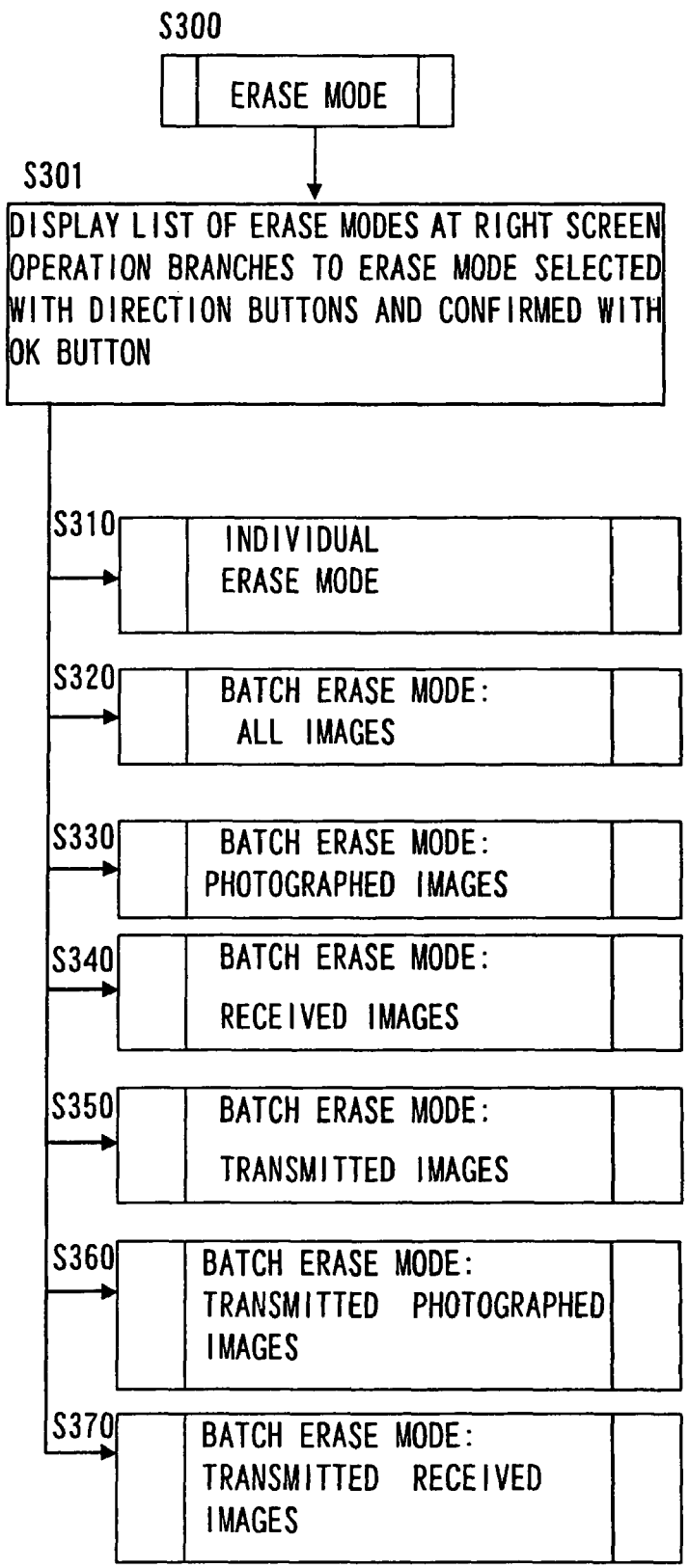
FIG. 35 presents the a flowchart of the erase mode subroutine operation.
Figure 36:
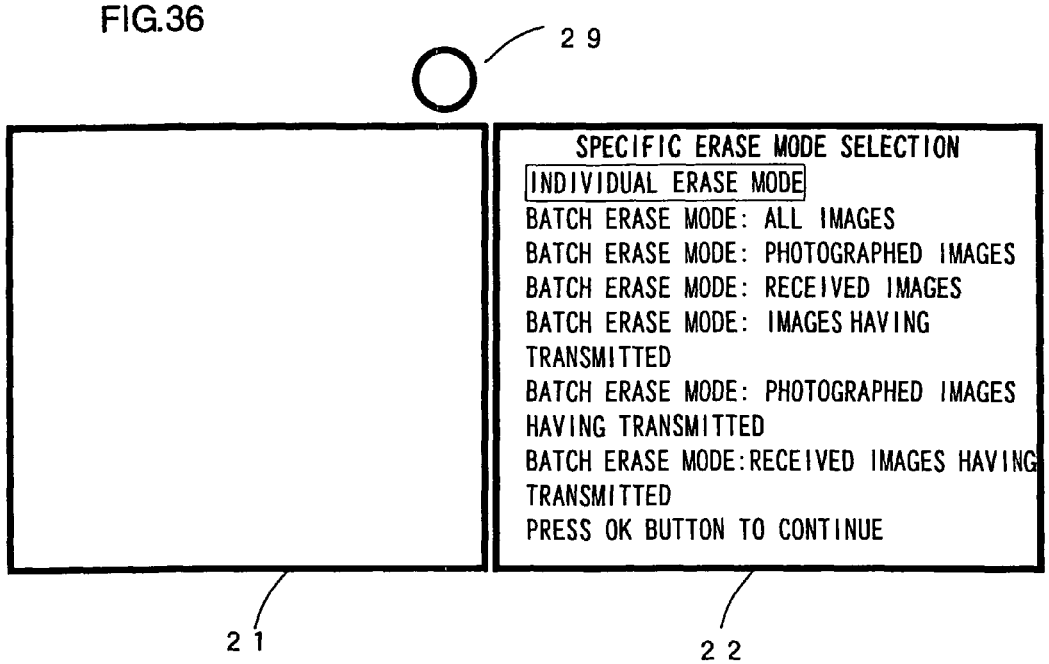
FIG. 36 presents an example of a screen display that may be brought up in the erase mode.

FIG. 35 presents a flowchart of the erase mode subroutine. After the subroutine is started up in S300, a list of various erase modes is displayed at the right screen 22 to enable the user to select the desired erase mode, as shown in FIG. 36, in S301. After one of the erase modes displayed at the right screen 22 is selected by operating the direction buttons 23 and 24 (the selected item is enclosed by the square in the display shown in FIG. 36 and the position of the square is moved up/down by operating the direction buttons 23 and 24), the selection of the erase mode is confirmed by operating the OK button 27.

If the individual erase mode is selected, the operation branches to the individual erase mode subroutine in S310. If the batch erase mode for all images is selected, the operation branches to the batch erase mode for all image subroutine in S320. If the batch erase mode for photographed images is selected, the operation branches to the batch erase mode for photographed image subroutine in S330. If the batch erase mode for received images is selected, the operation branches to the batch erase mode: received image subroutine in S340. If the batch erase mode for transmitted images is selected, the operation branches to the batch erase mode for transmitted image subroutine in S350. If up batch erase mode for transmitted photographed images is selected, the operation branches to the batch erase mode for transmitted photographed image subroutine in S360. If the batch erase mode for transmitted received images has been selected, the operation branches to the batch erase mode for transmitted received image subroutine in S370.

Figure 37:
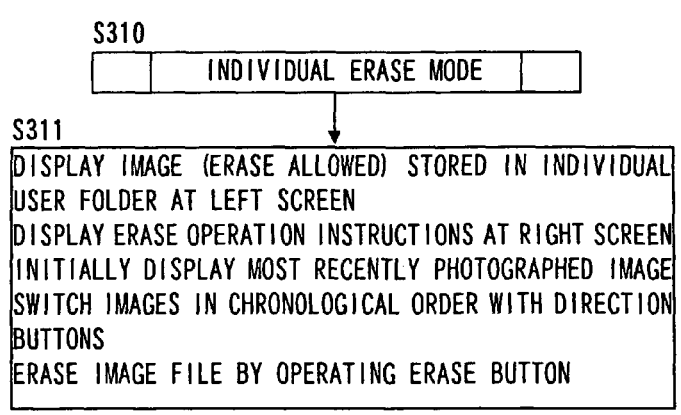
FIG. 37 presents a flowchart of the individual erase mode subroutine operation.
Figure 38:
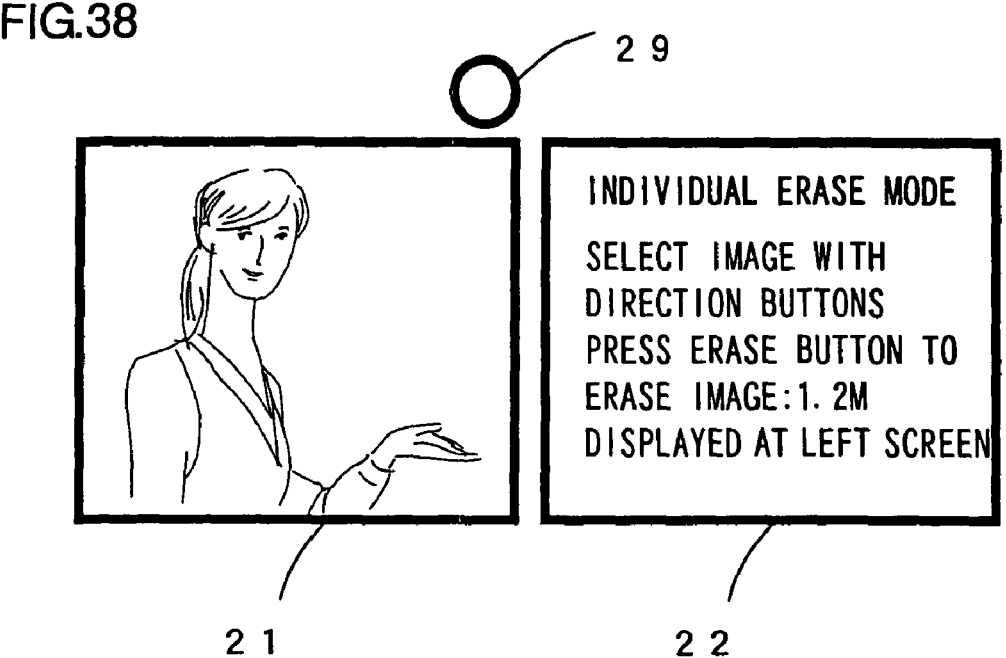
FIG. 38 presents an example of a screen display that may be brought in the individual erase mode.

FIG. 37 shows the individual erase mode subroutine. After the subroutine is started up in S310, all the image data stored in the individual user folder in the memory card 104 (only the image files set as erase allowed) are displayed one image at a time at the left screen 21, as shown in FIG. 38, in S311. In addition, the data volume of the image currently displayed at the left screen 21 and the instructions for the image erase operation in the individual erase mode are displayed at the right screen 22. The image data are displayed in chronological order, with the image data with the most recent photographing date/time or the most recent reception date/time displayed first and, subsequently, the display is switched after an operation of the direction buttons 23 and 24 to show sequentially older image data or newer image data in the chronological order. In addition, the LED 29 is turned on when displaying received image data at the left screen 21 to indicate that the image data on display are received image data.

Also, when received image data that have never been reproduced are reproduced and displayed, the reproduction record setting in the reception information data appended to the image data is changed to "reproduced" and a notification indicating that the received image has been reproduced is issued to the originator of the received image. This image reproduction notification includes the image file name data, data indicating the sender of the notification and data indicating the reproduction time point. When there are no more received image data addressed to the user that are unreproduced following the image reproduction executed to enable the user to select images to be erased, the LED 28 is turned off to indicate that there are no received image data unreproduced. The image file currently displayed at the left screen 21 is erased from the memory card 104 in response to an operation of the send/erase button 26. It is to be noted that a given image file is judged to be set as erase allowed or erase disallowed based upon the erase-disallow setting in the transmission information data shown in FIG. 9.

Figure 39:
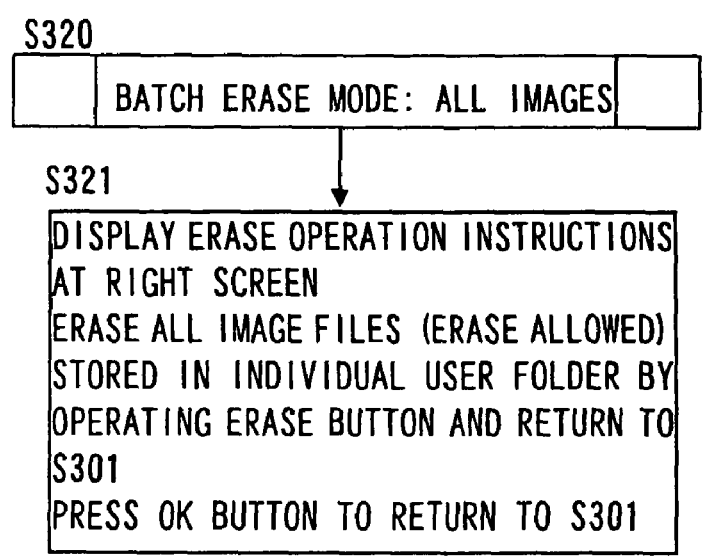
FIG. 39 presents a flowchart of the batch erase mode: all image subroutine operation.
Figure 40:
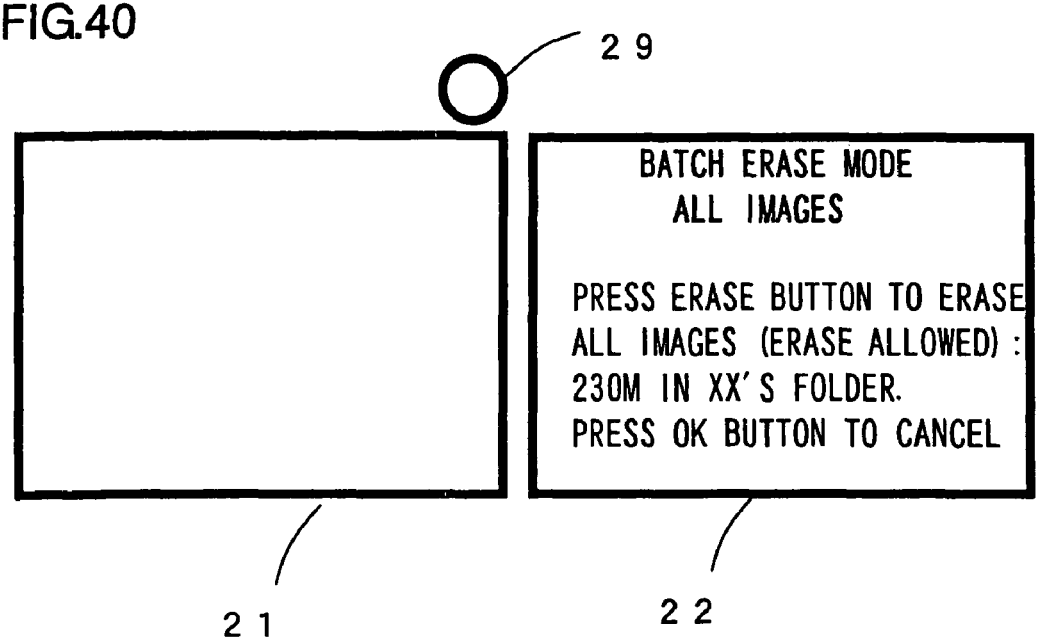
FIG. 40 presents an example of a screen display that may be brought up in the batch erase mode: all images.

FIG. 39 shows the batch erase mode for all image subroutine. After the subroutine is started up in S320, the total data volume of the images to be erased and the instructions for the image erase operation in the batch erase mode for all images are displayed at the right screen 22 without displaying any image data at the left screen 21, as shown in FIG. 40, in S321. All the image files stored in the individual user folder (the image files set as erase allowed excluding received image files unreproduced) are erased from the memory card 104 in response to an operation of the send/erase button 26, and then the operation returns to S301 for an erase mode selection. If, on the other hand, the OK button 27 is operated the batch erase mode for all images is canceled and then the operation returns to S301 for an erase mode selection.

Figure 41:
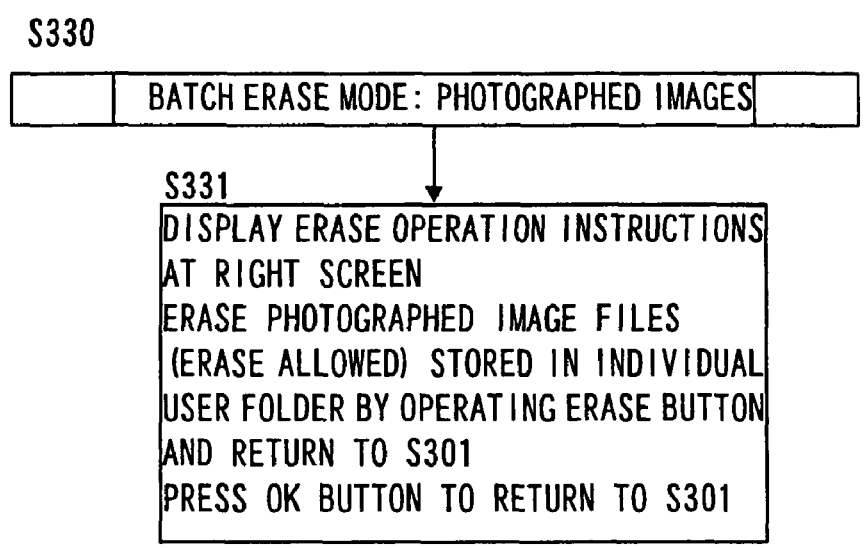
FIG. 41 presents a flowchart of the batch erase mode: photographed image subroutine operation.
Figure 42:
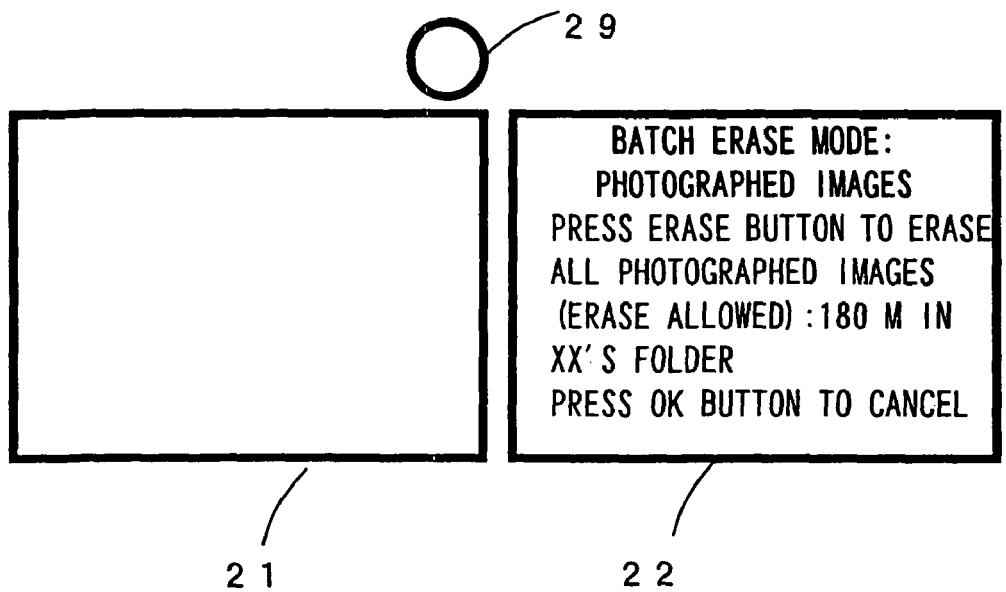
FIG. 42 presents an example of a screen display that may be brought up in the batch erase mode: photographed images.

FIG. 41 shows the batch erase mode for photographed image subroutine. After the subroutine is started up in S330, the total data volume of the images to be erased and the instructions for the image erase operation in the batch erase mode for photographed images are displayed at the right screen 22 without displaying any image data at the left screen 21, as shown in FIG. 42, in S331. All the photographed image files stored in the photographed image folder in the individual user folder (the image files set as erase allowed) are erased from the memory card 104 in response to an operation of the send/erase button 26, and then the operation returns to S301 for an erase mode selection. If, on the other hand, the OK button 27 is operated, the batch erase mode for photographed images is canceled and then the operation returns to S301 for an erase mode selection.

Figure 43:
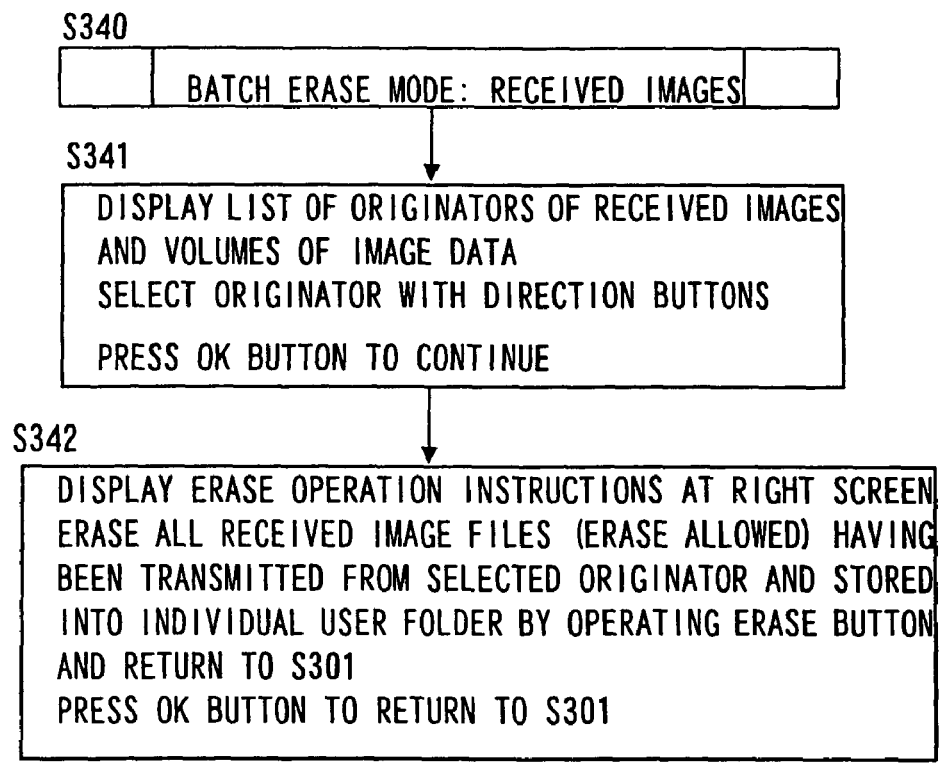
FIG. 43 presents a flowchart of the batch erase mode: received-image-subroutine operation.
Figure 44:
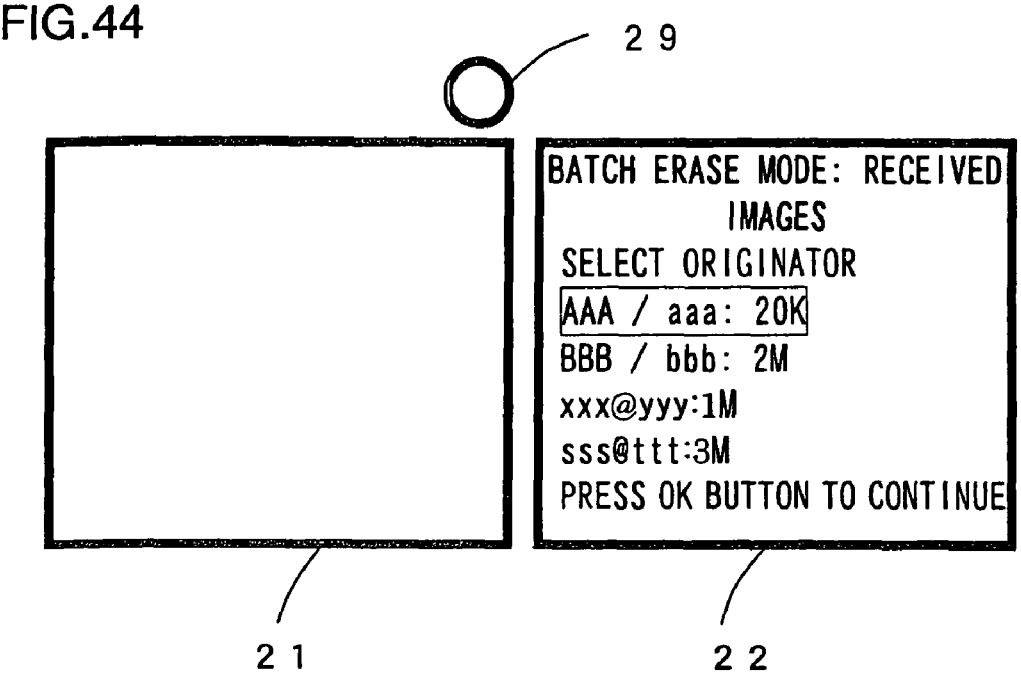
FIG. 44 presents an example of a screen display that may be brought up in the batch erase mode: received images.

FIG. 43 shows the batch erase mode for received image subroutine. After the subroutine is started up in S340, an originator list and the total data volumes of the received image files transmitted from the individual originators are displayed at the right screen 22 to enable the user to select a specific originator of received images without displaying any image data at the left screen 21, as shown in FIG. 44, in S341. After one of the originators displayed at the right screen 22 is selected by operating the direction buttons 23 and 24 (the selected originator is enclosed by the square in the display in a same, as shown in FIG. 36, and the position of the square is moved up/down by operating the direction buttons 23 and 24). Then the OK button 27 is operated to proceed to S342.

Figure 45:
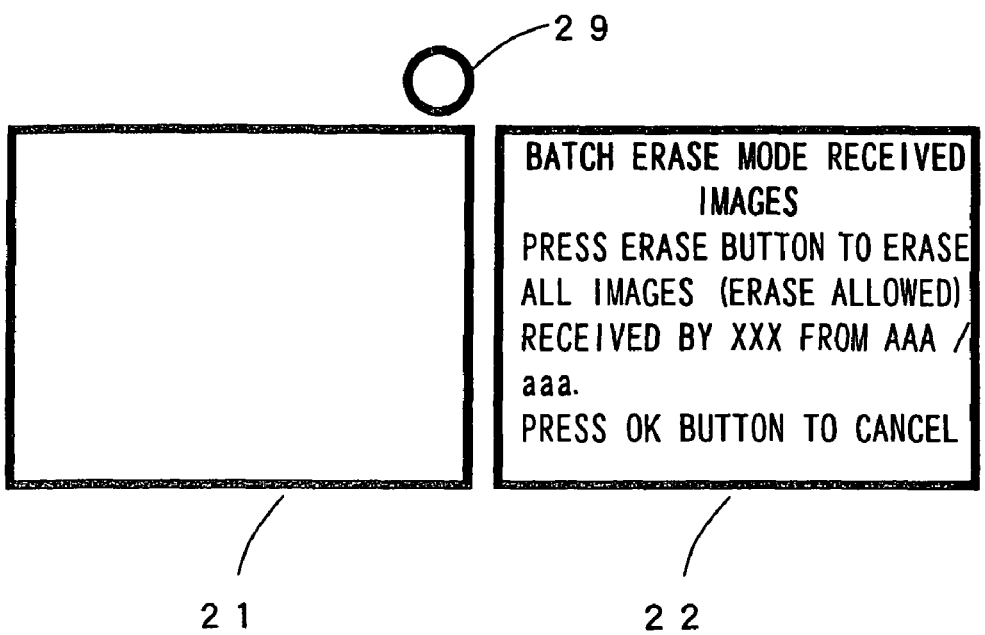
FIG. 45 presents an example of a screen display that may be brought up in the batch erase mode: received images.

The data indicating the selected originator, the total data volume of the images to be erased and the instructions for the image erase operation in the batch erase mode: received images are displayed at the right screen 22 without displaying any image data at the left screen 21, as shown in FIG. 45, in S342. All the received image files having been transmitted from the selected originator which are stored in the received image folder in the individual user folder (the received image files set as erase allowed excluding received image files unreproduced) are erased from the memory card 104 in response to an operation of the send/erase button 26, and then the operation returns to S301 for an erase mode selection. If, on the other hand, the OK button 27 is operated, the batch erase mode: received images is canceled and then the operation returns to S301 for an erase mode selection.

Figure 46:
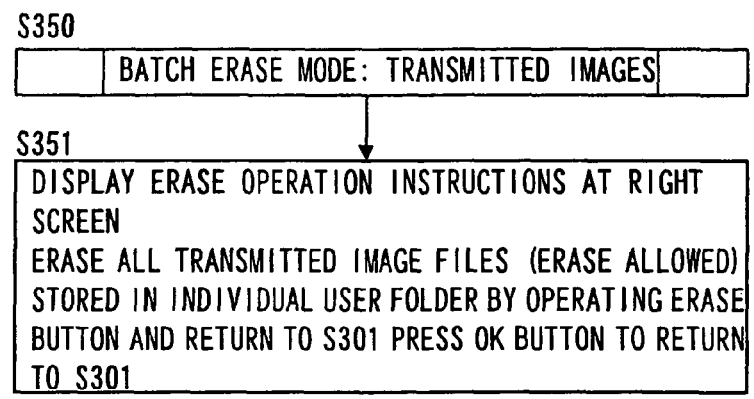
FIG. 46 presents a flowchart of the batch erase mode: transmitted-image-subroutine operation.
Figure 47:
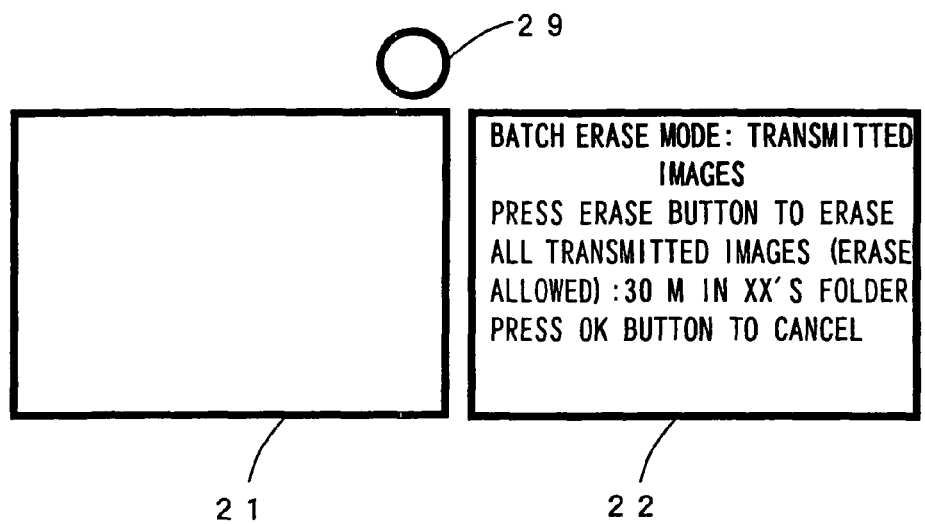
FIG. 47 presents an example of a screen display that may be brought up in the batch erase mode: transmitted images.

FIG. 46 shows the batch erase mode: transmitted image subroutine. After the subroutine is started up in S350, the total data volume of the images to be erased and the instructions for the image erase operation in the batch erase mode: transmitted images are displayed at the right screen 22 without displaying any image data at the left screen 21, as shown in FIG. 47, in S351. All the transmitted image files stored in the individual user folder (the image files set as erase allowed excluding received image files unreproduced) are erased from the memory card 104 in response to an operation of the send/erase button 26, and then the operation returns to S301 for an erase mode selection. If, on the other hand, the OK button 27 is operated, the batch erase mode for transmitted images is canceled and then the operation returns to S301 for an erase mode selection. It is to be noted that an image file is judged to have been transmitted or not have been transmitted based upon the transmission record setting in the transmission information data shown in FIG. 9.

Figure 48:
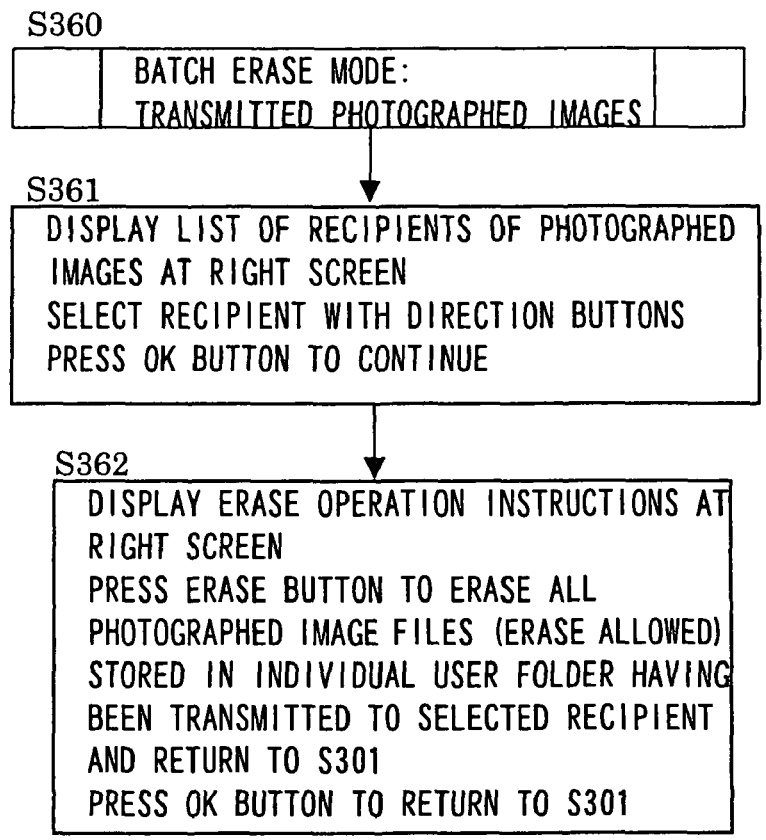
FIG. 48 presents a flowchart of the batch erase mode: transmitted photographed image subroutine operation.
Figure 49:
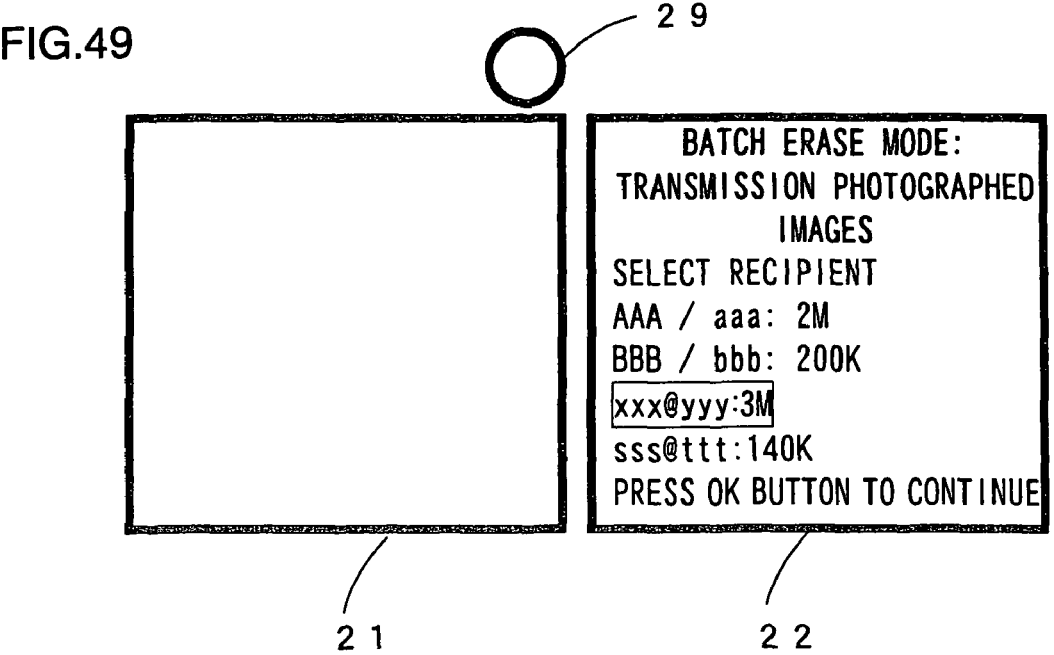
FIG. 49 presents an example of a screen display that may be brought up in the batch erase mode: transmitted photographed images.

FIG. 48 shows the batch erase mode for transmitted photographed image subroutine. After the subroutine is started up in S360, a recipient list and the total data volumes of the photographed image files having been transmitted to the individual recipients are displayed at the right screen 22 to enable the user to select a specific recipient of photographed images without displaying any image data at the left screen 21, as shown in FIG. 49, in S361. After one of the recipients displayed at the right screen 22 is selected by operating the direction buttons 23 and 24 (the selected recipient is enclosed by the square in the display, in a same way as shown in FIG. 36, and the position of the square is moved up/down by operating the direction buttons 23 and 24). Then, the OK button 27 is operated to proceed to S362.

Figure 50:
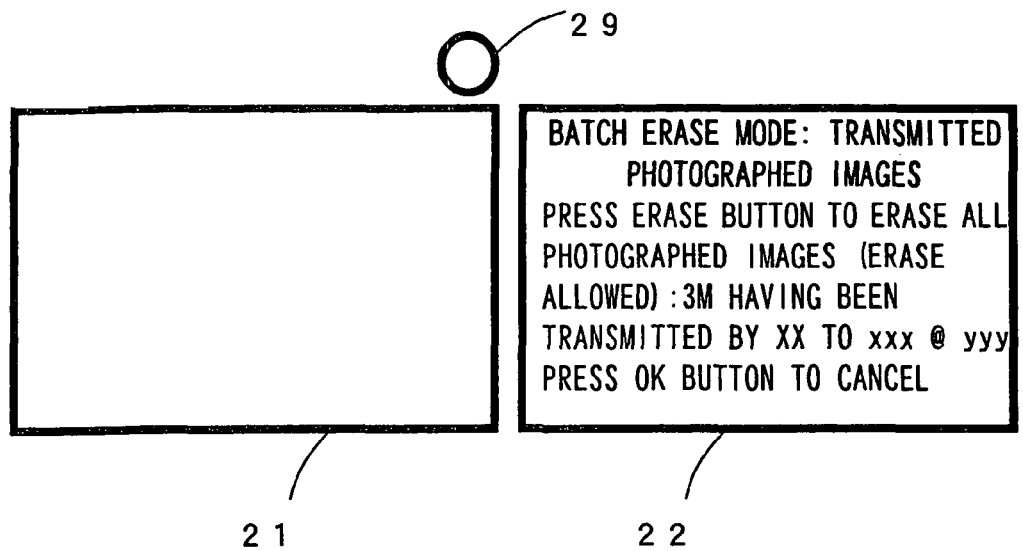
FIG. 50 presents an example of a screen display that may be brought up in the batch erase mode: transmitted photographed images.

Data indicating the selected recipient, the total data volume of the images to be erased and the instructions for the image erase operation in the batch erase mode for transmitted photographed images are displayed at the right screen 22 without displaying any image data at the left screen 21, as shown in FIG. 50, in S362. All the photographed image files having been transmitted to the selected recipient which are stored in the photographed image folder in the individual user folder (the photographed image files set as erase allowed) are erased from the memory card 104 in response to an operation of the send/erase button 26, and then the operation returns to S301 for an erase mode selection. If, on the other hand, the OK button 27 is operated, the batch erase mode for transmitted photographed images is canceled and then the operation returns to S301 for an erase mode selection.

Figure 51:
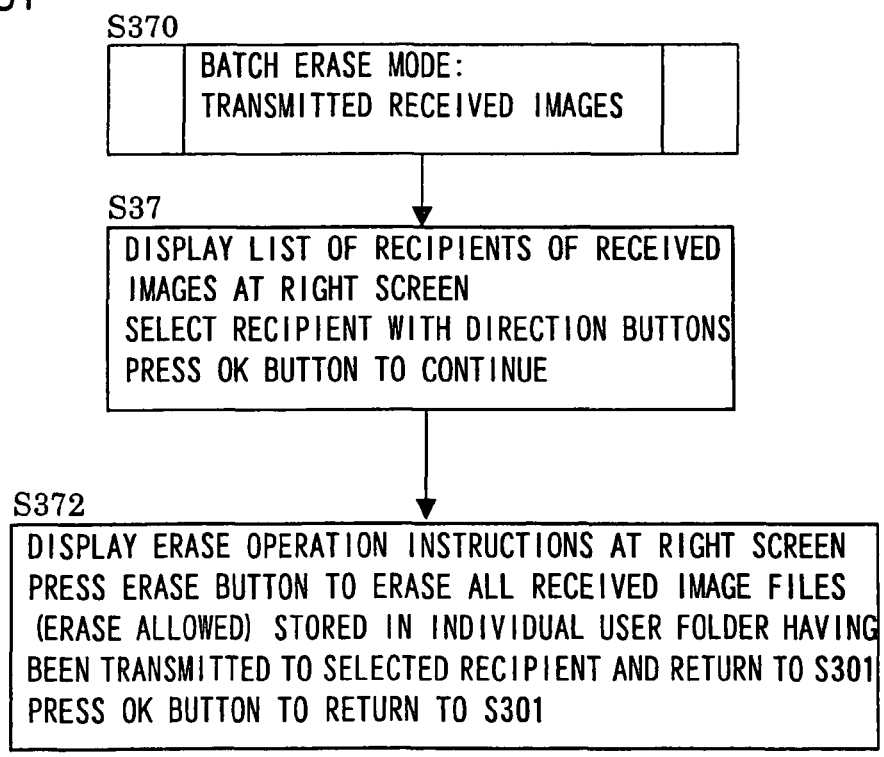
FIG. 51 presents a flowchart of the batch erase mode: transmitted received image subroutine.
Figure 52:
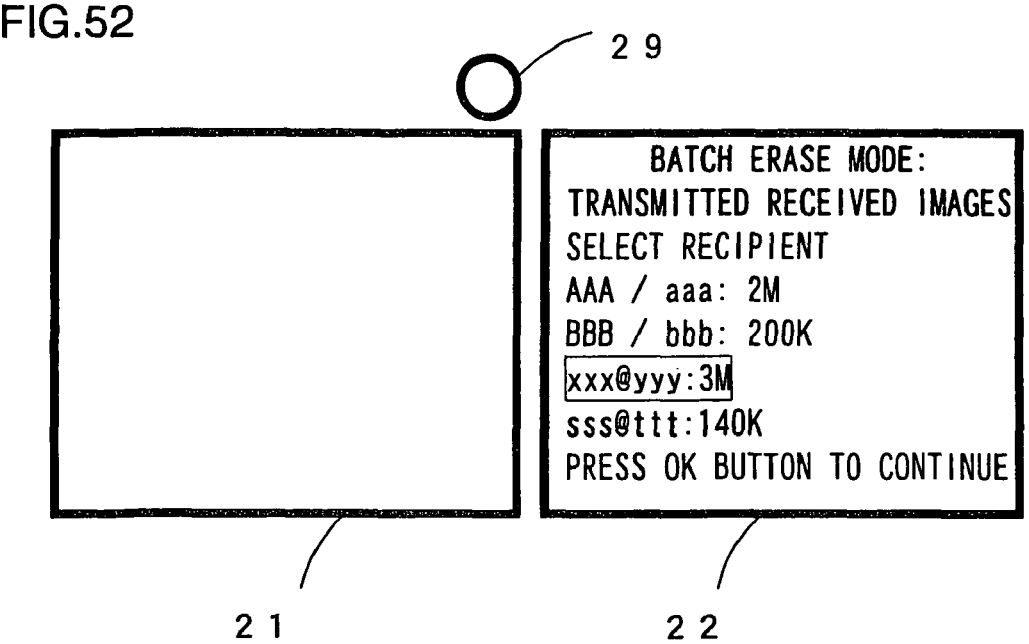
FIG. 52 presents an example of a screen display that may be brought up in the batch erase mode: transmitted received images.

FIG. 51 shows the batch erase mode: transmitted received image subroutine. After the subroutine is started up in S370, a recipient list and the total data volumes of the received image files having been transmitted to the individual recipients are displayed at the right screen 22 to enable the user to select a specific recipient of received images, without displaying any image data at the left screen 21, as shown in FIG. 52, in S371. After one of the recipients displayed at the right screen 22 is selected by operating the direction buttons 23 and 24 (the selected recipient is enclosed by the square in the display, as shown in FIG. 52, and the position of the square is moved up/down by operating the direction buttons 23 and 24). Then, the OK button 27 is operated to proceed to S372.

Figure 53:
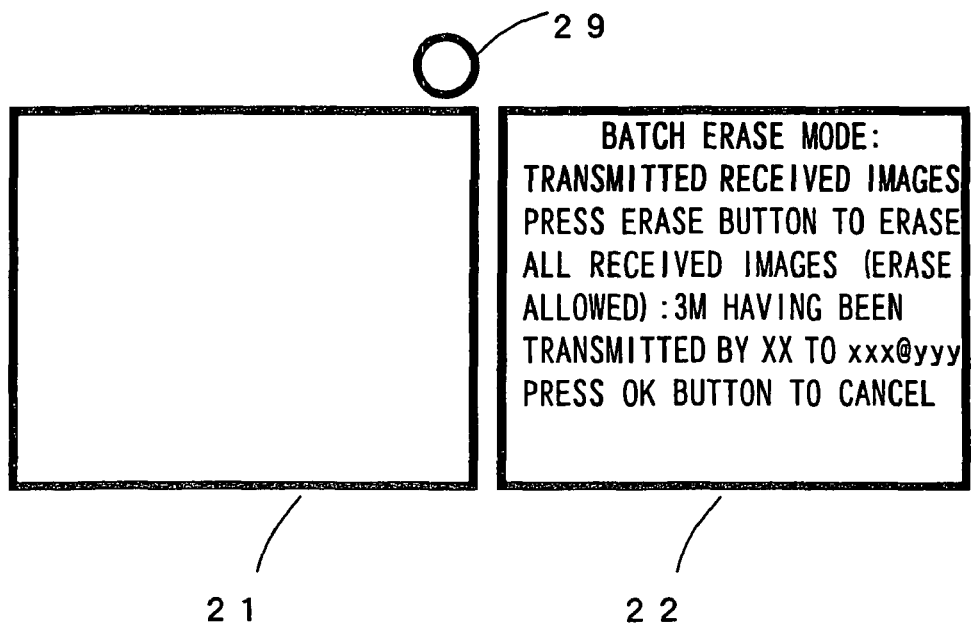
FIG. 53 presents an example of a screen display that may be brought up in the batch erase mode: transmitted received images.

Data indicating the selected recipient, the total data volume of the images to be erased and the instructions for the image erase operation in the batch erase mode: transmitted received images are displayed at the right screen 22 without displaying any image data at the left screen 21, as shown in FIG. 53, in S372. All the received image files having been transmitted to the selected recipient, which are stored in the received image folder in the individual user folder (i.e., the received, photographed image files set as erase allowed excluding any received image files unreproduced) are erased from the memory card 104 in response to an operation of the send/erase button 26, and then the operation returns to S301 for an erase mode selection. If, on the other hand, the OK button 27 is operated the batch erase mode: transmitted received images is canceled and then the operation returns to S301 for an erase mode selection.

It is to be noted that if there is no image file left that can be erased or if all the erase-allowed image files have been erased in any of the transmission modes described above, a message indicating that there is no image file for erasure is displayed at the right screen 22.

Figure 54:
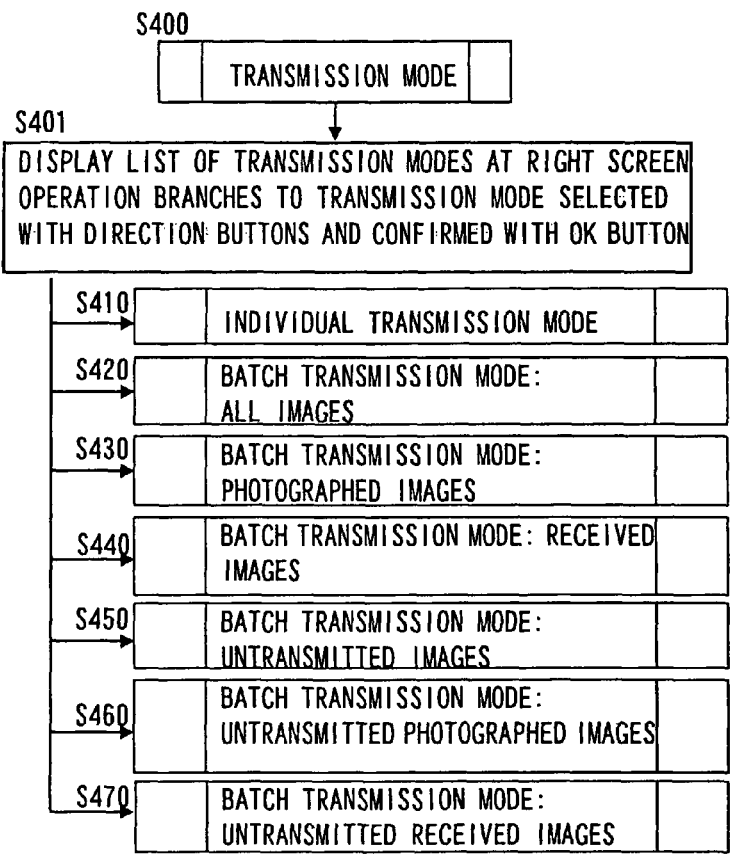
FIG. 54 presents a flowchart of the transmission mode subroutine operation.
Figure 55:
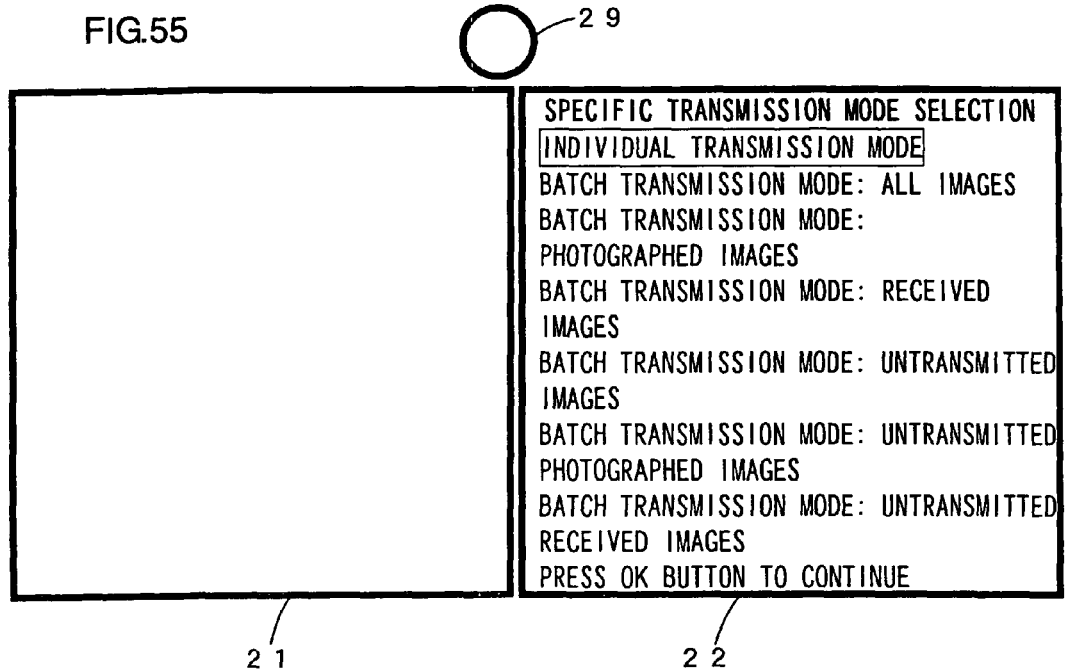
FIG. 55 presents an example of a screen display that may be brought up in the transmission mode.

FIG. 54 presents a flowchart of the transmission mode subroutine. After the subroutine is started up in S400, a list of various transmission modes is displayed the right screen 22 to enable the user to select the desired transmission mode, as shown in FIG. 55, in S401. After one of the transmission modes displayed at the right screen 22 is selected by operating the direction buttons 23 and 24 (the selected item is enclosed by the square in the display shown in FIG. 55 and the position of the square is moved up/down by operating the direction buttons 23 and 24), the selection of the transmission mode is confirmed by operating the OK button 27.

If the individual transmission mode is selected, the operation branches to the individual erase mode subroutine in S410. If the batch transmission mode for all images is selected, the operation branches to the batch transmission mode for all image subroutine in S420. If the batch transmission mode for photographed images is selected, the operation branches to the batch transmission mode for photographed image subroutine in S430. If the batch transmission mode for received images is selected, the operation branches to the batch transmission mode: received image subroutine in S440. If the batch transmission mode: untransmitted images is selected, the operation branches to the batch transmission mode for untransmitted image subroutine in S450. If the batch transmission mode: untransmitted photographed images is selected, the operation branches to the batch transmission mode for untransmitted photographed image subroutine in S460. If the batch transmission mode: untransmitted received images has been selected, the operation branches to the batch transmission mode for untransmitted received image subroutine in S470.

Figure 56:
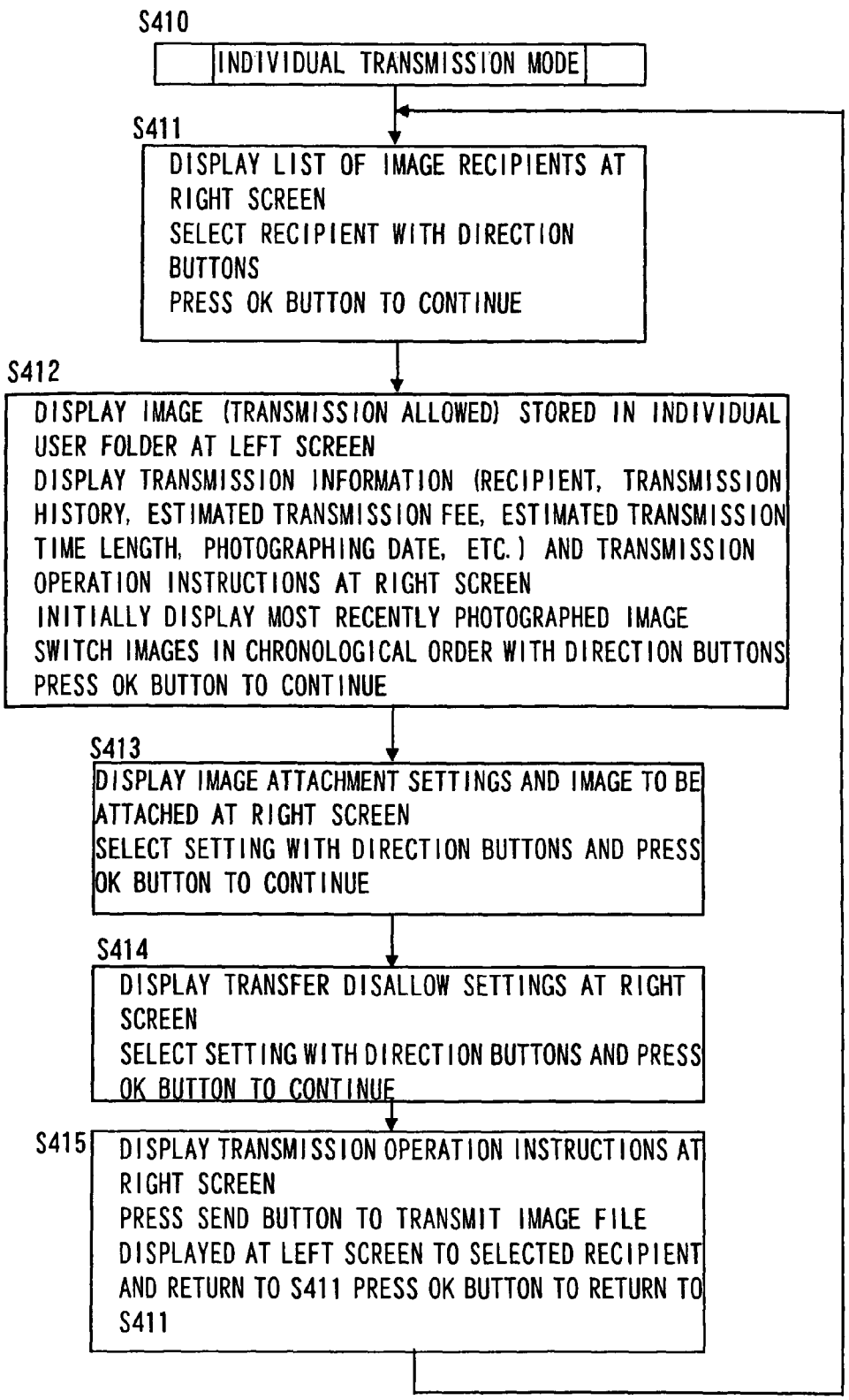
FIG. 56 presents a flowchart of the individual transmission mode subroutine operation.
Figure 57:
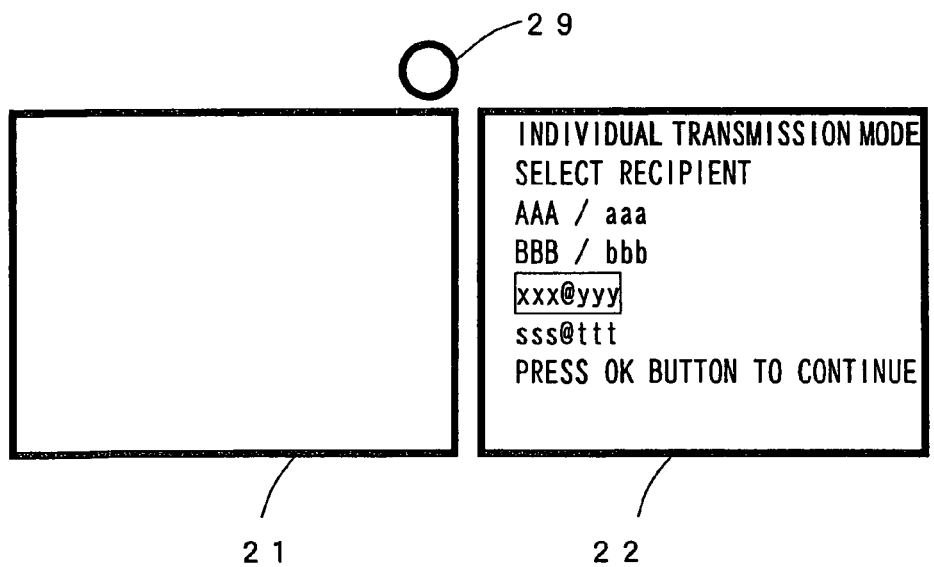
FIG. 57 presents an example of a screen display that may be brought up in the individual transmission mode.

FIG. 56 shows the individual transmission mode subroutine. After the subroutine is started up in S410, a recipient list is displayed at the right screen 22 to enable the user to select an image recipient without displaying any image data at the left screen 21, as shown in FIG. 57, in S411. After one of the recipients displayed at right screen 22 is selected by operating the direction buttons 23 and 24 (the selected recipient is enclosed by the square in the display, as shown in FIG. 57 and the position of the square is moved up/down by operating the direction buttons 23 and 24). Then, the OK button 27 is operated to proceed to S412. It is to be noted that in principle, possible image recipients are individuals rather than apparatuses.

Figure 58:
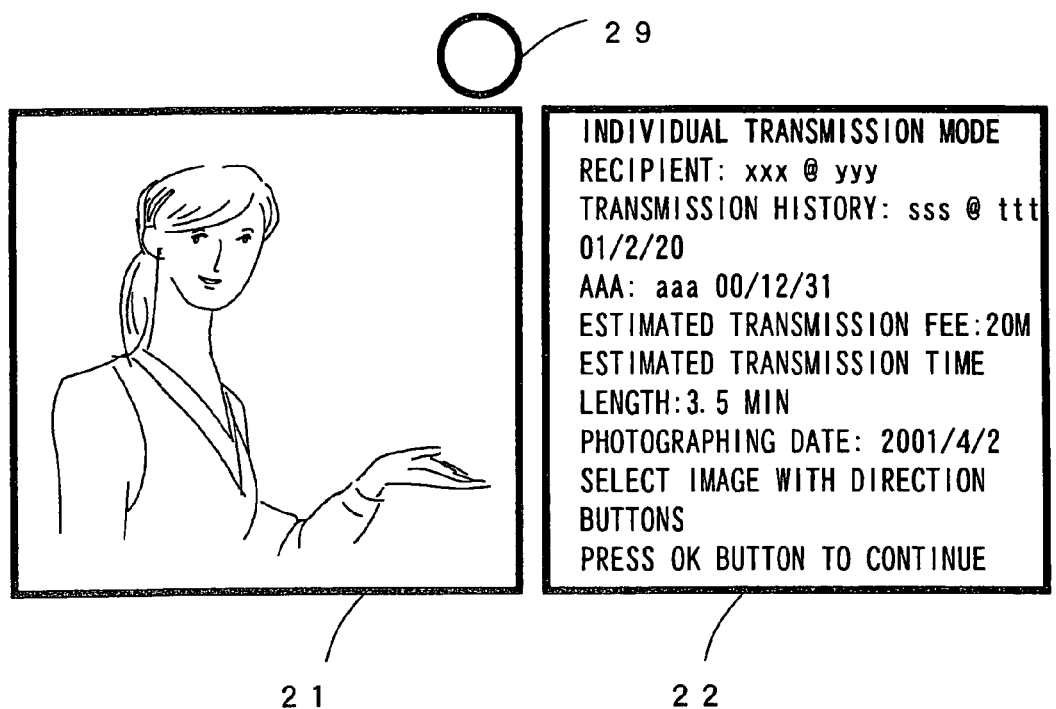
FIG. 58 presents an example of a screen display that may be brought up in the individual transmission mode.

In S412, all the image data (only the image files set as transmission allowed) stored in the individual user folder in the memory card 104 are displayed one image at a time at the left screen 21, as shown in FIG. 58. At this time, image files that have already been transmitted to the selected recipient are not displayed. In addition, the selected recipient, the transmission history, an estimated transmission fee, an estimated transmission time length, the photographing date/time and operational instructions are displayed at the right screen 22.

It is to be noted that the estimated transmission fee and the estimated transmission time length are calculated in the electronic camera 100 based upon information including the positional relationship between the electronic camera 100 and the recipient, the distance between the electronic camera 100 and the recipient, the data transmission speed (data transfer rate) in the transmission line being used, the line condition, the total data volume of the image as to be transmitted, the service fee per unit time for using the communication line to communicate with the image recipient and the time of day. The positional relationship and the distance between the electronic camera 100 and the recipient are calculated by using the position information data detected by the GPS circuit 61 and the position information data obtained by the wireless communication circuit 71 by communicating with the wireless base station 120. In addition, the information such as the data transmission speed of the line being used, the line condition and the service fee for using the communication line per unit time is obtained through communication between the wireless communication circuit 71 and the wireless base station 120. The time-of-day information is obtained from the timer 74.

The image data are displayed in chronological order, with the image data with the most recent photographing date/time or the most recent reception date/time displayed first and, subsequently, the display is switched by operating the direction buttons 23 and 24 to show older image data or newer image data in the chronological order. In addition, the LED 29 is turned on, when the received image data being displayed at the left screen 21, in order to indicate that the image data on display are the received image. Also, when received image data that have never been reproduced before are reproduced and displayed, the reproduction record setting in the reception information data appended to the image data is changed to "reproduced" and a notification indicating that the received image has been reproduced is issued to the originator of the received image.

This image reproduction notification includes the image file name data, data indicating the sender of the notification and data indicating the reproduction time point. When there are no more received and unreproduced image data addressed to the user after the image reproduction executed in order to enable the user to select images to be transmitted, the LED 28 is turned off to indicate that there are no received image data unreproduced. By operating the OK button 27, the image file currently displayed at the left screen 21 is confirmed to be an image file to be transmitted, and the operation proceeds to S413.

Figure 59:
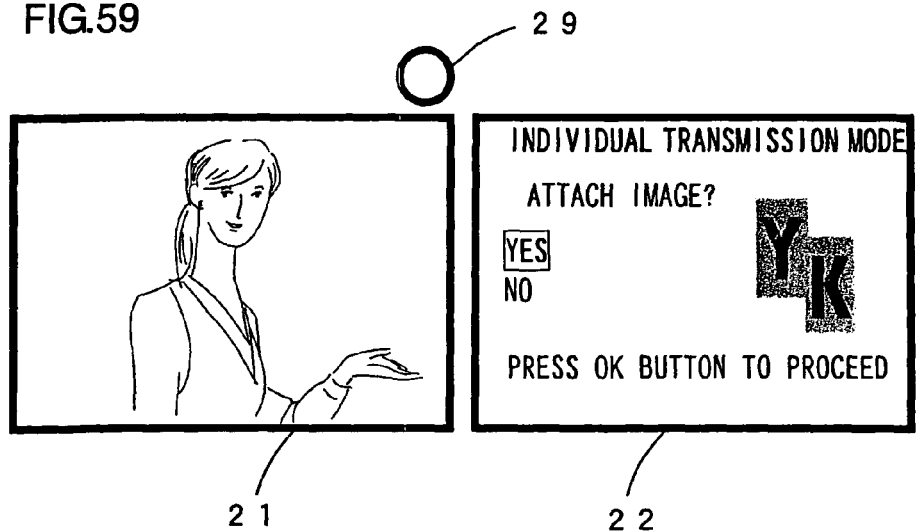
FIG. 59 presents an example of a screen display that may be brought up in the individual transmission mode.
Figure 60:
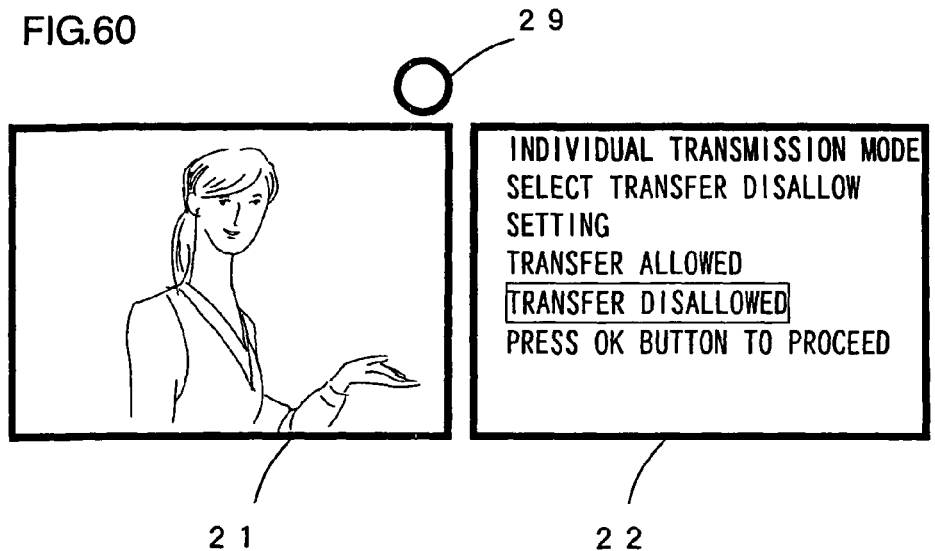
FIG. 60 presents an example of a screen display that may be brought up in the individual transmission mode.

In S413, the image data to be transmitted are displayed at the left screen 21 and the image attachment settings are displayed at the right screen 22 to enable the user to select whether or not attached image data are to be included in the transmission, as shown in FIG. 59. A selection is made with the direction buttons 23 and 24 with regard to whether or not an image is to be attached, and then the OK button 27 is operated to proceed to S414. In S414, the image data to be transmitted are displayed at the left screen 21 and the transfer allowed/disallowed settings are displayed at the right screen 22 to enable the user to select whether a transfer of the image data to be transmitted is to be allowed/disallowed. A selection is made with the direction buttons 23 and 24 as to whether a transfer is to be allowed/disallowed, and then the OK button 27 is operated to proceed to S415.

Figure 61:
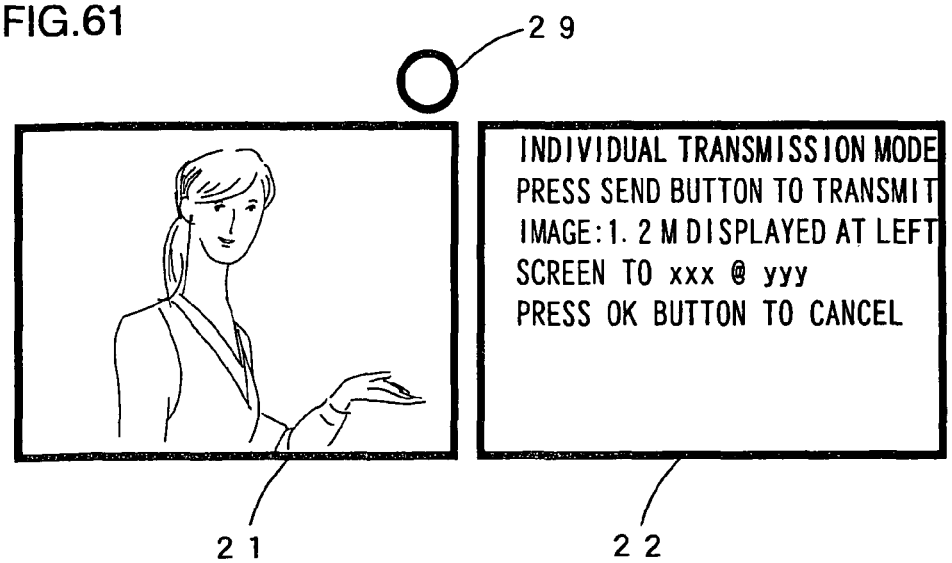
FIG. 61 presents an example of a screen display that may be brought up in the individual transmission mode.

In S415, the image data to be transmitted to are displayed at the left screen 21 and the recipient data, the data volume of the image to be transmitted and the instructions for the image transmission operation in the individual transmission mode are displayed at the right screen 22, as shown in FIG. 61. The image file currently displayed at the left screen 21 is transmitted to the selected recipient by operating the send/erase button 26. In addition, if an attached image is to be included in the transmission, the image attachment already selected as the attached image is attached to the image file to be transmitted and also, the transfer allowed/disallowed setting data indicating the selected setting and the sender data are attached to the image file. After the image file is transmitted, the transmission record in the transmission information data contained in the transmitted image file is set to "transmitted" and the recipient and the transmission date/time are added to the transmission history before the operation returns to S411 for a recipient selection.

If the OK button 27 is operated, the transmission of the image file displayed at the left screen 21 is canceled and the operation returns to S411 for a recipient selection. It is to be noted that when an image file is transmitted, the additional information data excluding the transmission information data and the reception information data, the data indicating the selected transfer disallowed/allowed setting, the attached image data if an attached image is included in the transmission and the sender data for enabling a sender identification are attached to the image information.

Figure 62:
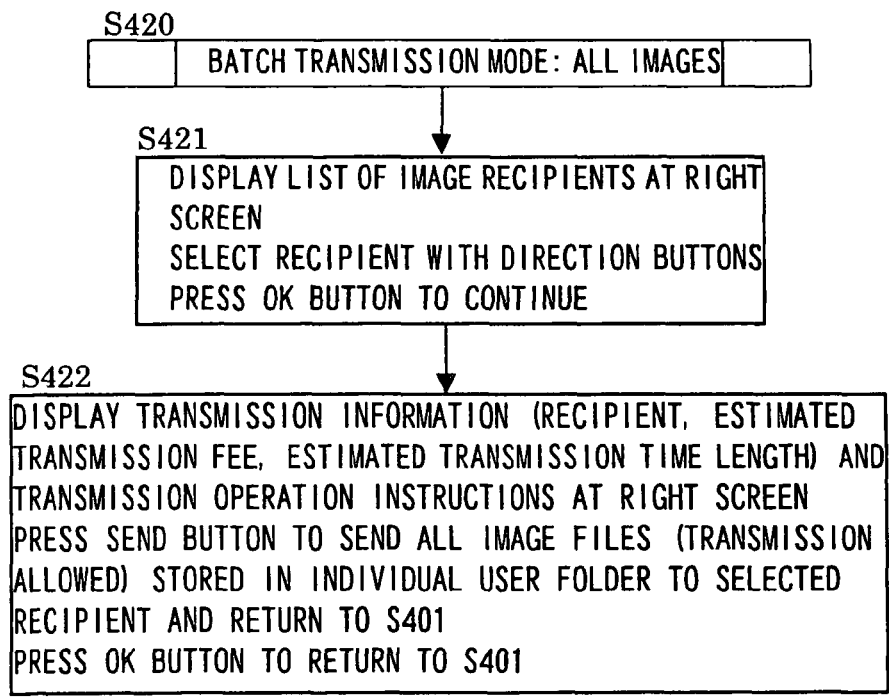
FIG. 62 presents a flowchart of the batch transmission mode: all image subroutine operation.

FIG. 62 shows the batch transmission mode for all image subroutine. After the subroutine is started up in S420, a recipient list is displayed at the right screen 22 to enable the user to select an image recipient, without displaying any image data at the left screen 21, as shown in FIG. 63, in S421. After one of the recipients displayed at the right screen 22 is selected by operating the direction buttons 23 and 24 (the selected recipient is enclosed by the square in the display, as shown in FIG. 63, and the position of the square is moved up/down by operating the direction buttons 23 and 24). Then the OK button 27 is operated to proceed to S422.

In S422, the selected recipient, an estimated transmission fee, an estimated transmission time length, the total data volume of the images to be transmitted and the instructions for the image transmission operation in the batch transmission mode for all images are displayed at the right screen 22 without displaying any image data at the left screen 21, as shown in FIG. 64. All the image files (the image files set as transmission allowed) stored in the individual user folder are transmitted to the recipient by operating the send/erase button 26. After the image file transmission, the transmission records in the transmission information data in the transmitted image files are set to "transmitted", and the recipient and the transmission date/time are added to the transmission history, before the operation returns to S401 for a transmission mode selection.

If the OK button 27 is operated, the batch transmission mode for all images is canceled and the operation returns to S401 for a transmission mode selection. It is to be noted that an image file is judged to have been set as transmission allowed or transmission disallowed based upon the transmission-disallow setting state included in the transmission information data shown in FIG. 9. It is also to be noted that when image files are transmitted, the additional information data excluding the transmission information data and the reception information data and the sender data for enabling a sender identification are attached to the image information.

Figure 65:
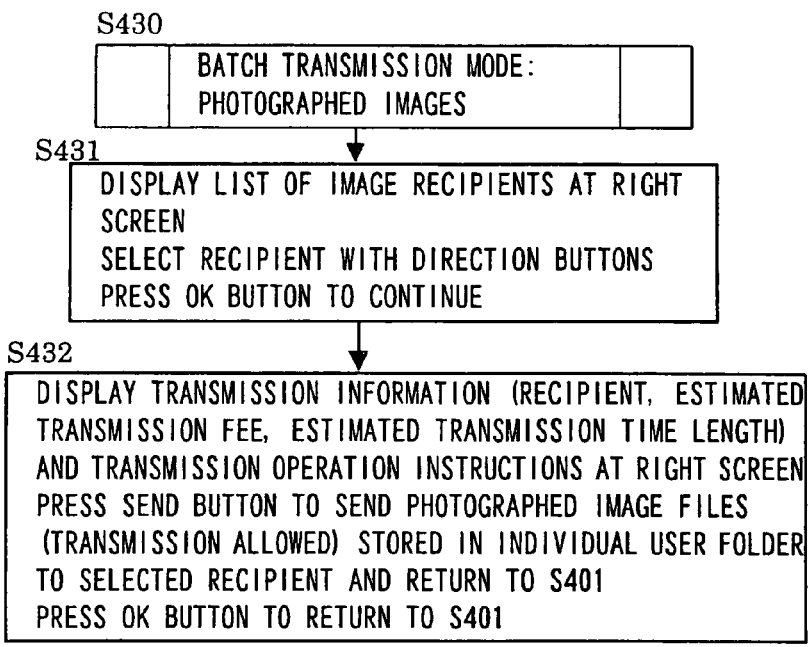
FIG. 65 presents a flowchart of the batch transmission mode: photographed-image-subroutine operation.

FIG. 65 shows the batch transmission mode: photographed image subroutine. After the subroutine is started up in S430, a recipient list is displayed at the right screen 22 to enable the user to select an image recipient without displaying any image data at the left screen 21, in S431. After one of the recipients displayed at the right screen 22 is selected by operating the direction buttons 23 and 24. Then the OK button 27 is operated to proceed to S432.

In S432, the selected recipient, an estimated transmission fee, an estimated transmission time length, the total data volume of the images to be transmitted and the instructions for the image transmission operation in the batch transmission mode for photographed images are displayed at the right screen 22 without displaying any image data at the left screen 21. All the photographed image files (the photographed image files set as transmission allowed) stored in the photographed image folder in the individual user folder are transmitted to the recipient by operating the send/erase button 26. After the image file transmission, the transmission records in the transmission information data in the transmitted image files is set to "transmitted", and the recipient and the transmission date/time are added to the transmission history, before the operation returns to S401 for a transmission mode selection.

If the OK button 27 is operated, the batch transmission mode: photographed images is canceled and the operation returns to S401 for a transmission mode selection. It is to be noted that when image files are transmitted, the additional information data excluding the transmission information data and the reception information data and sender data for enabling a sender identification are attached to the image information.

Figure 66:
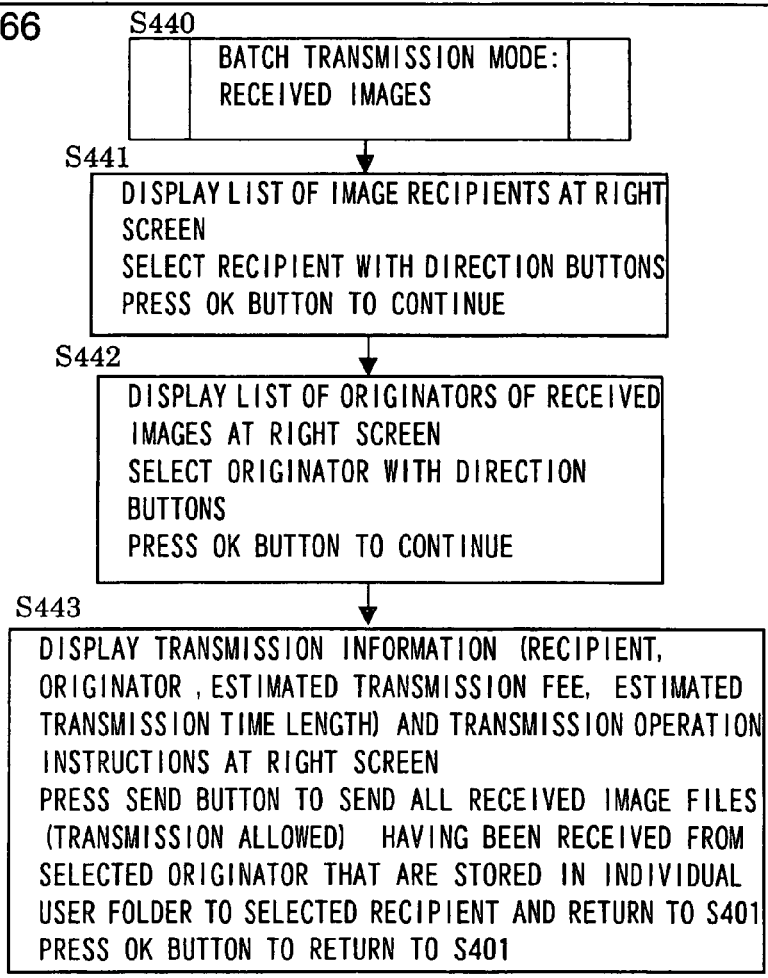
FIG. 66 presents a flowchart of the batch transmission mode: receive-image-subroutine operation.

FIG. 66 shows the batch transmission mode: received image subroutine. After the subroutine is started up in S440, a recipient list is displayed at the right screen 22 to enable the user to select an image recipient without displaying any image data at the left screen 21, in S441. After one of the recipients displayed at the right screen 22 is selected by operating the direction buttons 23 and 24. Then the OK button 27 is operated to proceed to S442.

Figure 67:
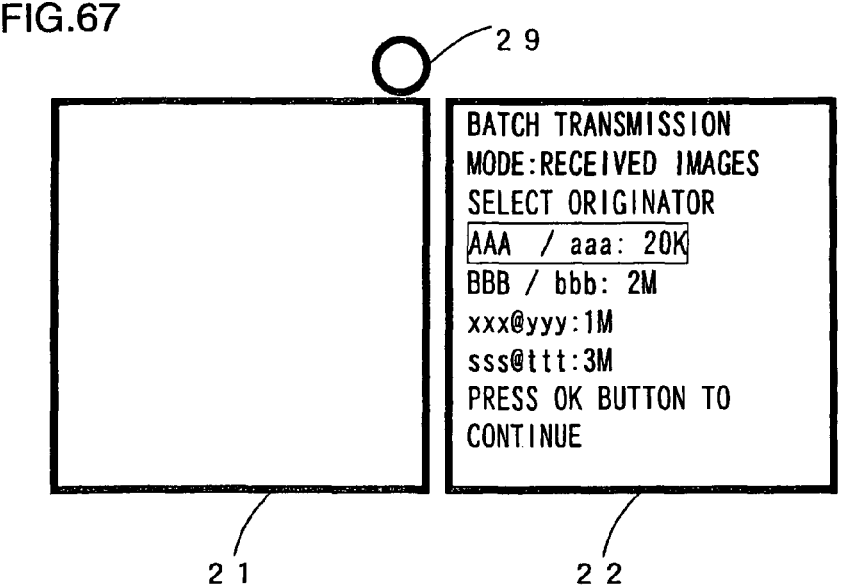
FIG. 67 presents an example of a screen display that may be brought up in the batch transmission mode: received images.

An originator list and the total data volumes of the received image files transmitted from the individual originators are displayed at the right screen 22 to enable the user to select a specific sender of received images, without displaying any image data at the left screen 21, as shown in FIG. 67, in S442. After one of the originators displayed at the right screen 22 is selected by operating the direction buttons 23 and 24 (the selected originator is enclosed by the square in the display, as shown in FIG. 67, and the position of the square is moved up/down by operating the direction buttons 23 and 24). Then, the OK button 27 is operated to proceed to S443.

Figure 68:
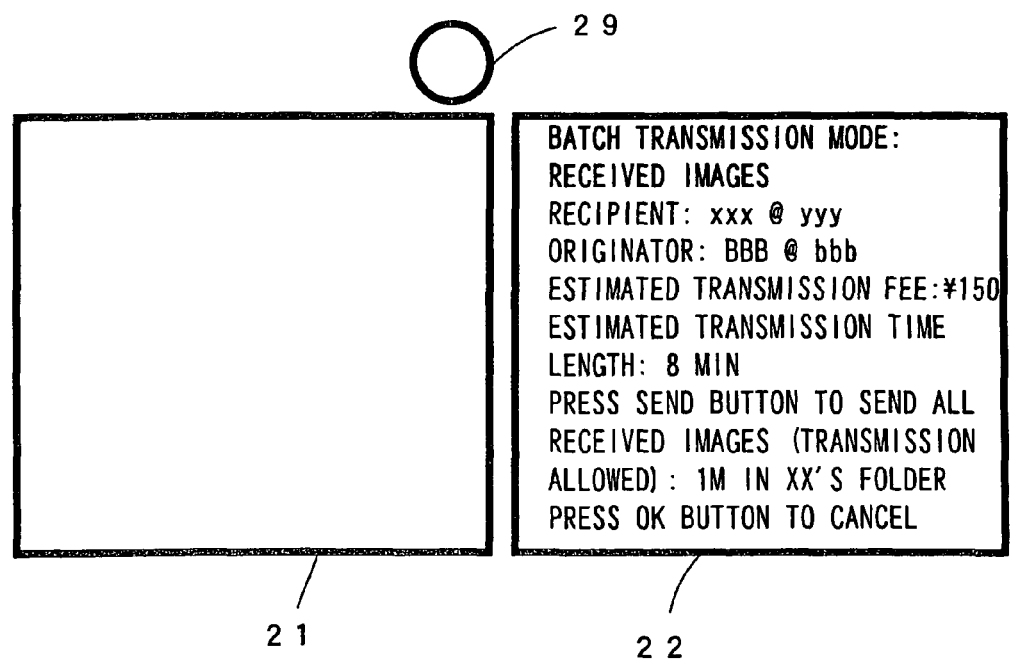
FIG. 68 presents an example of a screen display that may be brought up in the batch transmission mode: received images.

In S443, the selected recipient, the selected originator, an estimated transmission fee, an estimated transmission time length, the total data volume of the images to be transmitted and the instructions for the image transmission operation in the batch transmission mode for received images are displayed at the right screen 22 without displaying any image data at the left screen 21, as shown in FIG. 68. All the received image files (the received image files set as transmission allowed) having been transmitted from the selected originator among the image files stored in the received image folder in the individual user folder are transmitted to the selected recipient by operating the send/erase button 26. After the image file transmission, the transmission records in the transmission information data in the transmitted image files are set to "transmitted", and the recipient and the transmission date/time are added to the transmission history, before the operation returns to S401 for a transmission mode selection.

If the OK button 27 is operated, the batch transmission mode: received images is canceled and the operation returns to S401 for a transmission mode selection. It is to be noted that when image file are transmitted, the additional information data excluding the transmission information data and the reception information data and the sender data for enabling a sender identification are attached to the image information.

Figure 69:
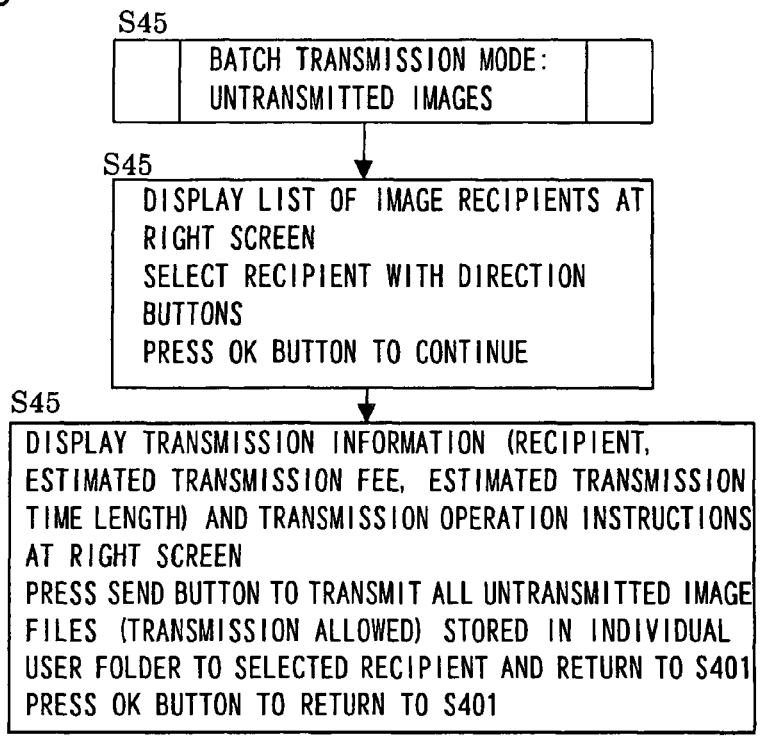
FIG. 69 presents a flowchart of the batch transmission mode: untransmitted-image-subroutine operation.

FIG. 69 shows the batch transmission mode for untransmitted image subroutine. After the subroutine is started up in S450, a recipient list is displayed at the right screen 22 to enable the user to select an image recipient without displaying any image data at the left screen 21, in S451. After one of the recipients displayed at the right screen 22 is selected by operating the direction buttons 23 and 24. Then the OK button 27 is operated to proceed to S452.

Figure 70:
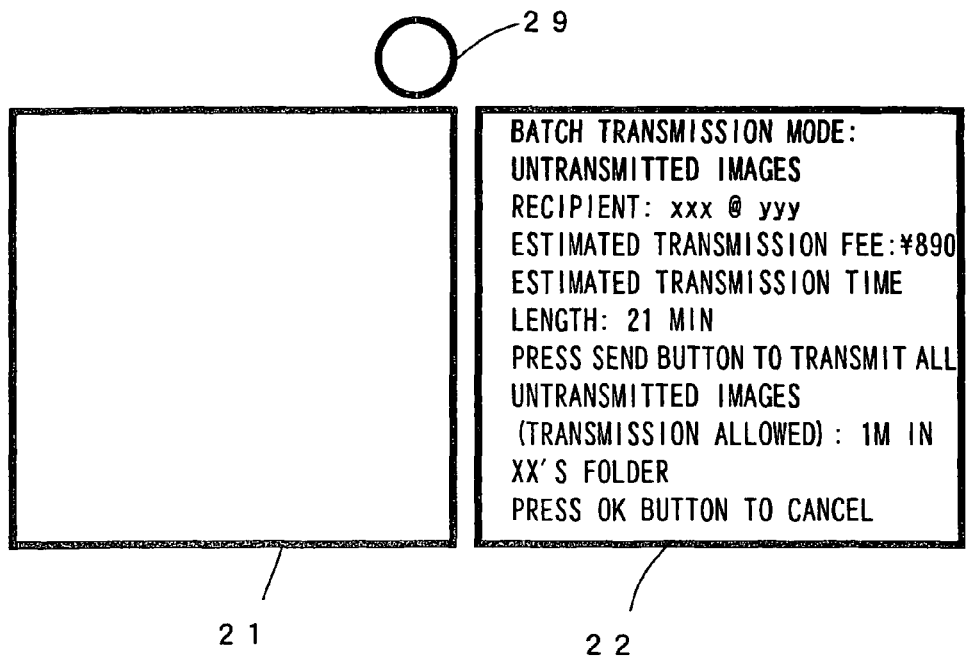
FIG. 70 presents an example of a screen display that may be brought up in the batch transmission mode: untransmitted images.

In S452, the selected recipient, an estimated transmission fee, an estimated transmission time length, the total data volume of the images to be transmitted and the instructions for the image transmission operation in the batch transmission mode for untransmitted images are displayed at the right screen 22 without displaying any image data at the left screen 21, as shown in FIG. 70. All the untransmitted image files (the image files set as transmission allowed) stored in the individual user folder are transmitted to the selected recipient by operating the send/erase button 26. After the image file transmission, the transmission records in the transmission information data in the transmitted image files is set to "transmitted", and the recipient and the transmission date/time are added to the transmission history, before the operation returns to S401 for a transmission mode selection.

If the OK button 27 is operated, the batch transmission mode: untransmitted images is canceled and the operation returns to S401 for a transmission mode selection. It is to be noted that an image file is judged to have been transmitted/not transmitted based upon the transmission record setting in the transmission information data shown in FIG. 9. It is also to be noted that when image files are transmitted, the additional information data excluding the transmission information data and the reception information data and the sender data for enabling a sender identification are attached to the image information.

Figure 71:
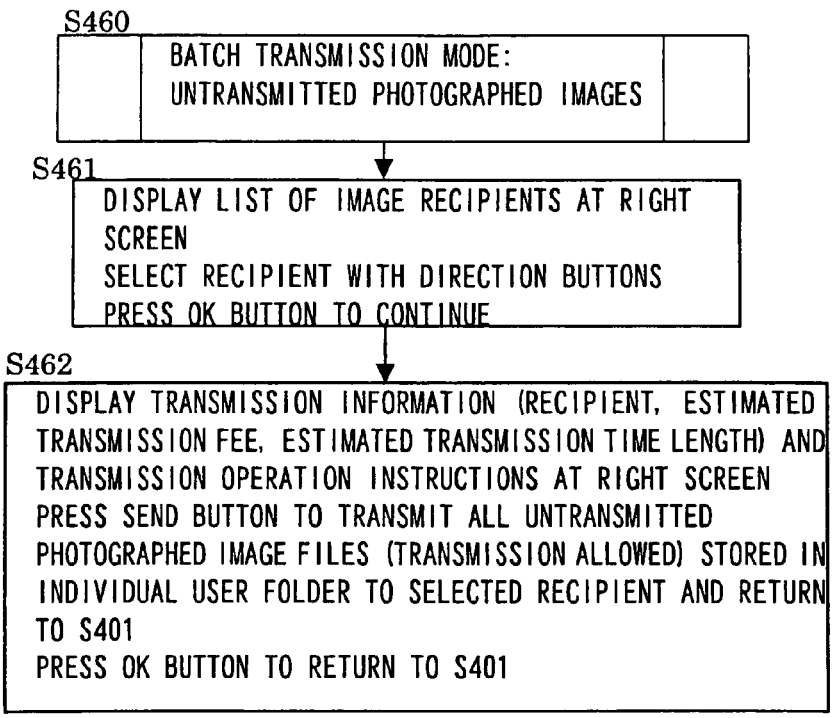
FIG. 71 presents a flowchart of the batch transmission mode: untransmitted-photographed-image-subroutine operation.

FIG. 71 shows the batch transmission mode: untransmitted photographed image subroutine. After the subroutine is started up in S460, a recipient list is displayed at the right screen 22 to enable the user to select an image recipient without displaying any image data at the left screen 21 in S461. After one of the recipients displayed at the right screen 22 is selected by operating the direction buttons 23 and 24. Then the OK button 27 is operated to proceed to S462.

Figure 72:
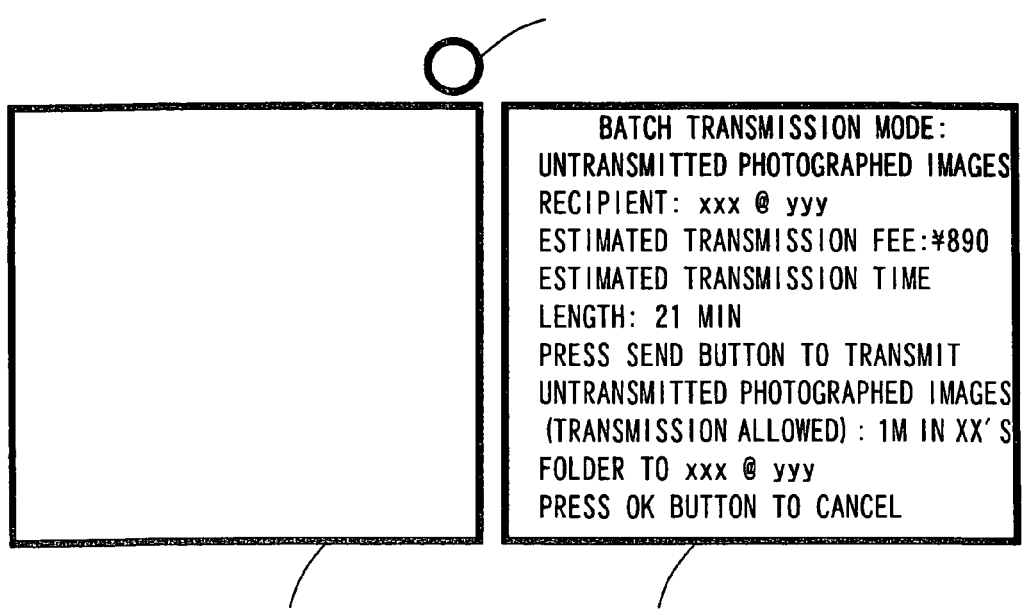
FIG. 72 presents an example of a screen display that may be brought up in the batch transmission mode: untransmitted photographed images.

In S462, the selected recipient, an estimated transmission fee, an estimated transmission time, the total data volume of the images to be transmitted and the instructions for the image transmission operation in the batch transmission mode for untransmitted images are displayed at the right screen 22 without displaying any image data at the left screen 21, as shown in FIG. 72. The untransmitted photographed image files (the image files set as transmission allowed) stored in the photographed image folder in the individual user folder are transmitted to the selected recipient by operating the send/erase button 26. After the image file transmission, the transmission records in the transmission information data in the transmitted image files are set to "transmitted", and the recipient and the transmission date/time are added to the transmission history, before the operation returns to S401 for a transmission mode selection.

If the OK button 27 is operated, the batch transmission mode for photographed images is canceled and the operation returns to S401 for a transmission mode selection. It is to be noted that a photographed image file is judged to have been transmitted/not transmitted to the selected recipient based upon the transmission record setting in the transmission information data shown in FIG. 9. It is also to be noted that when image file are transmitted, the additional information data excluding the transmission information data and the reception information data and the sender data for enabling a sender identification are attached to the image information.

Figure 73:
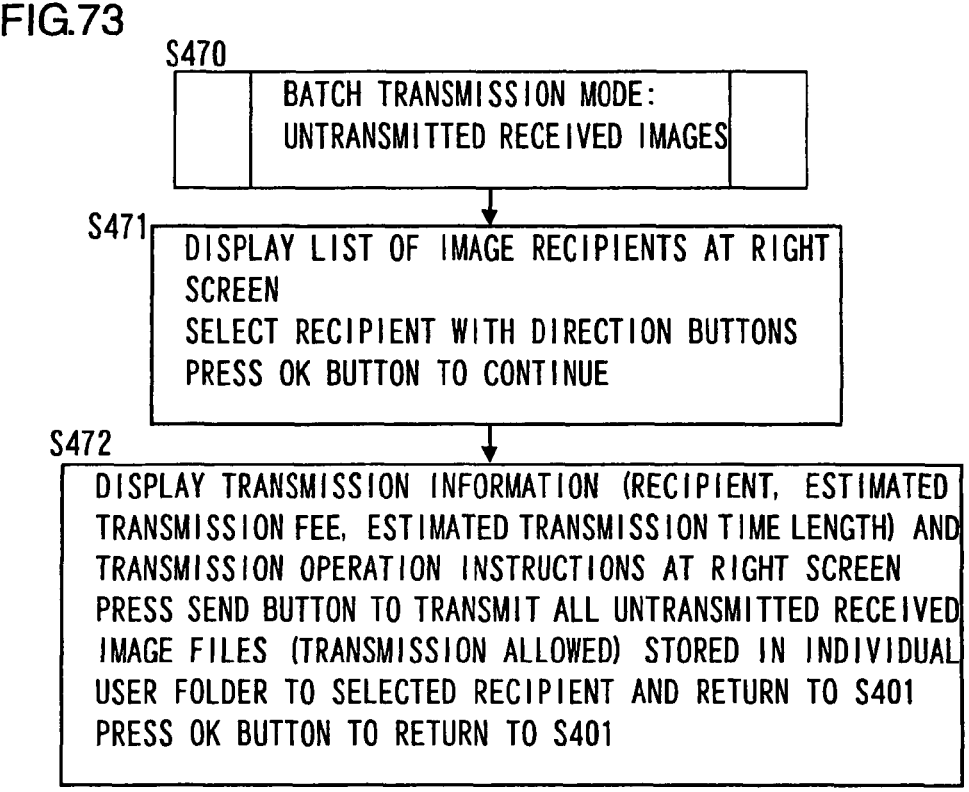
FIG. 73 presents a flowchart of the batch transmission mode: untransmitted-received-image-subroutine operation.

FIG. 73 shows the batch transmission mode: untransmitted received image subroutine. After the subroutine is started up in S470, a recipient list is displayed at the right screen 22 to enable the user to select an image recipient without displaying any image data at the left screen 21, in S471. After one of the recipients displayed at the right screen 22 is selected by operating the direction buttons 23 and 24. Then the OK button 27 is operated to proceed to S472.

In S472, the selected recipient, an estimated transmission fee, an estimated transmission time length, the total data volume of the images to be transmitted and the instructions for the image transmission operation in the batch transmission mode for unreceived images are displayed at the right screen 22 without displaying any image data at the left screen 21. The untransmitted received image files to the selected recipient (the image files set as transmission allowed) stored in the received image folder in the individual user folder are transmitted to the selected recipient by operating the send/erase button 26. After the image file transmission, the transmission records in the transmission information data in the transmitted image files are set to "transmitted", and the recipient and the transmission date/time are added to the transmission history, before the operation returns to S401 for a transmission mode selection.

If the OK button 27 is operated, the batch transmission mode for received images is canceled and the operation returns to S401 for a transmission mode selection. It is to be noted that a received image file is judged to have been transmitted/not transmitted to the selected recipient based upon the transmission record setting in the transmission information data shown in FIG. 9. It is also to be noted that when image file are transmitted, the additional information data excluding the transmission information data and the reception information data and the sender data for enabling a sender identification are attached to the image information.

It is to be noted that if there is no image file that can be transmitted or all the image files that can be transmitted have been transmitted in any of the transmission modes described above, a message indicating that there is no image file for transmission is displayed at the right screen 22.

The embodiment described above, in which users of the electronic camera 100 are identified by the personal identification circuit 75, individual user folders are prepared based upon the results of the personal identification, photographed images and received images are stored individually into the individual user folders, and operations such as an image reproduction, an image erasure and an image transmission are executed by targeting images in a specific individual user folder, achieves the following advantages when the electronic camera 100 is shared by a plurality of users. Since reproduced images from a given individual user folder cannot be viewed by another user, user privacy is protected.

Since the user does not need to search for his image files among all the image files to reproduce, erase or transmit them, images belonging to the user can be reproduced, erased or transmitted with a high degree of efficiency.

When a user erases or transmits images belonging to him, he is not allowed to erase or transmit the images of another user by mistake.

Since images obtained through photographing operations executed in the electronic camera 100 and images received from the outside by the electronic camera 100 are stored into separate folders and the reproduction mode, the erase mode and the transmission mode can each be set to reproduce, erase or transmit all the images, the photographed images and the received images, the following advantages are achieved through the embodiment.

Since a reproduction operation, an erase operation or a transmission operation can be performed by distinguishing the photographed images from the received images, images can be reproduced, erased or transmitted efficiently in a manner that reflects the intent of the user.

For instance, by transmitting to the outside only the images obtained through photographing operations performed by himself, the user can obtain a backup for his photographed images with ease. In addition, by reproducing the received images alone, the user is able to check the received images quickly and easily.

The described embodiment, in which the LED 28 is turned on if there is any received image that is addressed to the current user of the camera and that has not been reproduced, and therefore the LED notifies the user of the presence of the unreproduced received image. Thus, it achieves the following advantages.

If an image addressed to the current user is received from the outside during an image photographing operation, an image reproduction operation, an image erase operation or an image transmission operation, the camera user is promptly alerted and thus, is able to reproduce and display the received image immediately if necessary.

An inadvertent failure to reproduce a received image that has not been reproduced is prevented.

The embodiment, in which a received image that has not been reproduced is given priority for reproduction and display in the received image reproduction mode as well as in the all image reproduction mode, achieves the following advantages.

An inadvertent failure to reproduce a received image that has not been reproduced is prevented.

Any received image that has not been reproduced and needs to be checked can be reproduced with a high degree of efficiency.

The embodiment, in which a photographed image and the corresponding photographing data are simultaneously displayed both at the left screen 21 and the right screen 22 in the photographed image reproduction mode, achieves the following advantage.

Since the correlation between the photographing data and the photographing results can be ascertained at a glance, the photographing skill can be improved efficiently.

Since the LED 29 is turned on when reproducing a received image in the all image reproduction mode, the individual erase mode or the individual transmission mode in order to indicate that the reproduced image is a received image, the following advantage is achieved through the embodiment.

Since the user can immediately ascertain whether the reproduced image is a photographed image or a received image, he or she can promptly take appropriate action such as skip forward, erase or send, depending upon whether the reproduced image is a photographed image or a received image.

The embodiment, in which an attached image or a message related to the originator of a received image is displayed at the right screen 22 when the received image is reproduced in the received image reproduction mode or in the all image reproduction mode, achieves the following the advantages.

By indicating the originator with an attached image such as a face image or an icon that allows a visual identification of the originator, of the recipient can more intuitively identify the originator or the source compared to an originator identification achieved based upon an originator indication provided in text data or the like.

By displaying a face image, an icon or the like as an attached image on the screen, a more intimate communication is achieved.

Since the total data volume of the images to be erased or a transmitted is displayed at the right screen 22 before the erase or transmission operation is executed in the erase or transmission mode, the following advantages are achieved through the embodiment.

Since the user is able to ascertain prior to the erase or transmission operation how much storage capacity will become available in the memory card 104 by executing the image erase operation or the volume of the image data to be transmitted through the image transmission operation, he can make a decision as to whether or not to execute the erase or transmission operation or whether or not it is necessary to execute further erase or transmission operation based upon the information that has been ascertained and the current condition.

For instance, if the increase in the storage capacity to be achieved through an image erasure is smaller than the data volume of the image that the user intends to photograph subsequently, he can execute a further image erasure. In addition, if the data volume of the image to be transmitted is large and, at the same time, the user is likely to perform the next photographing operation during the transmission of the image, he can take necessary action such as canceling the image transmission.

Since any image set as erase disallowed is not displayed at the left screen 21 and thus is not handled as an erasure object from the start in the individual erase mode, the following advantage is achieved through the embodiment.

Since only the images set as erase allowed are displayed at the left screen 21 and the user selects images to be erased with the direction buttons 23 and 24, images can be selected and then erased with a high degree of efficiency.

Since any received image that has not been reproduced is not included in the erasure-object images in the batch erase modes for all images, received images, transmitted images and transmitted received images, the following advantages are achieved through the embodiment.

A received image that has not been reproduced is not erased by mistake.

All the reproduced images can be erased in a batch without having to screen them for any received images that have not been reproduced.

The embodiment, in which a specific originator is selected and the images having been received from the selected originator are erased or a transmitted in a batch in the batch erase mode for received images or the batch transmission mode for received images, achieves the following advantages.

Since received images are erased in a batch in correspondence to the individual originator, the received images can be dealt with in an efficient and sensitive manner.

For instance, if there are images originating from a business partner who transmits work-related images and images originating from a personal friend who transmits private images of less importance, such as private entertainment, the images of less importance can be erased in a batch.

In addition, it becomes possible to obtain a backup of images received from a specific originator with ease by transmitting the received images alone to an external image database.

The embodiment, in which the total data volumes of the received images having been transmitted by the individual originators are displayed to select a specific originator in the batch erase mode for received images or the batch transmission mode for received images, achieves the following advantages.

The user is enabled to ascertain the extra storage capacity in the memory card 104 which will become available as a result of executing an erase operation for a received image for each individual originators, or to ascertain the volumes of the image data to be transmitted in correspondence to the individual originators, before executing the erase or transmission operation by sorting the received images in correspondence to the individual originators. As a result, the user can make a decision as to whether or not the erase or transmission operation should be executed, or whether or not it is necessary to execute a further erase or transmission operation in a sensitive and efficient manner based upon both the information that he or she has ascertained and the current condition.

For instance, if the increase in the storage capacity to be achieved by erasing the received images transmitted from a specific originator is smaller than the data volume of the image the user intends to photograph subsequently, a further received-image-erase operation can be executed. In addition, if the data volume of the received images from a specific originator that are to be transmitted is large and, at the same time, the user is likely to need to perform a next photographing operation during the transmission of the image data, he can take appropriate action such as canceling the image transmission.

By adopting the embodiment in which transmitted images can be separately chosen and erased in the batch erase modes: transmitted images, transmitted photographed images and transmitted received images, the following advantages are achieved.

Since transmitted images can be automatically erased in a batch without having to manually sort (or screen) images for them for erasure, images that have been transmitted to an external personal computer or the like for a backup can be erased with a high degree of efficiency.

An inadvertent erasure of untransmitted images before securing their backup at an external location can be prevented.

Since transmitted images can be sorted and erased in units of the individual recipients in the batch erase modes: transmitted photographed images and transmitted received images, the following advantages are achieved through the embodiment.

By erasing transmitted images in a batch in units of the individual recipients, the transmitted images can be dealt with in an efficient and sensitive manner.

For instance, images may be transmitted to a single main external apparatus to build up an image database and accordingly, only the images having been transmitted to this external apparatus may be erased. As a result, an inadvertent erasure of images having been transmitted to external apparatuses other than this particular external apparatus can be prevented.

The embodiment, in which the total data volumes of the transmitted images are displayed in correspondence to the individual recipients to enable the user to select a specific recipient in the batch erase modes for transmitted photographed images and transmitted received images, achieves the following advantages.

The user is enabled to ascertain the extra storage capacity in the memory card 104 which will become available as a result of executing a transmitted image erase operation in units of the individual recipients before executing the erase operation by sorting the transmitted images in correspondence to the individual recipients and, as a result, he can make a decision as to whether or not the erase operation should be executed or whether or not it is necessary to execute a further erase operation in a sensitive and efficient manner based upon the information that he has ascertained and the current condition.

For instance, if the increase in the storage capacity to be achieved by erasing the transmitted images having been transmitted to a specific recipient is smaller than the data volume of the image the user intends to photograph subsequently, a further image erase operation can be executed.

By adopting the embodiment in which a transmission of any received image set as transfer disallowed is disallowed in the transmission mode, the following advantages are achieved.

If a received image has been set as transfer disallowed, the electronic camera 100 automatically selects the transmission-disallow setting for the image and disallows a change of the transmission-disallow setting. As a result, an inadvertent or intentional transmission of a received image set as transfer disallowed to the outside can be prevented.

Thus, even an image that the originator does not wish to have circulated randomly can be transmitted without worry by setting the image as transfer disallowed.

In addition, since the transfer disallowed setting attached to a received image cannot be overwritten at the electronic camera receiving the image, a further improvement in security is achieved.

Since an estimated transmission fee and an estimated transmission-time length are displayed in correspondence to the total data volume of the image files to be transmitted in the transmission mode, the following advantages are achieved through the embodiment.

Since the user can automatically ascertain in advance the transmission time length and the transmission fee pertaining to an image transmission without having to calculate them himself by taking into consideration various factors, he or she can make a decision as to whether or not to execute the transmission operation in a sensitive and effective manner based upon the information that he or she has ascertained and the current situation.

For instance, if the transmission fee is high, the image transmission may be canceled or postponed and the images can be transmitted at a different time (e.g., late at night when the transmission fees are lower).

In addition, if the transmission time length is greater than expected and the user needs to start the next photographing operation before the communication is completed, the image transmission may be canceled for the time being to transmit the images at another time or the like.

Since the image, the estimated transmission time length and the estimated transmission fee are displayed at the same time for an instantaneous verification in the individual transmission mode, a snap decision can be made with regard to whether or not the image should be transmitted.

By adopting the embodiment in which any image set as transmission disallowed is not displayed at the left screen 21 and thus is not handled as a transmission object image from the start in the individual transmission mode, the following advantage is achieved.

Since only the images set as transmission allowed are displayed at the left screen 21 and images to be transmitted can be selected with the direction buttons 23 and 24, images can be selected and transmitted faster and more efficiently.

Since images having already been transmitted to the selected recipient are not displayed at the left screen 21 and thus are not included in transmission object images from the start in the individual transmission mode, the following advantages are achieved through the embodiment.

Since only the images, that have not been transmitted to the selected recipient yet, are displayed at the left screen 21 and images to be transmitted can be selected with the direction buttons 23 and 24, the images can be selected and transmitted efficiently.

For instance, when images are transmitted to a specific recipient to build up an image database, none of the images having already been transmitted to the recipient are retransmitted by mistake.

Since the transmission history of the image to be transmitted is displayed before executing the transmission operation in the individual transmission mode, the following advantages are achieved through the embodiment.

Once an image is transmitted to a specific recipient for a backup, it is not transmitted by mistake to another recipient for a redundant backup.

In addition, since the transmission history is automatically displayed concurrently while the image data are displayed, the recipient, the transmission date/time and the image data can be checked easily and it is not necessary to perform a special operation in order to check the transmission history or to provide a special operating member for such purposes.

The embodiment, in which the settings as to whether or not a transfer of an image is to be disallowed and whether or not an attached image is to be included are selected immediately before the image is transmitted to the selected recipient in the individual transmission mode, achieves the following advantages.

The transfer disallow setting and the attached image setting can be selected in a sensitive manner for each of the images to be transmitted to a given recipient.

For instance, if the recipient of an image to be transmitted is a close friend, the recipient can be trusted not to transfer the image to unspecified third parties and the sender feels comfortable about the recipient transferring the image to his close friends. Thus, the sender may clear the transfer disallow setting and also, the intimacy of the communication may be enhanced by including an attached image.

If the recipient of the image to be transmitted is a relative stranger (such as a person whose information is not known by the sender), the sender may set image as transfer disallowed to prevent the image from being transferred to unspecified third parties and also, the sender may choose to transmit the image any attached image to maintain a businesslike relationship with the recipient.

The following advantage is achieved by adopting the embodiment in which the images to be transmitted are transmitted in a batch to the selected recipient in the batch transmission mode.

Unlike in the individual transmission mode, the recipient does not need to be set for each image. Thus, the transmission operation can be set up quickly and, at the same time, it is not necessary to communicate with the recipient before or after sending the individual images, to achieve a reduction in the overall length of the image transmission time and, ultimately, a reduction in the cost of the transmission.

Since only the untransmitted images are chosen and transmitted in the batch transmission modes: untransmitted images, untransmitted photographed images and untransmitted received images, the following advantages are achieved through the embodiment.

Since untransmitted images can be automatically transmitted in a batch without having to manually sort images for them, the images that have not been transmitted yet can be transmitted quickly and efficiently to obtain a backup by transmitting them to an external personal computer or the like or to build up an image database by transmitting them to an external apparatus.

It is possible to save on the extra transmission time and the extra transmission fee necessitated when transmitting in a batch images including those that have already been transmitted.

The following advantages are achieved by adopting the embodiment in which untransmitted images are selected and transmitted in units of the individual recipients in the batch transmission modes for untransmitted photographed images and untransmitted received images.

By transmitting in a batch the untransmitted images to a specific recipient, images that have not been transmitted yet can be transmitted in an efficient and sensitive manner.

For instance, when images are transmitted to a single main external apparatus to build up an image database, the user is enabled to transmit only the images that have not yet been transmitted to the external apparatus to achieve a faster and more efficient image transmission.

It is possible to save on the extra transmission time and the extra transmission fee necessitated when transmitting in a batch images including those that have already been transmitted to a specific recipient.

Since it is not necessary to conduct a manual search for images untransmitted to a specific recipient, a faster and more efficient image transmission is achieved.

(Examples of Variations)

The present invention is not limited to the embodiment explained above and allows for a number of variations and modifications.

While the electronic camera 100 includes the internal wireless communication circuit 71 to transmit photographed images to the outside and to receive images from the outside by engaging in a direct wireless communication with the wireless base station 120 via the wireless communication circuit 71 in the embodiment, the electronic camera 100 does not need to include an internal wireless communication circuit 71 and instead, it may transmit photographed images to the outside and receive images from the outside by achieving a wired connection with an external wireless communication device such as a portable telephone through wiring and by engaging in wireless communication with the wireless base station 120 via the external wireless communication device such as a portable telephone.

Since this eliminates the need to provide the wireless communication circuit 71 in the electronic camera 100, the electronic camera 100 can be constituted as a more compact unit and, in addition, the production cost can be reduced as well. As an alternative, the electronic camera 100 may be internally provided with a means for short-distance wireless communication such as Bluetooth system to directly transmit and received images to/from a external devices. Since this allows product information such as product images to be directly received from a short-distance wireless transmission device such as Bluetooth system installed at a shopping mall or the like, high-speed image communication can be achieved free of charge.

While images are exchanged between the electronic camera 100 and the outside personal computer, the outside image database and the outside electronic camera in the system achieved in the embodiment described above, the present invention may be adopted in a system in which the electronic camera 100 is replaced by a portable device capable of displaying, transmitting and receiving images. For instance, the embodiment may be adopted in image transmission/reception between portable telephones that are capable of image display, image transmission/reception between portable digital terminals (PDAs) and image transmission/reception between compact portable electronic photo-albums used to view digital images. By adopting the embodiment in portable devices that are mainly utilized outdoors or away from home, a high degree of security is assured in image transmission/reception between such portable devices as well. As a result, the features of the portable devices is further enhanced and fuller communication is achieved by utilizing portable devices. In addition, the embodiment may be adopted in product image exchange in the electronic commerce achieved by using portable devices, which has become increasingly common, to assure a higher degree of security and better efficiency in image operations.

In particular, by adopting the present invention in an electronic camera having an image-capturing function or a portable device such as a portable telephone with a camera, it becomes possible to transmit photographed images immediately to the outside with a high degree of efficiency while assuring security, and thus, a very spontaneous and, at the same time, very safe communication can be enjoyed in real time via transmitted images.

In addition, while the present invention may be effectively adopted in electronic cameras and portable image-handling devices such as portable telephones and portable terminals used by the general public, it can be also adopted to great advantage in electronic image apparatuses used by experts such as personal computers, workstations and image databases.

While images are transmitted/received between the electronic camera 100 and the outside personal computer, the external image database and the external electronic camera via a wired or wireless public telephone line or the Internet in the above embodiment, the present invention may alternatively be adopted in a system in which IP addresses are assigned to all the devices being used by individual users and images are transmitted/received completely through the Internet network by using these IP addresses. Since this greatly improves the information transfer rate over the information transfer rate in the image transmission/reception achieved by using, either partially or completely, telephone lines, images can be transmitted and received quickly in a stress-free manner. In addition, since highly advanced security technologies such as encryption can be used on the Internet, a higher level of security is achieved in the image transmission/reception and, at the same time, the communication cost can be lowered compared to the cost of the image transmission/reception achieved by using telephone lines. Furthermore, images can be transmitted and received by using dedicated lines, LAN lines such as ethernet or the like as well as telephone lines and the Internet.

While still images are transmitted to the outside from the electronic camera 100 in the embodiment, dynamic images may instead be transmitted to the outside. In addition, since an attached image is included just so that the recipient can identify the sender, the attached image may have been recorded at a higher compression rate or at a lower resolution compared to the image information (the main image). Moreover, if a dynamic image is included as the attached image, the movement of the image may be made coarser by reducing the number of frames so as to reduce the data volume.

While photographed images and received images are stored into the portable memory card 104 that can be loaded into/unloaded from the electronic camera 100, images may be stored into a nonvolatile internal memory (such as a flash memory) built into the electronic camera 100, instead. Since this eliminates the need to provide a loading mechanism for the memory card 104 at the electronic camera 100, the electronic camera 100 can be configured as a more compact unit with better portability.

While received images are stored into the received image folder in each individual user folder in the embodiment explained above, folders corresponding to individual originators may be provided under the received image folder so as to allow received image files to be stored into the folders corresponding to the individual originators. In such a case, received images can be erased or transmitted easily in correspondence to the individual originators in the batch erase mode for received images or the batch transmission mode for received images.

While the image data and the additional information data are stored into a single image file, as shown in FIG. 7 in the embodiment described above, the image data and the additional information data may be stored into separate files and these files may be managed by using a list in which each file containing image data is made to correlate to a file containing the corresponding additional information data. Since this allows image data alone to be operated independently, an image data exchange between image systems adopting different image file structures is facilitated.

While the left screen 21 and the right screen 22 are each constituted of an LCD in the embodiment, other display devices such as self-light-emitting organic EL (electroluminescent) display devices may be used instead.

While the position of the electronic camera 100 during a photographing operation is detected by the GPS circuit 61 in the embodiment described above, the wireless communication circuit 71 may be employed as a means for positional detection and the information indicating the position of the electronic camera 100 may be obtained through a communication with the wireless base station 120 instead. While the accuracy of the detection achieved in this manner is not as high as that of the positional detection executed with a GPS unit, the latter configuration, which does not require the GPS circuit 71, makes it possible to offer a more compact and less expensive electronic camera 100.

While the image information is displayed at the left screen 21 and the data information is displayed at the right screen 22 in the embodiment described above, the data information may be superimposed on the image information in the display (superimposed display) brought up on a single screen instead.

For instance, when superimposing the data information over the image information displayed at the left screen 21, the size of the data information display should be set smaller than the size of the main image (it is desirable to set the size of the data information display equal to or smaller than approximately ¼ of the screen in order to assure visibility of the main image) and the data information display should be set at the periphery of the screen (it is desirable to set the data information display at one of the four corners of the substantially quadrangular screen in order to assure visibility of the main image).

In addition, the CPU 50 may execute an image analysis by using the image information on display, select an optimal position at which the data information should be displayed (a position at which the data information can be displayed unobtrusively without intruding on the main image) and bring up a superimposed display of the data information at the selected position. For instance, by selecting an area of the image information where the brightness changes relatively little (where the contrast changes relatively little, i.e., an area highly likely to be background such as the sky), it can be ensured that the visibility of the main image is not compromised by the superimposed display of the data information.

Furthermore, in order to ensure that the data information in the superimposed display can be read with ease, the data information may be displayed as black text if the selected area achieves a relatively high brightness level and the data information may be displayed as white text if the selected area achieves a relatively low brightness level. Alternatively, the hue of the selected area may be detected and the data information may be presented in a superimposed display in a hue which stands out against the detected hue. In addition, the data information may be made clearly distinguishable from the main image by displaying the data information in black and white if the main image is a color image or by enclosing the data information display with a frame. Moreover, an area corresponding to a person or a face (an area highly likely to correspond to the main photographic subject) may be extracted from the image information through image analysis and the data information may be presented in a superimposed display over an area other than the area corresponding to the person or the face.

The superimposed display of the data information may be cleared after a predetermined length of time (up to approximately 5 seconds) elapses following the start of the data information display so as to ensure that the data information display does not distract from the presentation of the main image.

In addition, the data information does not need to be superimposed over the main image either, and it may simply be displayed at a peripheral position of the screen with its display size set smaller than the display size of the main image while the main image is displayed within the same screen.

The measures described above make it possible to provide a highly visible superimposed display of the data information in an area of less importance in the main image, without greatly distracting the user from viewing the main image. Since both the main image and the data information can be displayed at a single LCD (liquid crystal display screen) by adopting the measures described above, it becomes possible to offer a more compact and less expensive electronic camera 100.

If a new image file addressed to the current user of the camera is received from the outside in the received image reproduction mode or the all image reproduction mode in the embodiment, the received image may be immediately brought up on display at the screen replacing the image being displayed at that time. This allows appropriate action to be taken with regard to the received image (such as providing a response) without delay.

In the embodiment described above, the LED 28 is turned on to indicate that there is a received image addressed to the user that has not been reproduced in the photographing mode, the reproduction mode, the erase mode and the transmission mode. Instead, the user may be alerted to the presence of a received image unreproduced by displaying the value of the originator of the unreproduced received image in text or a face image or the like attached to the unreproduced received image over the main image currently reproduced and displayed at the left screen 21.

Figure 74:
FIG. 74 presents an example of a screen display of a face image.

For instance, when displaying a face image or the like attached to the unreproduced received image by superimposing the attached image over the main image at the left screen 21, the size of the face image or the size of the text display indicating the originator should be set smaller than the size of the main image (it is desirable to set the size of the face image or the like equal to or smaller than approximately ¼ of the screen to assure the visibility of the main image), as shown in FIG. 74. In addition, the face image or the text display of the originator name should be placed in a peripheral area at the screen (it is desirable to set it at one of the four corners of the substantially quadrangular screen in order to assure visibility of the main image).

In addition, the CPU 50 may execute an image analysis by using the image information on display, select an optimal position at which the face image or the text display of the originator name should be displayed (a position at which the face image or the text display of the originator name can be displayed unobtrusively without intruding into the main image) and bring up a superimposed display of the face image or the originator name in text display at the selected position. For instance, by selecting an area of the image information where the brightness changes relatively little (where the contrast changes relatively little, i.e., an area highly likely to be background such as the sky), it can be ensured that the visibility of the main image is not compromised by the superimposed display of the face image or the originator name in text and, at the same time, good visibility can be assured for the face image or the text display of the originator. Furthermore, in order to ensure that the text of the originator name in the superimposed display can be read with ease, the originator name may be displayed as black text if the selected area achieves a relatively high brightness level and the originator name may be displayed as white text if the selected area achieves a relatively low brightness level. Alternatively, the hue of the selected area may be detected and the face image or the text display of the originator name may be superimposed in a hue that stands out against the hue of the selected area. In addition, the face image or the text display of the originator name may be made clearly distinguishable from the main image by displaying the face image or the text of originator name in black and white if the main image is a color image or by enclosing the face image or the text of the originator name with a frame. Moreover, an area corresponding to a person or a face (an area highly likely to correspond to the main photographic subject) may be extracted from the image information through image analysis and the face image or the text display of the originator name may be presented in a superimposed display over an area other than the area corresponding to the person or the face.

The superimposed display of the face image or the originator name in text may be cleared after a predetermined length of time (up to approximately 5 seconds) elapses following the start of the face image display or the text display of the originator name display so as to ensure that the superimposed display does not distract from the presentation of the main image. The face image or the text display of the originator name may be brought up over a predetermined time interval or in response to an operation of an operating key 65.

In addition, the face image or the display of the originator name in text does not need to be superimposed over the main image either, and it may simply be displayed at a peripheral position of the screen with its display size set smaller than the display size of the main image while the main image is displayed within the same screen.

By adopting these measures, it becomes possible to notify the user of the presence of a received image that has not been reproduced without the LED 28 and to achieve a superimposed display of the face image or the originator's name in text over an area of the main image of less importance while achieving good visibility without greatly detracting from the presentation of the main image. Since the user is provided with the information indicating the originator of the received image unreproduced, the user is able to make a prompt decision as to whether he should reproduce the received image immediately or the image can be left for the time being to be reproduced later, as well.

In the embodiment described above, a personal identification may be executed by comparing an iris image pattern of the photographer taken in by, for instance, a means for iris detection built into the eyepiece portion of the viewfinder 11 via a half mirror with iris image patterns of pre-registered individuals. This structural feature allows a means for iris detection to be built into the viewfinder 11 of the electronic camera 100 without taking up a great deal of space. Alternatively, a personal identification may be achieved through fingerprint recognition, face image recognition, voice recognition or the like.

While the personal identification is executed when the power is turned on in the embodiment, a personal identification may be executed over a predetermined time interval or in response to an operation of an operating member (operating key) of the electronic camera 100 so as to identify the new user replacing the original user while the power is on. This may be achieved by constituting the shutter release button 16 as a 2-stage push button (a half-way press stage and a full press stage), executing personal identification in response to a half-way press operation of the shutter release button 16 and executing a photographing operation in response to a full press operation of the shutter release button 16. Since the shutter release button 16 is invariably pressed half way down prior to a photographing operation, the person who has photographed a given image can be identified with a high degree of reliability.

While the individual user folder into which a given image is stored is selected based upon the results of the personal identification in the embodiment, the recipient of an image may be automatically determined based upon the results of the personal identification, as well. Since this allows images photographed in the electronic camera 100 to be transmitted to the correct recipient, e.g., the user's personal computer at home, at all times and eliminates the need to set the recipient each time, an efficient image transmission is achieved.

In addition, a personal identification may be executed by analyzing a photographed face image and, in such a case, the photographed image can be automatically transmitted to the photographed person based upon the results of the personal identification. Furthermore, if a personal identification can be executed through wireless communication or the like between a portable terminal carried by the person to be photographed and the electronic camera 100, the photographed image may be automatically transmitted to the photographed person based upon personal identification data obtained from the portable terminal carried by the subject person during the photographing operation.

While a given image is stored into the correct individual user folder based upon the results of the personal identification in the embodiment, the correlation between images and individuals may be defined by using the personal identification data contained in the additional information data shown in FIG. 8 instead of defining the correlation between images and individuals by using the folders. For instance, the personal identification data contained in the additional information data may be recorded into the photograph image database upon the results of a personal identification executed during the photographing operation. In addition, personal identification data may be included in the reception information data as well so that a personal identification is achieved with regard to received image data in correspondence to the image addressee and the results of the identification are recorded as part of the personal identification data contained in the reception information data. If such a method is adopted, it is no longer necessary to manage the individual user folders.

While the LED 29 is turned on to indicate that the image currently displayed at the left screen 21 is a received image in the embodiment described above, a received image displayed at the left screen 21 may be framed in a specific color or a specific pattern to enable the user to identify it as a received image. By displaying received images in a mode different from the display mode for photographed images as described above, the LED provided to enable received image identification is no longer required. Alternatively, a voice message or a text display may be provided to indicate that the image on display is a received image.

In the embodiment described above, a face image or an icon attached to a received image is concurrently displayed while reproducing and displaying the received image so as to allow the user to intuitively recognize the originator of the received image. Instead, icons or face images of individual originators may be stored in advance into the memory, each in correspondence to a specific originator, at the electronic camera that receives images, the information indicating the image originator may be stored into the memory together with any image received from the outside and the face image or the icon corresponding to the originator information attached to the received image may be reproduced and displayed together with the received image. In such a case, the data storage capacity of the memory can be more efficiently utilized and an image can be transmitted faster to achieve a reduction in the transmission fee, compared to the example in which face images or the like are transmitted as attachments to individual images.

While a single image set as an attachment in the transmission information data shown in FIG. 9 can be attached to a given image to be transmitted in the embodiment described above, a plurality of images may be set as attachments, instead. In such a case, if the user chooses to attach an image to the image being transmitted, he can select one or a plurality of image attachments from a plurality of image attachment candidates. As a result, the user can select and attach an optimal image attachment to a given image being transmitted, depending upon the type of the image (business or private). Furthermore, a dynamic image may be used as an attached image to further improve the accuracy with which the image recipient identifies the sender.

In addition, the photographer or the sender of an image being transmitted may be determined based upon the personal identification data recorded during the photographing operation or the results of the personal identification obtained at the personal identification circuit 75 during the image transmission, and an icon image or a face image corresponding to the photographer or the sender of the image being transmitted may be selected from pre-registered icon images or face images in conformance to the personal identification data or the results of the personal identification, to automatically attach the selected icon image or face image to the image being transmitted. Icon images may be downloaded as necessary from an icon image site on the Internet. Since this eliminates the need for performing the task of selecting an image attachment, a more efficient image transmission is achieved.

Moreover, an icon image or a face image may also be used to represent an image owner, a copyright holder and the like as well as an image photographer or sender. In this case, an icon image or a face image attached to an image to represent the photographer, the owner or the copyright holder of the image cannot be erased or replaced with another attached image, and when the received image is further transferred to another outside recipient, the originally attached image included in the received image must be left attached to the image without any change. Since the recipient of the image can readily identify the photographer, the owner or the copyright holder of the received image, possible trouble related to the copyright to the image can be prevented.

In the embodiment, a face image is attached to an image being transmitted to the outside so as to enable the recipient to visually and intuitively identify the sender. The sender identification may be further facilitated by executing image processing with the CPU 50 to extract the face portion from the face image set as the image attachment and transmitting the face portion alone as the attached image with no background. Alternatively, the CPU 50 may combine a preselected background image with the extracted face portion through image synthesis processing and transmit the synthesized image as the attached image. In this case, the face image set against an easy-to-see background which also suits the sender's interest or taste instead of the background of the original face image, can be attached.

In the embodiment described above, the reproduced received image and the attached image are simultaneously brought up on display at the left screen 21 and the right screen 22 respectively in the received image reproduction mode or the all image reproduction mode. However, when reproducing an image received from the outside in the received image reproduction mode, the all image reproduction mode, the individual erase mode or the individual transmission mode, the attached image, information on the photographing location or the like may be superimposed over the received image displayed at the left screen 21, instead.

Figure 75:
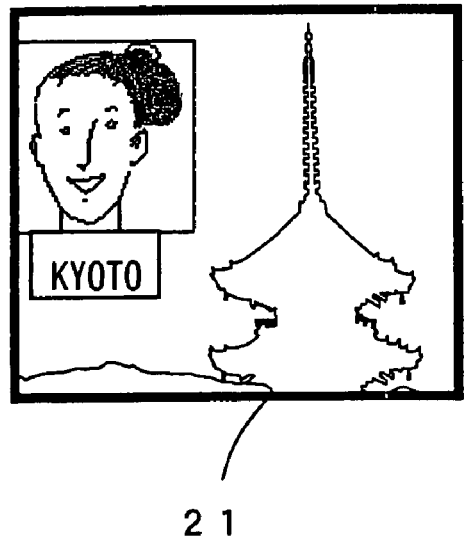
FIG. 75 presents an example of a screen display of a face image.

For instance, when displaying a face image attached to the received image or information on the location where the received image was photographed by superimposing the attached image or the information over the main image at the left screen 21, as shown in FIGS. 74 and 75, the size of the face image or the text display indicating the photographing location should be set smaller than the size of the main image (it is desirable to set the size of the face image or the text display equal to or smaller than approximately ¼ of the screen to assure the visibility of the main image). In addition, the face image or the text display indicating the photographing location should be placed in a peripheral area of the screen (it is desirable to set it at one of the four corners of the substantially quadrangular screen in order to assure visibility of the main image).

In addition, the CPU 50 may execute an image analysis by using the image information on display, select an optimal position at which the face image or the text display indicating the photographing location should be displayed (a position at which the face image of the photographing location in text can be displayed unobtrusively without intruding into the main image) and bring about a superimposed display of the face image or the text display of the photographing location at the selected position. For instance, by selecting an area of the image where the brightness changes relatively little (where the contrast changes relatively little, i.e., an area highly likely to be background, such as the sky), it can be ensured that the visibility of the main image is not compromised by the superimposed display of the face image or the photographing location information in text, and, at the same time, good visibility can be assured for the face image or the text display indicating the photographing location. Furthermore, in order to ensure that the photographing location information in text in the superimposed display can be read with ease, the photographing information may be displayed in black text if the selected area achieves a relatively high brightness level and the photographing location may be displayed in white text if the selected area achieves a relatively low brightness level. Alternatively, the hue of the selected area may be detected and the face image or the photographing location information in text may be presented in a superimposed display in a hue which stands out against the detected hue. In addition, the face image or the text display of the photographing location may be made clearly distinguishable from the main image by displaying the face image or the photographing location information in text in black and white if the main image is a color image or by enclosing the face image or the text display of the photographing location with a frame. Moreover, an area corresponding to a person or a face (an area highly likely to correspond to the main photographic subject) may be extracted from the image information through image analysis and the face image or the photographing location information in text may be presented in a superimposed display over an area other than the area corresponding to the person or the face.

In addition, the face image or the text display of the photographing location does not need to be superimposed over the main image either, and it may simply be displayed at a peripheral position of the screen with its display size set smaller than the display size of the main image while the main image is displayed within the same screen.

The superimposed display of the face image or the photographing location in text may be cleared after a predetermined length of time (up to approximately 5 seconds) elapses following the start of the face image display or the text display of the photographing location so as to ensure that the superimposed display does not detract from the presentation of the main image. The face image or the text display of the photographing location may be brought up on display over a predetermined time interval or in response to an operation of an operating key 65. Also, once a received image has been reproduced and displayed, the superimposed display of the face image or the photographing location information in text does not need to be brought up again when the same received image is displayed subsequently, so that the received image can be viewed without any obstruction. Instead of superimposing the attached image, the information indicating the photographing location or the like over the received image displayed at the left screen 21, information indicating the originator of the received image may be superimposed over the received image in text. Moreover, the information indicating the photographing location may be provided as a symbol image representing the photographic location and superimposed over the received image.

By adopting the procedures described above, it becomes possible for the recipient of the image to intuitively identify the recipient of the received image or the photographing location when the received image is reproduced without requiring two screens. In addition, since the originator or the photographing location can be verified when the received image is viewed, a simultaneous verification can be made without having to perform a separate operation to verify the originator or the photographing location and also, since all the display can be provided at a single LCD for screen display, amore compact and less expensive electronic camera is achieved. Furthermore, the face image or the text display of the photographic location can be superimposed over an area of less importance in the main image while achieving good visibility without greatly detracting from the view of the main image.

Figure 76:
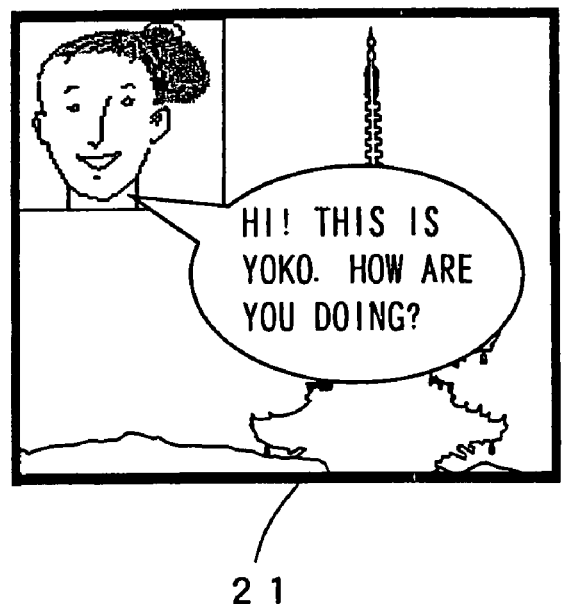
FIG. 76 presents an example of a screen display of a face image.

By displaying a message in a balloon set near the face image as shown in FIG. 76, more fun and intimacy can be created through the communication. Alternatively, a message attached to the image information as audio information may be output as an audio message through the speakers 14 when displaying the face image. Furthermore, a portion of the face image corresponding to the mouth may be ascertained through an image recognition and the shape of the image of the mouth in the face image may be manipulated by interlocking with the sound generation to achieve the impression that the person in the face image is actually talking. By adopting these measures, the information can be transmitted visually and audibly through multiple media and, as a result, the quality of the communication is further enhanced.

The image attached to a received image may be automatically superimposed over the received image only when the received image is reproduced for the first time, and the superimposed display of the attached image may be brought up when reproducing the received image having been previously reproduced through an operation of an operating member. Since the superimposed display of the attached image indicating the image recipient is automatically brought up when a received image is reproduced for the first time, the recipient can be verified with ease and, at the same time, the user is allowed to view the received image without the attached image obstructing the main image when the received image is reproduced subsequently while he can still verify the recipient whenever necessary.

In the embodiment described above, the CPU 50 may execute voice recognition and analysis on audio information input through the microphones 15 to convert it to text information and store the text information into the memory card 104 as message information data. In this case, message information can be input with ease.

Figure 77:
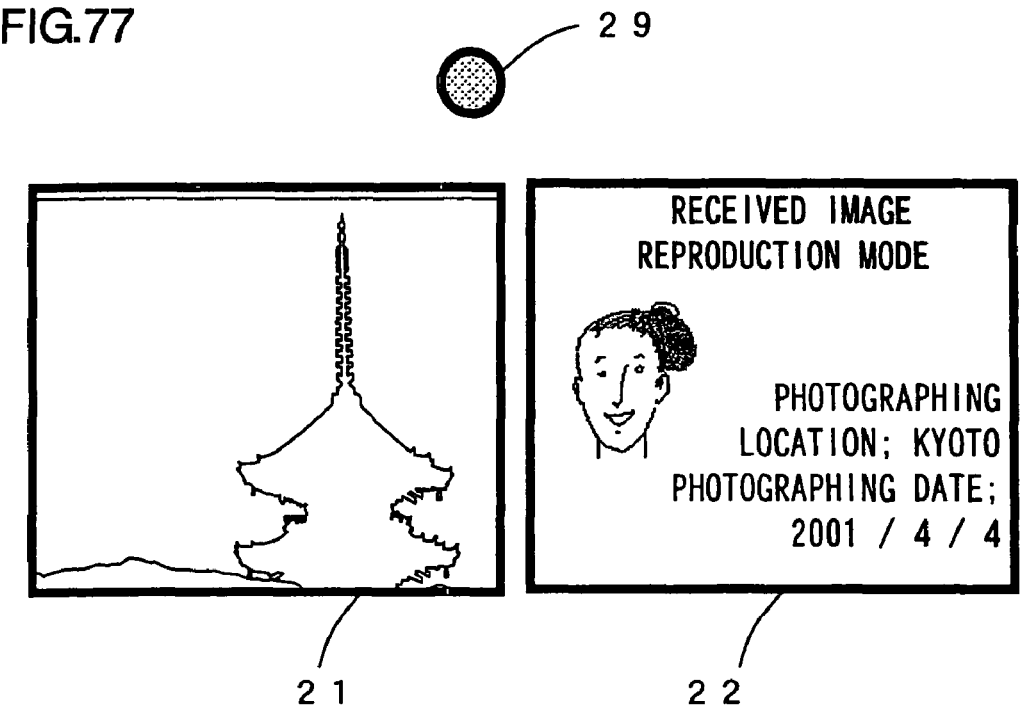
FIG. 77 presents an example of a screen display of a face image.

In the embodiment described above, when a received image is reproduced in the received image reproduction mode or the all image reproduction mode, face image information for enabling the identification of the image originator and message information are displayed at the right screen 22, as shown in FIG. 33. Instead, face image information, photographing location information and photographing date/time point information may be displayed at the right screen 22, as shown in FIG. 77. In such a case, the photographing location information and the photographing date/time-point information can be prepared based upon the position information data and the photographing time point data included in the additional information data in the received image file. The photographing location data may be displayed as icon information or image information indicating the photographic location to further facilitate the photographing location identification. For instance, if the photographing location is New York, an image of the Statue of Liberty may be used. Since the user can verify the photographing location and the photographing date/time while he is checking the originator, the user can search for a desired image with ease when there are numerous received images similar to one another. In addition, since the information for enabling the originator identification and the photographing location identification can be displayed without depending upon a specific language, communication featuring images can be enjoyed on a global basis. Furthermore, other information such as the photographing information data may be displayed at the right screen 22.

In the embodiment described above, a single image is displayed at a screen and the display image is switched by operating the direction buttons 23 and 24 in the reproduction mode, the individual erase mode and the individual transmission mode. Instead, a specific image may be selected from a thumbnail image display in which numerous images are displayed at a single screen. In this case, an image selection is achieved through the touch tablet 66 or the like. Consequently, an image selection can be achieved more easily and quickly than the image selection executed by sequentially scrolling the image display with the direction buttons 23 and 24.

While the erase disallowed/allowed setting and the transmission disallowed/allowed setting are selected manually for each image in the reproduction mode in the embodiment, the erase disallowed/allowed setting and the transmission disallowed/allowed setting may be automatically selected in response to an image operation. For instance, in S42 in the reception interrupt processing subroutine shown in FIG. 16, the received image may always be set as erase disallowed or transmission disallowed, or if an image being transmitted in the transmission mode is originally set as erase disallowed, the image may be reset as erase allowed at the time of image transmission. In addition, if an image having been reproduced in the reproduction mode, the erase mode or the transmission mode is originally set as erase disallowed, the image may be reset as erase allowed, images photographed in the photographing mode may be uniformly set as erase disallowed, or unreproduced images that have never been reproduced may be uniformly set as erase disallowed in all cases, and images that have been reproduced may be automatically reset as erase allowed in the reproduction mode, the erase mode or the transmission mode. Since these measures eliminate the need for individually selecting images and manually selecting the erase-disallow setting and the transmission-disallow setting for each image, the settings can be selected without having to go through a time-consuming process and, at the same time, it is assured that the user never inadvertently fails to set images as erase allowed/disallowed or transmission allowed/disallowed. In addition, since received images are not transmitted to the outside by mistake or erased by mistake, better security is assured. Furthermore, when the CPU 50 automatically erases images from the memory card 104 over a preset time interval or at a preset time based upon the time count information obtained provided by the timer 74, an inadvertent erasure of necessary images can be prevented by automatically setting the images as erase disallowed/allowed or transmission disallowed/allowed in response to a specific image operation. Moreover, an image that is no longer needed can be erased with ease.

While the erase-disallow setting and the transmission-disallow setting are selected for each image in the reproduction mode in the embodiment described above, an image may be set as print disallowed, process disallowed or display disallowed as well. These measures will further improve the security of the image.

While the erase-disallow setting and the transmission-disallow setting are selected for each image in the reproduction mode in the embodiment described above, the erase disallow or transmission-disallow settings may be selected in a batch for a plurality of images, instead. For instance, by setting all the received images as transmission disallowed or erase disallowed in a batch, an inadvertent failure to set any of the received images as erase disallowed or transmission disallowed can be prevented.

While images set as erase allowed are manually erased in the individual erase mode and the batch erase mode in the embodiment described above, images set as erase allowed may be automatically erased, instead. For instance, the CPU 50 may erase images stored in the memory card 104 via the wireless communication circuit 71 over a predetermined time interval or at a specified date/time, may erase an image when a predetermined length of time has elapsed after it was reproduced the last time, may erase an image when a predetermined length of time has elapsed after it was stored into the memory card 104, or may erase images that have not been reproduced frequently (images with a small number of reproductions per unit time), based upon the time count information provided by the timer 74. In addition, instead of automatically erasing all images set as erase allowed, the received images set as erase allowed or the images set as erase allowed the have already been transmitted alone may be automatically erased. These measures eliminate the need to perform a special image erase operation and, at the same time, no images are left unerased inadvertently, so as to achieve efficient utilization of the memory. Moreover, since an image that is no longer needed is not left unerased by mistake, better security is assured.

Figure 78:
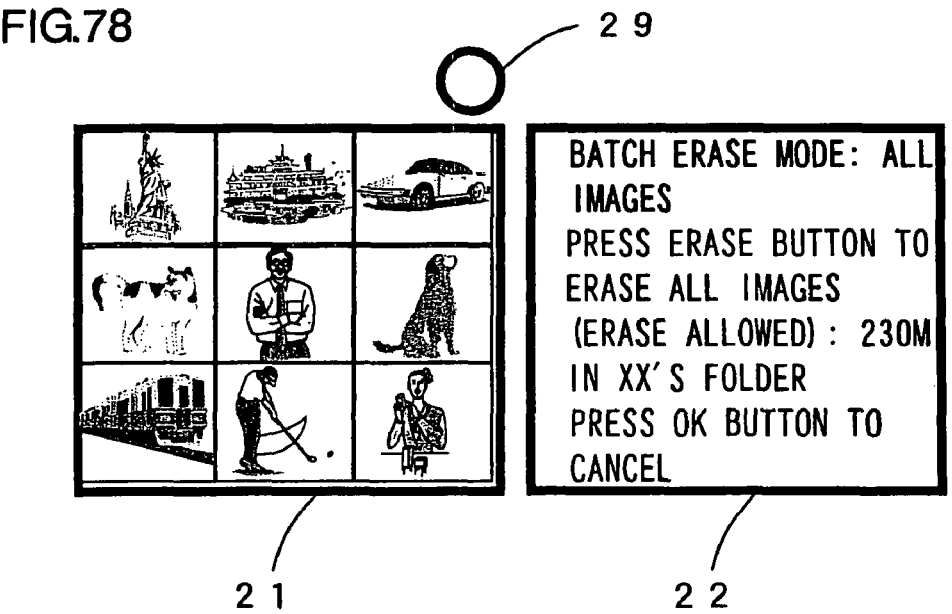
FIG. 78 presents an example of a screen display of thumbnail images.
Figure 79:
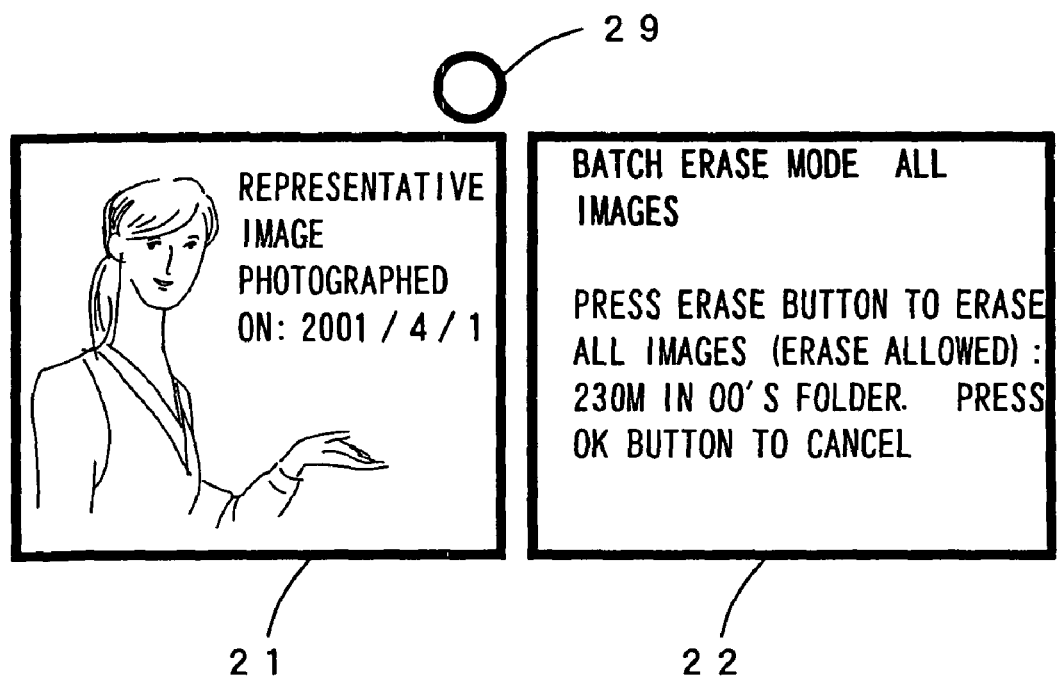
FIG. 79 presents an example of a screen display of a representative image.

In the embodiment, no image is displayed at the left screen 21 in the batch erase mode or the batch transmission mode. However, thumbnail images of the images to be erased or transmitted may be displayed together at the left screen 21, as shown in FIG. 78, or an image representing all the images to be erased or transmitted (the most recently photographed image or the most recently received image) may be displayed at the left screen 21, as shown in FIG. 79, instead. Since these measures give the user an opportunity to quickly verify the images to be erased or transmitted through a batch erasure or a batch transmission, erasure or transmission of an image not intended for erasure or transmission can be prevented.

While images set as transmission allowed are manually transmitted in the individual transmission mode and the batch transmission mode in the embodiment described above, images set as transmission allowed may be automatically transmitted, instead. For instance, the CPU 50 may transmit images stored in the memory card 104 to the outside over a predetermined time interval or at a specified date/time via the wireless communication circuit 71 based upon the time count information provided by the timer 74. In addition, instead of automatically transmitting all the images set as transmission allowed, the received images set as transmission allowed or the untransmitted images set as transmission allowed alone may be automatically transmitted. These measures to eliminate the need to perform a special image transmission operation and, at the same time, an inadvertent failure to transmit an image can be prevented.

While no image attachment is sent or images are not set as transfer disallowed in the batch transmission mode in the embodiment described above, an image attachment may be set and the transfer disallow setting may be selected for the images to be transmitted in a batch, instead. This allows the recipient of the images transmitted in a batch to identify the sender of the images easily and, at the same time, an uncontrolled circulation of the images to unspecified third parties can be prevented.

While the image recipient is first selected and then the image to be transmitted is selected in the individual transmission mode in the embodiment described above, the procedural order may be reversed and the recipient may be selected after the image to be transmitted is selected. In the latter case, the image can be selected while checking its transmission history and thus, the same image is not transmitted twice to a given recipient by mistake.

In the embodiment described above, a single image is transmitted to a given recipient in the individual transmission mode. However, an image may be selected and transmitted to a plurality of selected recipients, a plurality of images may be selected and transmitted to a single selected recipient or a plurality of images may be selected and transmitted to a plurality of selected recipients as well.

While the transfer disallow setting is selected for each image to be transmitted in the individual transmission mode in the embodiment described above, all the images to be transmitted may be uniformly set as transfer disallowed, instead. This eliminates the need to set the individual images as transfer disallowed and, at the same time, no images are left as transfer allowed inadvertently or no setting error is committed, to further improve the security.

In the embodiment described above, an image transmitted to a recipient is prevented from being further transferred to an outside third party by setting the image as transfer disallowed in the individual transmission mode. However, an image file transmitted to a recipient may be set as copy disallowed or relocation disallowed to prevent the image file from being copied or relocated at the recipient instead of or as well as setting the image file as transfer disallowed to prevent it from being transferred to the outside. In addition, an image to be transmitted may be set as print disallowed to ensure that the image set as print disallowed cannot be printed by the recipient of the image. These measures prevent circulation of the image to the outside through a printing medium. Moreover, an image to be transmitted may be set as image processing disallowed to disallow any processing of the transmitted image at the recipient, as well. Since this protects the image received at the recipient from any processing that goes against the intent of the photographer, a potential violation of copyright can be prevented. Furthermore, an image to be transmitted may be set as display disallowed to disallow any display of the transmitted image at the recipient. In this case, the display disallowed setting for the image can be cleared only by the sender of the image. Alternatively, specific display restrictions may be imposed with regard to an image to be transmitted to allow only a specified user at the image transmission addressee to display the image, or any viewers other than the specified user at the image transmission addressee may be only allowed to view the image reproduced at a low resolution (such as a mosaic image) to ensure that they cannot see any detail in the received image. The correct user may be identified through the personal identification circuit 75, or he may be identified by using a password set by the image sender and the image recipient. Through these measures, it becomes possible to ensure that an image transmitted to the recipient is not viewed by any third party.

Figure 80:
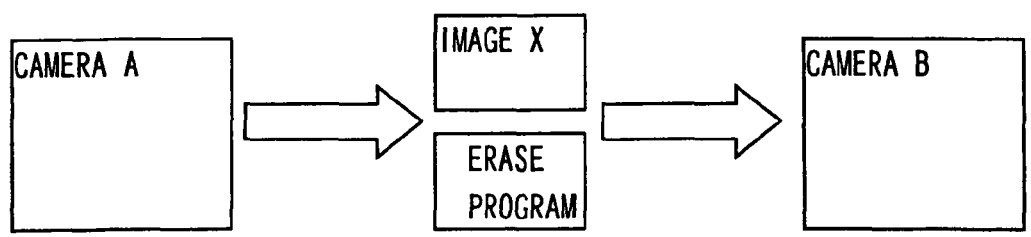
FIG. 80 illustrates another embodiment of the present invention.

In the embodiment described above, an image having been transmitted to the recipient is prevented from being transmitted to another party by setting the image as transfer disallowed in the individual transmission mode. Alternatively, an image to be transmitted may be set for self erasure so that the transmitted image automatically erases itself when a predetermined length of time elapses after it is received at the recipient. For instance, when transmitting an image X from a camera A to a camera B, as shown in FIG. 80, an erase program may be transmitted as an attachment. In conformance to this erase program, the image X having been received at the camera B is erased upon detecting the passage of a predetermined length of time. As a result, the risk of the transmitted image becoming distributed to an unspecified number of recipients can be reduced and, at the same time, an advantage is achieved for the recipient of the image in that an image, the value of which rapidly diminishes as the time elapses (e.g., a news image), or an image used as a communication tool (e.g., an image exchanged between portable telephones mounted with cameras) does not need to be manually erased when it is no longer needed.

Instead of attaching an erase program, data indicating a length of time to elapse before the erasure may be attached to the image being transmitted and the image X may be erased in conformance to a program built into the camera B to achieve similar advantages. In addition, regardless of the self erasure setting selected for a received image, the received image may be automatically erased when a predetermined length of time has elapsed after the image is received from the outside. In this case, the image can be erased without having to perform a separate erase operation and, at the same time, efficient utilization of memory is achieved. Furthermore, when automatically erasing a received image, the image to be erased may be automatically brought up on display at a screen to allow the user to verify the image to be erased and to allow him to cancel the execution of the erase operation if necessary. Through these measures, an automatic erasure of a received image against the user's wishes can be prevented.

Alternatively, the camera A may transmit the image X by attaching information specifying the date/time at which the image X should be erased and the camera B may automatically erase the received image X at the specified date/time instead of erasing the image when the predetermined length of time has elapsed. As a further alternative, the camera A may transmit the image X by attaching information indicating the number of reproductions and the image X may be automatically erased at the camera B if the received image X has been reproduced the specified number of times at the specified date/time after the reproduction is completed.

Furthermore, instead of erasing the image when the predetermined length of time has elapsed, the camera A may store in memory the camera B as the recipient of the image X and may transmit an erase instruction to the camera B by calling up the recipient of the image X from its memory and specifying the image X if the camera A side wishes to erase the image X having been transmitted. Upon receiving the erase instruction for the image X from the camera A, and erase program may be started up at the camera B to automatically erase the image X after verifying that the erase instruction has been transmitted from the camera A, i.e., the sender of the image X. It is to be noted that the image X is specified by its image file name. These measures are particularly effective when it becomes necessary to have an image erased after it is transmitted due to a change in the circumstances, since the user of the camera A is able to have the image having been transmitted to the camera B erased at any time. The erase program may be built into the camera B as well. In addition, the command issued by the camera A may be a command for restricting another image operation, such as a transfer disallow instruction, a print disallow instruction, a display disallow construction, a display limit instruction, a processing disallow instruction or a copy disallow instruction, other than the erase instruction.

Figure 81:
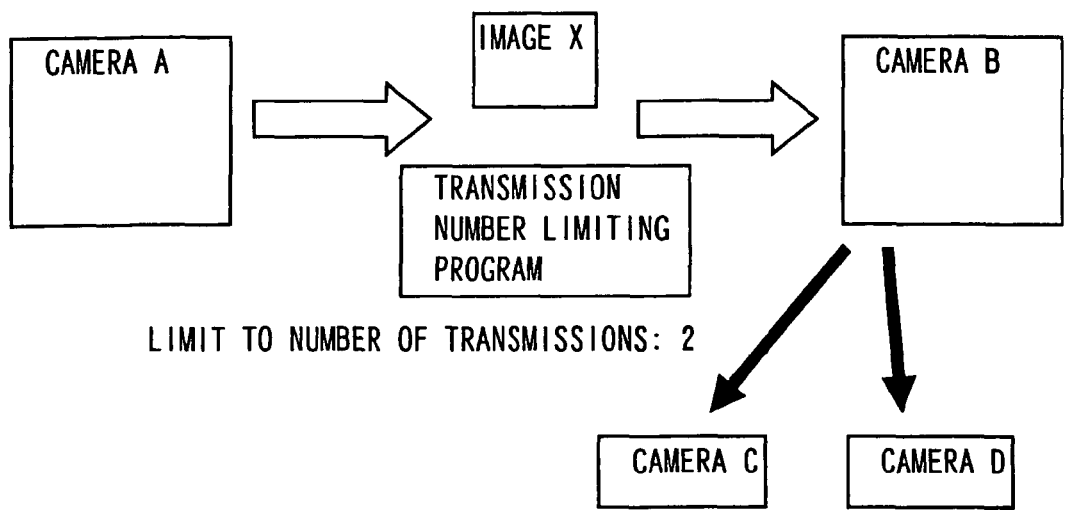
FIG. 81 illustrates yet another embodiment of the present invention.

Instead of setting an image as transfer disallowed, as in the embodiment described above, a limit may be set on the number of times the image can be transmitted or transferred. For instance, when the image X is transmitted from the camera A to the camera B in FIG. 81, a transmission-number-limiting program which sets the limit to the number of transmissions to 2, may be transmitted as an attachment. Accordingly, at the camera B, the received image X can be transmitted twice under the control implemented in conformance to the transmission-number-limiting program. In FIG. 81, the image X is transmitted from the camera B to a camera C and a camera D. In this case, the image X transmitted from the camera B is set as transfer disallowed.

Also, when the image X is transmitted from the camera A to camera B as shown in FIG. 82, a transfer-number-limiting program setting the limit to the number of transfers to 1 is transferred as an attachment. The camera B is allowed to transmit the received image X under the control implemented in conformance to the transfer-number-limiting program. In the example presented in FIG. 82, the camera B transmits the image X to the camera C. When the camera B transmits the image X, the transfer-time-limiting program having the limit to the number of transfers decreased by 1 is attached to the image X. In this example, the limit to the number of transfers set for the image X transmitted to the camera C is 0, i.e., the image X is set as transfer disallowed. As an alternative, the transmission-number-limiting program or the transfer-number-limiting program may be built into the camera B and the camera A may transmit transmission number limit data or transfer number limit data to the camera B as an attachment.

Figure 83:
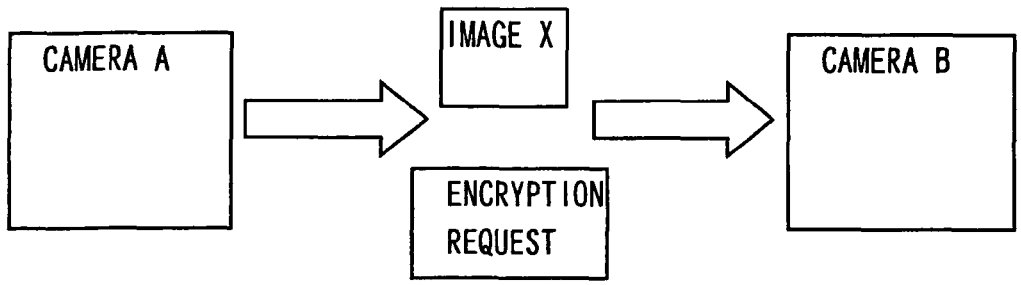
FIG. 83 illustrates yet another embodiment of the present invention.

In the embodiment, an image being transmitted is set as transfer disallowed to ensure that the image is not circulated to an unspecified number of third parties. Instead, as shown in FIG. 83, for instance, the camera A may attach an encryption request to the image X being transmitted to the camera B. In this case, upon receiving the image X and the encryption request, the camera B encrypts the image X by using a password b and saves the encrypted image into memory. When displaying the image X having been encrypted, the password b is entered to clear the encryption. It is to be noted that the image X having the encryption request attached thereto cannot be saved as a raw image. As a result, the risk of a received image being viewed by a party other than the owner of the apparatus at which the image has been received is avoided.

Figure 84:
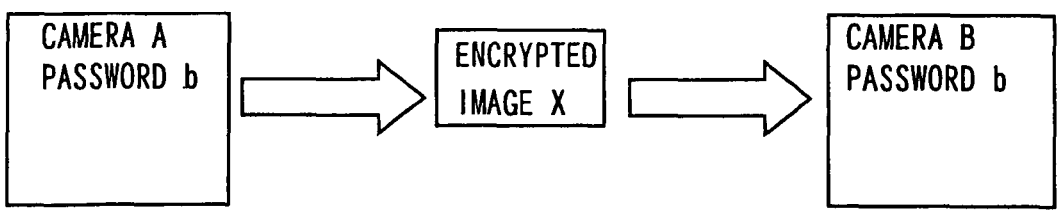
FIG. 84 illustrates yet another embodiment of the present invention.

Furthermore, as shown in FIG. 84, the camera A may obtain the password b from the camera B in advance before transmitting the image X to the camera B, and transmit the image X encrypted by using the password b to the camera B. The camera B may decode the encrypted image X with the password b to obtain the original image X. In this case, the risk of the image X being intercepted by a third party in the communication path between the camera A and the camera B can be avoided.

In the embodiment described above, the electronic camera 100 receives all the images transmitted from the outside. Instead, specific originator data may be pre-registered at the EEPROM 68 at the electronic camera 100, and when an image transmission request issued by an outside originator to the electronic camera 100 is received at the wireless communication circuit 71, the CPU 50 may compare the data indicating the originator having issued the image transmission request with the originator data registered the EEPROM 68 and accept the image transmitted from the originator at the wireless communication circuit 71 only if there is a match to store the received image into the memory card 104. If there is no match (the originator is not one of the specific pre-registered senders), on the other hand, the electronic camera 100 may simply display the originator data to alert the user that there has been an image transmission request received from an originator other than any of the registered originators. Since the user does not need to receive any images other than those transmitted from the registered originators in this manner, images transmitted from unknown originators are not allowed to strain the data storage capacity of the memory card 104. In addition, the total data volume of the images to be received (when the originator transmitting images in a batch) may be verified before receiving the images and the recipient may refuse to receive the images if the total data volume of the images to be received is larger than a predetermined volume. In this case, it is possible to reject only images with large data volumes that would strain the data storage capacity of the memory card 104.

In the embodiment described above, the electronic camera 100 receives all images transmitted from the outside. Instead, by setting a fixed upper limit to the total data storage capacity corresponding to the received image folders in the memory card 104, the CPU 50 may refuse to receive an image transmitted from an outside originator at the wireless communication circuit 71 if the total data storage capacity limit would be exceeded with the received image added into the memory card 104. Alternatively, when an image transmission request from the outside is received at the wireless-communication circuit 71, the CPU 50 may first verify the data volume of the image to be received and may secure a sufficient memory area for storing the new image file to be received by erasing the received images stored in the received image folders in chronological order of reception if it is decided that the total data storage capacity limit for the received image folders would be exceeded with the addition of the image to be received into the memory card 104. Since this makes it possible to set aside a memory area for purposes other than storing received images on the memory card 104 at all times, the storage area for photographed images, for instance, is assured even when a great number of images have been received from the outside. In addition, by setting restrictions on the images to be erased so as to allow only the received images that have already been transmitted or the received images that have already been reproduced to be erased, an erroneous erasure of received images that have not been backed up or have not been reproduced to be checked, can be prevented.

In the embodiment, environmental data (temperature, humidity, brightness, wind velocity) pertaining to the environment in which an image is photographed or sensory data (scent, taste, texture) pertaining to the photographic subject other than the visual and audio data may be attached as additional information data included in the image being transmitted. These data may be detected by sensors internally provided in the electronic camera 100, or may be transmitted from a detection apparatus other than the electronic camera 100 may be utilized in the electronic camera 100. For instance, a personal computer having received an image appended with such additional information data may transmit the additional information data to an external apparatus such as an air-conditioning system, a scent generating apparatus, a flavor generating apparatus or an illuminating apparatus when reproducing the received image, and the external apparatus, in turn, may control the temperature, the humidity, the wind velocity, the illumination brightness, the scent characteristics or the flavor characteristics in conformance to the additional information data. In addition, if the additional information data are odor data, an aromatic element may be selected from a plurality of types of aromatic elements prepared in advance or some of the aromatic elements may be mixed in conformance to the scent data and the image may be printed with printing ink into which the aromatic element or the aromatic mixture has been blended. By adopting these measures, the received image can be viewed by the recipient while sharing an experience similar to that experienced by the photographer during the photographing operation.

Figure 85:
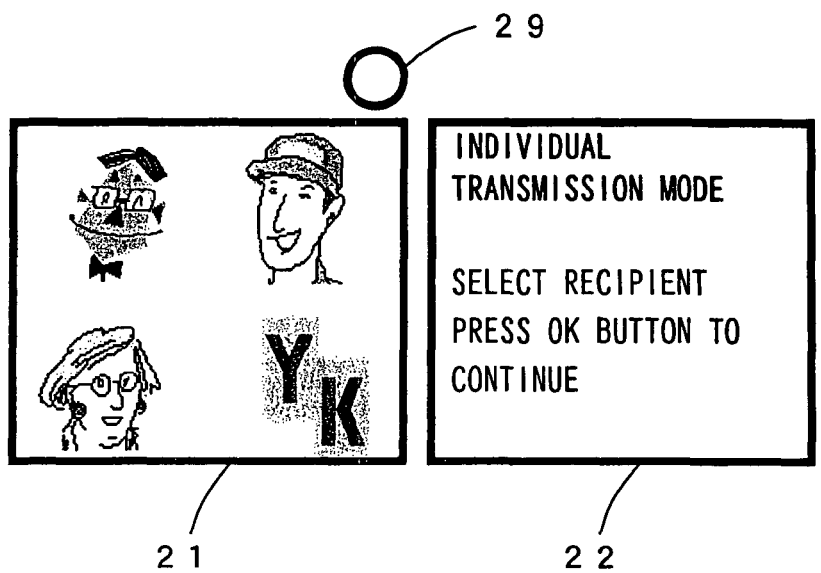
FIG. 85 presents an example of a screen display of recipients.

In the embodiment described above, the list of recipients is displayed at the right screen 22 as text data to allow the user to select a specific recipient in the transmission mode, as shown in FIG. 57. Instead, face images of recipients or icons enabling a visual identification of recipients may be displayed at the left screen 21 as shown in FIG. 85 so as to allow the user to select a desired recipient through the touch tablet 66 or the like. As the user can visually and intuitively select the recipient in this manner, a recipient selection can be made efficiently and quickly and, at the same time, an erroneous selection of the wrong recipient is prevented. The face images or the icons used for the recipient selection may be prepared on the sender side, or attached images included in previously received images may be utilized. In addition, the icon of the recipient may be superimposed over the display of the image to be transmitted. However, the icon of the recipient does not need to be superimposed over the main image and it may be displayed at a peripheral position of the screen in a size smaller than that of the main image while the main image is displayed at the same screen.

Figure 86:
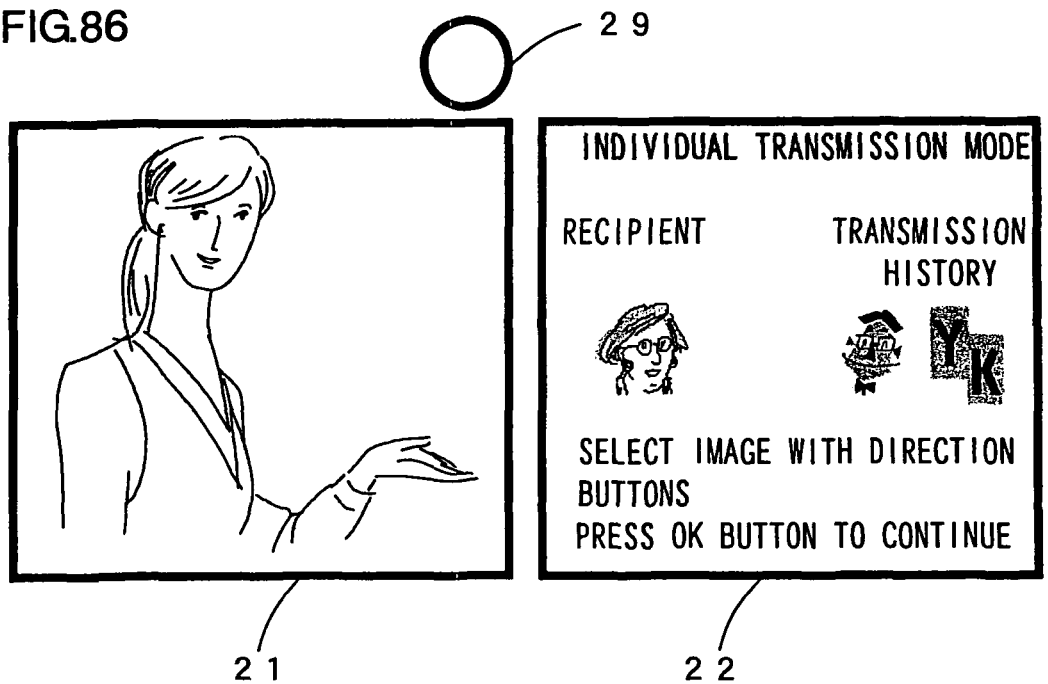
FIG. 86 presents an example of a screen display of a transmission history.

In the embodiment, the transmission history is displayed at the right screen 22 as text data in the individual transmission mode, as shown in FIG. 58. Instead, as shown in FIG. 86, face images or icons enabling recipient identification may be displayed at the right screen 22 to indicate the recipients included in the transmission history. Since this allows the sender to visually and intuitively verify the recipients included in the transmission history, a quick and efficient verification of the previous recipients can be achieved. The face images or the icons used for the recipient identification may be prepared on the sender side, or attached images included in previously received images may be utilized. For instance, an image transmitted from a communication partner may be processed to create a caricature image or a cartoon face image to be used as an icon image for identifying the partner as a recipient or an originator.

While an estimated transmission time length and an estimated transmission fee are displayed at the right screen 22 as numerical data in the transmission mode in the embodiment described above, icons or graphs that allow the sender to visually ascertain the length of transmission time and the amount of money to be charged as the transmission fee may be displayed, instead.

Figure 87:
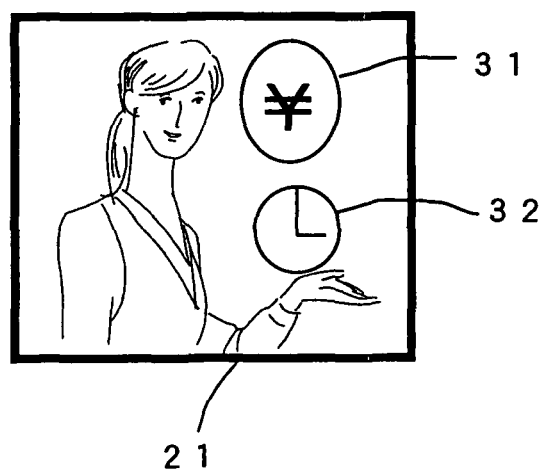
FIG. 87 presents an example of a screen display of the estimated transmission time and the estimated transmission fee.

For instance, an icon 32 (a clock icon) indicating the estimated time length for transmission and an icon 31 (a circle mark) indicating the estimated transmission fee may be superimposed over the image displayed at the left screen 21 in the individual transmission mode, as shown in FIG. 87. In this case, the size of the clock icon 32 is increased as the length of the estimated transmission time increases and the size of the circle mark icon 31 is also increased as the estimated transmission fee becomes higher. When superimposing the icon image indicating the estimated time length for transmission and the icon image indicating the estimated transmission fee, the size of the icon images should be set smaller than the size of the main image (it is desirable to set the size of the icon image equal to or smaller than approximately ¼ of the screen to ensure visibility of the main image) and the icon images should be set at the periphery of the screen (it is desirable to set them at one of the four corners of the substantially quadrangular screen to assure visibility of the main image).

In addition, the CPU 50 men execute an image analysis by using the image information on display, select an optimal position at which the icon images should be displayed (a position at which the icon images can be displayed unobtrusively without intruding on the main image) and bring up a superimposed display of the icon images at the selected position. For instance, by selecting an area of the image where the brightness changes relatively little (where the contrast changes relatively little, i.e., an area highly likely to be background such as the sky), it can be ensured that the visibility of the main image is not compromised by the superimposed display of the icon images, and, at the same time, good visibility can be assured for the icon images. Furthermore, in order to ensure that the icon images in the superimposed display can be distinguished with ease, the icon images may be displayed in black if the selected area achieves a relatively high brightness level and the icon images may be displayed in white if the selected area achieves a relatively low brightness level. Alternatively, the hue of the selected area may be detected and the icon images may be presented in a superimposed display in a hue which stands out against the detected hue. In addition, the icon images may be made clearly distinguishable from the main image by displaying the icon images in black and white if the main image is a color image or by enclosing the icon image display with a frame. Moreover, an area corresponding to a person or a face (an area highly likely to correspond to the main photographic subject) may be extracted from the image information through image analysis and the icon images may be presented in a superimposed display over an area other than the area corresponding to the person or the face.

The superimposed display of the icon images may be cleared after a predetermined length of time (up to approximately 5 seconds) elapses following the start of the icon image display so as to ensure that the icon image display does not detract from the presentation of the main image. The icon images may be brought up on display over a predetermined time interval or in response to an operation of an operating key 65.

In addition, the icon images do not need to be superimposed over the main image, and they may simply be displayed at a peripheral area of the screen with their display size set smaller than the display size of the main image while the main image is displayed within the same screen.

In this manner, the length of transmission time and of the transmission fee can be intuitively ascertained even by an inexperienced user without requiring two screens. In addition, since the length of the transmission time and the transmission fee can be checked together with the main image, it is not necessary to execute a complicated and lengthy verification operation. Furthermore, since only a single LCD for image display is required, a compact and inexpensive electronic camera 100 can be provided. Moreover, the icon images can be superimposed over an area of the main image of less importance while achieving good visibility without greatly distracting the user from viewing the main image.

Figure 88:
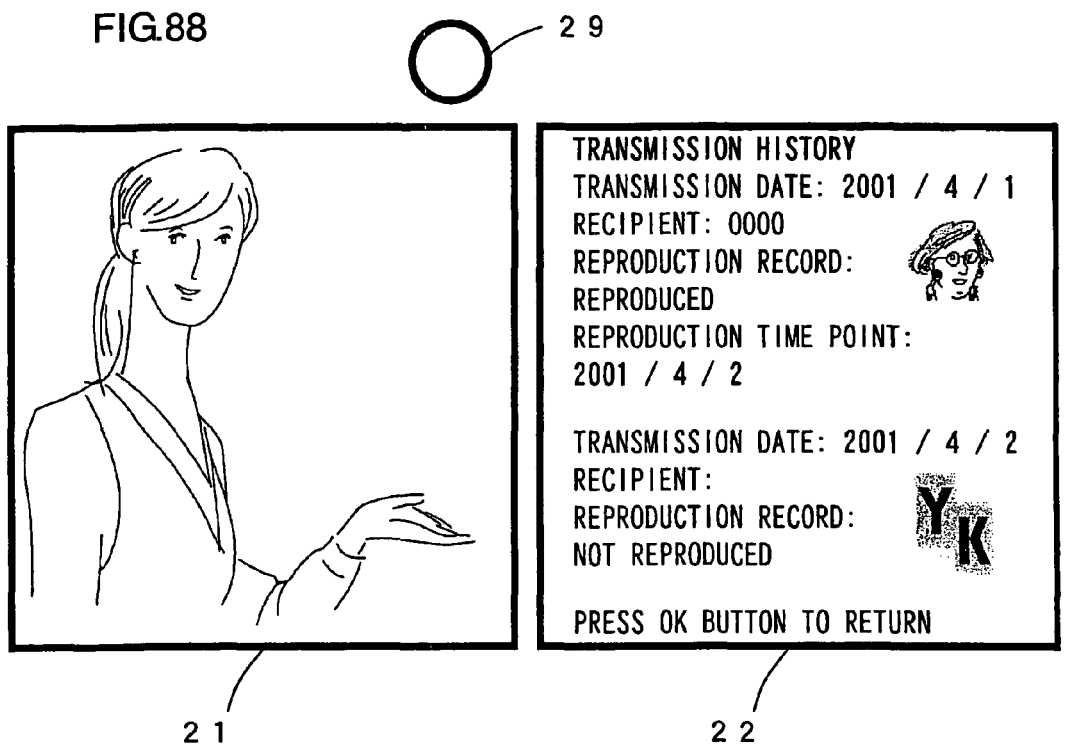
FIG. 88 presents an example of a screen display of a transmission history.

In the embodiment described above, the detailed information (such as the photographing data) pertaining to the image data currently displayed at the left screen 21 is displayed at the right screen 22, as shown in FIG. 21, through operations of the SWITCH button 25 and the direction buttons 23 and 24 in the reproduction mode, the individual erase mode and the individual transmission mode. Instead, the transmission history information pertaining to the image data currently displayed at the left screen 21 may be displayed at the right screen 22, as shown in FIG. 88, based upon the transmission history information shown in FIG. 10. Since this enables the user to verify each recipient and the corresponding transmission date/time of the image having been transmitted to the outside and also to verify whether or not the transmitted image has been reproduced at the individual recipients and the reproduction time points if the image has been reproduced, the user can take appropriate action efficiently with regard to the image based upon the results of the verification. For instance, if the transmitted image has not been reproduced at a recipient, a notification prompting a reproduction may be issued, the transmitted image may be set as erase disallowed to prevent an erroneous erasure of the unreproduced image at the recipient and the transmitted image may be automatically set as erase allowed upon receiving a notification from the recipient that it has been reproduced, or the transmitted image may be automatically erased to achieve efficient utilization of the memory.

Figure 89:
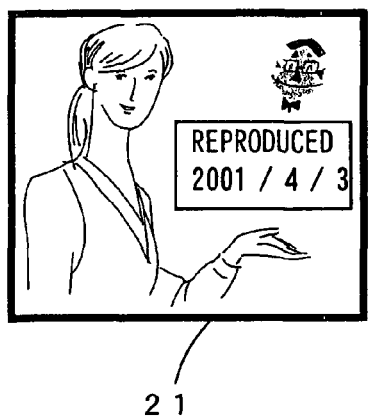
FIG. 89 presents an example of a screen display of a transmission history.

In addition, if the image information currently on display is image information of which has already been transmitted in the reproduction mode, the individual erase mode or the individual transmission mode, an icon image indicating the recipient, the reproduction record indicating whether or not the image has been reproduced at the recipient and the reproduction time point may be superimposed over the display of the selected image, as shown in FIG. 89, without requiring any operation of the image SWITCH button 25 or the direction buttons 23 and 24. When superimposing the icon image indicating the recipient and the reproduction record/reproduction time point at the recipient in text, the size of the superimposed display should be set smaller than the size of the main image (it is desirable to set it equal to or smaller than approximately ¼ of the screen to ensure visibility of the main image) and the icon image indicating the recipient and the text display of the reproduction record/reproduction time point at the recipient should be set at the periphery of the screen (it is desirable to set them at one of the four corners of the substantially quadrangular screen to assure visibility of the main image).

In addition, the CPU 50 may execute an image analysis by using the image information on display, select an optimal position at which the icon image indicating the recipient and the record/reproduction time point in text should be displayed (a position at which the icon image indicating the recipient and the text display of the reproduction record/reproduction time point can be presented unobtrusively without intruding on the main image) and bring up a superimposed display of the icon image indicating the recipient and the reproduction record/reproduction time point at the recipient in text at the selected position. For instance, by selecting an area of the image information where the brightness changes relatively little (where the contrast changes relatively little, i.e., an area highly likely to be background such as the sky), it can be ensured that the visibility of the main image is not compromised by the superimposed display of the icon image indicating the recipient and the reproduction record/reproduction time point at the recipient in text and, at the same time, good visibility can be assured for the icon image indicating the recipient and the text display of the reproduction record and the reproduction time point. Furthermore, in order to ensure that the icon image indicating the recipient and the reproduction record/reproduction time point at the recipient in text in the superimposed display can be distinguished with ease, the recipient icon image and the reproduction record/reproduction time point in text may be displayed in black if the selected area achieves a relatively high brightness level and the recipient icon image and the reproduction record/reproduction time point in text may be displayed in white if the selected area achieves a relatively low brightness level. Alternatively, the hue of the selected area may be detected and the recipient icon image and the text display of the reproduction record/reproduction time point at the recipient may be superimposed in a hue which stands out against the detected hue.

In addition, the icon image indicating the recipient and the text display of the reproduction record/reproduction time point at the recipient may be made clearly distinguishable from the main image by displaying the recipient icon image and the reproduction record/reproduction time point in text in black and white if the main image is a color image or by enclosing the superimposed display with a frame. Moreover, an area corresponding to a person or a face (an area highly likely to correspond to the main photographic subject) may be extracted from the image information through image analysis and the icon image indicating the recipient and the text display of the reproduction history/reproduction time point at the recipient may be superimposed over an area other than the area corresponding to the person or the face.

The superimposed display of the recipient icon image and the reproduction record/reproduction time point in text may be cleared after a predetermined length of time (up to approximately 5 seconds) elapses following the start of the superimposed display so as to ensure that the recipient icon image and the reproduction record/reproduction time point in text do not detract from the presentation of the main image. The icon image indicating the recipient and the text display of the reproduction record/reproduction time point at the recipient may be brought up on display over a predetermined time interval or in response to an operation of an operating key 65. Furthermore, when a transmitted image which has already been reproduced at a recipient is reproduced at the user, the icon image of the recipient and the text display of the reproduction history/reproduction time point at the recipient may be superimposed over the main image only when the main image is reproduced for the first time after the reproduction notification is delivered from the recipient so as not to distract the user viewing the main image.

In addition, the icon image indicating the recipient and the text display of the reproduction history/reproduction time point at the recipient do not need to be superimposed over the main image either, and may instead be displayed at a peripheral position of the screen with their display size set smaller than the display size of the main image while the main image is displayed within the same screen.

Through these measures, it becomes possible to check the reproduction record at the image recipient without having to perform a complicated operation and also, once the verification is completed, the image information can be viewed without any intrusive superimposed display. In addition, since the reproduction record and the reproduction time point of the main image at the recipient can be intuitively ascertained while the main image is on display, it is not necessary to execute any lengthy verification operation and, also, since only a single LCD is required for image display, a compact and inexpensive electronic camera 100 can be provided. Moreover, the icon image of the recipient and the text display of the reproduction record/reproduction time point at the recipient can be superimposed with good visibility over an area of less importance in the main image without greatly distracting the user viewing the main image.

While an image file is transmitted to a recipient in its original state in the embodiment, the image file may be transmitted after modifying the image recording characteristics such as the file format (JPEG, TIFF, bit pattern or the like) and the compression rate in conformance to the characteristics or the specifications of the digital image apparatuses used at the recipient. In addition, data indicating the file format and the compression rate selected for the image transmission may be written into the transmission history, and the data indicating the file format and the compression rate may be displayed in addition to the transmission history shown in FIG. 58 when the same image is transmitted again so as to allow the user to quickly set the file format and the compression rate for the image to be transmitted by referencing the data.

While audio information is attached to the image file being transmitted in the embodiment described above, the audio information may be analyzed and converted to text data and the text data may be transmitted as an attachment to the image file instead. Since the volume of such text data is smaller than the data volume of the original audio information, the length of transmission time can be reduced and the transmission fee can be lowered.

While the reception information data are not included in the image file being transmitted in the embodiment, the reception information data may also be included in the image file transmitted to the recipient where new reception information data can be created based upon the reception information data thus received. Since this makes it possible to verify the image information transmission path and the image information source by tracking the reception information data, an investigation into an unauthorized image circulation or the like is facilitated.

In the embodiment, an estimated transmission time length and an estimated transmission fee are displayed, as shown in FIG. 58, to assist the user in making a decision as to whether or not to execute an image transmission in the transmission mode. Instead, various transmission time lengths and transmission fees may be estimated in correspondence to a plurality of transmission conditions differently affecting the transmission time length and the transmission fee to allow the user to select the optical transmission condition from the plurality of transmission conditions based upon the estimated transmission time lengths and transmission fees.

Figure 90:
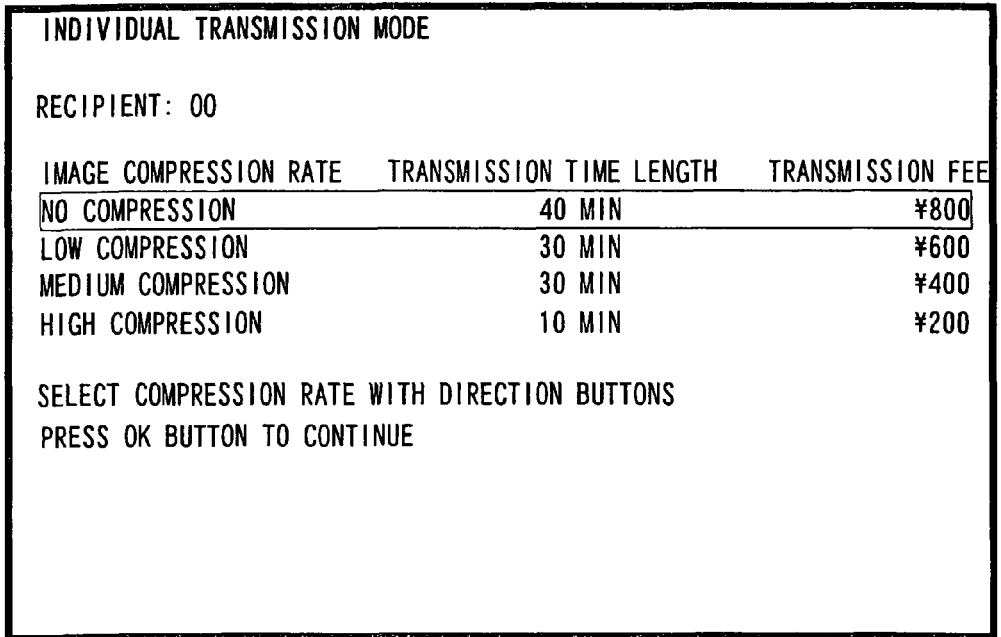
FIG. 90 presents an example of a screen display that may be brought up to enable a compression rate selection in the transmission mode.

For instance, if the compression rate for the image data to be transmitted can be varied, the transmission time lengths and the transmission fees corresponding to the individual compression rates may be brought up on display at the screen 22, as shown in FIG. 90 to allow the user to select the desired compression rate. In this case, the CPU 50 calculates the data volumes corresponding to the individual compression rates based upon the data volume of the image to be transmitted and calculates the estimated transmission time lengths and the estimated transmission fees at the individual compression rates based upon the calculated data volumes, the data transmission speed of the communication line and the service fee charged per unit time for the use of the communication line. As a result, the user can transmit the image at the optimal compression rate selected by taking into consideration how the image is to be utilized at the recipient, the various time lengths for transmission and transmission fees to save on the transmission time and the transmission fee.

Figure 91:
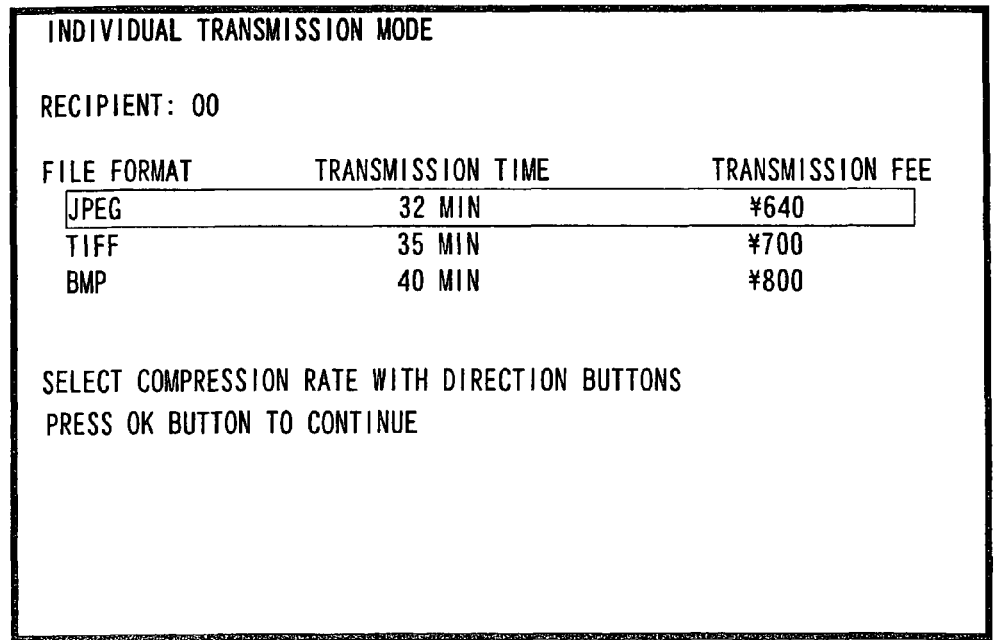
FIG. 91 presents an example of a screen display that may be brought up to enable a file format selection in the transmission mode.

In addition, if the file format or the recording format of the image data to be transmitted (e.g., JPEG, TIFF, GIF, BMP: bit pattern or the like) can be varied for individual transmission operations, the transmission time lengths and the transmission fees corresponding to the individual formats may be displayed at the screen 22, as shown in FIG. 91, to allow the user to select the desired format. In this case, the CPU 50 calculates the data volumes of the image data converted to the various formats based upon the data volume of the image to be transmitted and calculates the estimated time lengths for transmission and the estimated transmission fees in the various formats based upon the calculated data volumes, the data transmission speed of the communication line and the service fee charged per unit time for the use of the communication line. As a result, the user can transmit the images in the optimal file format selected by taking into consideration how the image is to be utilized at the recipient (the specific format), the various time lengths for transmission and transmission fees to save on the transmission time and the transmission fee.

Since the data volume is also affected by the size of the display screen at the image recipient (the resolution changes depending upon the screen size), the resolution, the chromaticity (color or monochrome) the characteristics (dynamic or still), various estimates on the transmission time length and the transmission fee may be displayed in correspondence to the size of the display screen at the image recipient (the resolution changes depending upon the screen size), the resolution level, the chromaticity (color or monochrome) and the characteristics (dynamic or still) to enable the user to select the most desirable set of estimated transmission time length and estimated transmission fee.

By displaying various estimated transmission time lengths and estimated transmission fees in correspondence to different image information data formats such as compression rates, recording formats (coding formats), display screen sizes, resolution levels and attributes such as color/black-and-white and dynamic/still, the user is allowed to transmit the image information in the optimal image information data format that achieves the best balance between the quality of the image to be transmitted and the transmission time length or the transmission fee.

In addition, if there are a plurality of communication lines to choose from for the image transmission, various transmission time lengths and transmission fees may be displayed in correspondence to the individual communication lines at the screen 22, as shown and FIG. 92, to allow the user to select the most desirable communication line. In this case, the CPU 50 calculates the estimated time length for transmission and the estimated transmission fee for the image information transmission through each of the communication lines based upon the data volume of the image to be transmitted, the data speed of the line and the service fee charged per unit time for the use of the line. As a result, the user is allowed to transmit the image through the optimal communication line selected by taking into consideration the various available transmission lines and corresponding transmission time lengths or transmission fees to save on the transmission time and the transmission fee.

Furthermore, if there are a plurality of recipients to choose from when transmitting an image, the various time lengths for transmission and transmission fees may be displayed in correspondence to the individual recipients to allow the user to select the most desirable recipient. In this case, the CPU 50 calculates the estimated time lengths for transmission and the estimated transmission fees for transmitting the image information to the individual recipients based upon the data volume of the image to be transmitted, the data transmission speeds corresponding to the various recipients and the service fees per unit time charged for using the communication lines to get through to the individual recipients. As a result, even when transmitting an image from a new location, the user is able to transmit the images to the optimal recipient selected by taking into consideration the various potential recipients and the corresponding transmission time lengths or transmission fees to save on the transmission time and the transmission fee.

Moreover, if the image does not need to be transmitted immediately, various transmission time lengths and transmission fees may be displayed in correspondence to different transmission time blocks at the screen 22, as shown in FIG. 93, to allow the user to select the most desirable communication time block. In this case, the CPU 50 calculates the various estimated transmission time lengths and estimated transmission fees for transmitting the image information during the individual time blocks based upon the data volume of the image to be transmitted, the data transmission speeds of the line during the different time blocks and the service fees charged per unit time for using the line during the time blocks. In addition, the CPU 50 stores in memory the selected time block, engages a means for time count such as the timer 74 to count the time and automatically executes the transmission of the specified image information to the outside by detecting that the current time point has entered a selected time block.

It is to be noted that the information such as the data transmission speed of the line and the service fee charged per unit time for using the line during the individual time block may be downloaded through the wireless communication circuit 71 from the communication line administration department or information may be made available by monitoring the values registered for the past image transmissions and recording the monitored values. Consequently, the user is able to transmit the image during the optimal time block selected by taking into consideration the various possible communication time blocks (different time lags between the current time point and the possible communication execution time points) and the corresponding transmission time lengths or transmission fees to save on the transmission time and the transmission fee.

Also, if the images does not need to be transmitted immediately, various transmission time lengths and transmission fees may be displayed at the screen 22 in correspondence to the individual communication modes (a transmission fee priority mode and a transmission time priority mode), as shown in FIG. 94, to allow the user to select the communication modes that better suit his needs. In the transmission fee priority mode, the transmission conditions that will achieve the lowest transmission fee (image compression rate/resolution/format/color/communication line/recipient/time block and the like) are automatically selected in the electronic camera 100 and the image transmission is executed under the selected transmission conditions. In the transmission time priority mode, on the other hand, the transmission conditions that will achieve the shortest transmission time (the image compression rate/resolution/format/color/the communication line/the recipient/the time zone, etc.) are automatically selected in the electronic camera 100 and the image transmission is executed under the selected transmission conditions. As a result, the user can transmit images by selecting the optimal communication mode best suited for the specific purpose of the image transmission while saving on the transmission fee or the transmission time.

Furthermore, instead of selecting the transmission-time priority mode or the transmission-fee priority mode for each image transmission, a single priority mode may be sustained once it is set until a reset operation is performed, and images may be transmitted by automatically selecting the transmission conditions in conformance to the estimated time length for transmission or the estimated transmission fee. This eliminates the need to select the transmission conditions for each image transmission and, at the same time, it makes it possible to transmit images under optimal transmission conditions at all times.

In addition, when transmitting an image to the outside automatically over a predetermined time interval or at a predetermined time point, estimates on the transmission time length or the transmission fee may be obtained based upon the data volume of the image to be transmitted at the specific transmission time point and various transmission condition settings, the optimal transmission conditions may be automatically selected based upon the estimated time lengths for transmission or the estimated transmission fee and the image transmission may be executed automatically under the selected transmission conditions. In this case, the estimated time length for transmission or the estimated transmission fee corresponding to the optimal transmission conditions exceeds a predetermined reference transmission time length or a predetermined reference transmission fee, the estimated time length for transmission or the estimated transmission fee may be indicated to the user to prompt the user to make a decision as to whether or not to execute the image transmission. As a result, the image can be transmitted automatically under the optimal conditions without requiring the user of the electronic camera 100 to perform a complicated operation and since the user can decide whether or not to execute the transmission if the estimated transmission time or the estimated transmission fee exceeds the reference value, the transmission time is not allowed to be excessively long or the transmission fee is not allowed to become too high.

When transmitting an image by automatically selecting the optimal transmission conditions, as described above, the user may be allowed to specify the minimum requirements in advance for some of the transmission conditions. For instance, since an image which is too coarse cannot be successfully utilized at the recipient, the user may specify minimum values for the image resolution and the image compression rate, the user may specify "color" for the image to be transmitted, or he may specify that the image is to be transmitted within a specific number of hours from the current time. These measures enable the user to transmit images under desirable transmission conditions at all times while saving on the transmission time or the transmission fee.

Alternatively, varying estimates of the time length for transmission and the transmission time fee may be calculated in correspondence to different combinations of transmission conditions to allow the user to select a single combination of transmission conditions. For instance, the estimated time lengths for transmission and the estimated transmission time fee may be calculated for a transmission condition matrix constituted of a plurality of communication lines and a plurality of time blocks.

In addition, if the transmission speed or the transmission fee charged per unit time mentioned earlier changes depending upon the image recipient, the distance between the image recipient and the image sender or the positional relationship between the image recipient and the image sender, the CPU 50 should calculate the estimated transmission time length or the estimated transmission fee for transmitting the image to the specific image recipient based upon data transmission speed of the transmission line or the transmission fee charged per unit time for the use of the communication line corresponding to the distance or the positional relationship between the image recipient and the image sender.

Alternatively, the user of the electronic camera 100 may specify a desirable transmission time length or transmission fee and the CPU 50 may estimate various time lengths for transmission or various transmission fees in correspondence to different-transmission-condition settings, select the transmission-condition setting at which the best image quality will be achieved among the transmission-condition settings with estimated time lengths for transmission or transmission fees falling within the specified transmission time or transmission fee range, and transmit the image to the outside at the selected-transmission-condition setting. For instance, if the user specifies a desirable transmission fee, various transmission fees are estimated in correspondence to different resolution levels or different compression rates, the estimated transmission fee, which is the highest among the estimated transmission fees which are equal to or below the specified transmission fee, is selected and the image is transmitted at the resolution level or the compression rate corresponding to the selected estimated transmission fee to ensure that the image is transmitted at the best possible quality at a transmission fee that is still under the specified transmission fee level. As a result, the user is spared the task of selecting a specific transmission condition setting and, at the same time, a high-quality image can be transmitted.

Furthermore, if the electronic camera 100 includes only a single display screen, the image to be transmitted may be superimposed over the display of the estimated transmission time lengths and the estimated transmission fees corresponding to the various transmission condition settings.

For instance, in the individual transmission mode, estimated time lengths for transmission and estimated transmission fees corresponding to the varying image compression rates may be displayed, as shown in FIG. 95, and the image to be transmitted may be displayed in a peripheral area in the screen 22 (it is desirable to set the image at one of the four corners of the substantially quadrangular screen in order to assure good visibility for the display of the time length for transmission and the estimated transmission fee) in a size smaller than the size of the screen 22 (it is desirable to set the size equal to or smaller than approximately ¼ of the screen in order to assure the visibility of the display of the estimated time lengths for transmission and the estimated transmission fees).

In addition, the image to be transmitted does not necessarily need to be superimposed over the display of the estimated transmission time lengths and the estimated transmission fees, and it only needs to be displayed concurrently while the estimated time lengths for transmission and estimated transmission fees are displayed in a size smaller than the display size of the estimated time lengths for transmission and the estimated transmission fees at a peripheral position of the same screen.

Since this allows the user to check the image to be transmitted together with the estimated time lengths for transmission and the estimated transmission fees at a single screen, an inexpensive and compact electronic camera 100 can be provided.

In the embodiment described above, an image transmission is uniformly executed in response to a transmission command in the transmission mode. However, the CPU 50 may check the state of the power source 63 via the power control circuit 64, compare the length of the estimated transmission time with the current power supply capability of the power source 63 and flash an LED or bring up a warning display on the screen if it is decided that there is a possibility of the power source 63 becoming depleted during the transmission. In this case, an accident such as an interruption of an image transmission in progress due to battery depletion in a portable digital image apparatus using batteries or the like as a power source can be prevented.

In the embodiment, the electronic camera 100 cannot receive any images transmitted from the outside if the power switch 17 is off. However, the electronic camera 100 may supply power to the CPU 50 and the wireless communication circuit 71 by controlling the power control circuit 64 while the power switch 17 is in an off state instead. In such a case, upon receiving an image transmission request from the outside, the wireless communication circuit 71 applies a reception interrupt to the CPU 50 to wake it up and the CPU 50, in turn, ensures that power is supplied to the circuits (such as the memory card 104) which need to be engaged when receiving an image by controlling the power control circuit 64 and stores the image received from the outside via the wireless communication circuit 71 into the memory card 104. After the received image is stored, the CPU 50 stops the power supply to the memory card 104 and the like by controlling the power control circuit 64 and enters a sleep mode to save power. As a result, it becomes possible to utilize the power source such as batteries economically and, at the same time, images can be automatically received from the outside even when the power source is in an off state.

While all images, photographed images and received images are reproduced in the various reproduction modes, reproduction object images may be classified into even more specific types. For instance, reproduction modes in which unreproduced images, unreproduced received images, transmitted images, transmitted photographed images, transmitted received images, untransmitted images, untransmitted photographed images, untransmitted received images, erase-allowed images, erase-disallowed images transmission-allowed images, transmission-disallowed images, transfer allowed images, transfer disallowed images, print-allowed images, print-disallowed images and the like are specifically reproduced may be created. It is to be noted that an image can be judged as to whether it has never been reproduced/has already been reproduced, has never been transmitted/has already been transmitted, is set as erase allowed/disallowed, is set as transmission allowed/disallowed, is set as transfer allowed/disallowed, is set as print allowed/disallowed and the like based upon the relevant settings indicated in the additional information data appended to the image data. In this case, the user only needs to select a desired reproduction mode to reproduce a specific type of image with a high degree of efficiency without having to conduct a complicated image search.

In the embodiment described above, there are seven erase modes, i.e., the individual erase mode (in which images are individually selected from all the image files and the selected image files are erased), the batch erase mode: all images (in which all the image files are erased in a batch), the batch erase mode: photographed images (in which the photographed image files are erased in a batch), the batch erase mode: received images (in which the received image files from a specific originator are erased), the batch erase mode: transmitted images (in which all the image files that have already been transmitted are erased in a batch), the batch erase mode: transmitted photographed images (in which the photographed image files that have already been transmitted to a specific recipient are erased in a batch) and the batch erase mode: transmitted received images (in which the received image files that have already been transmitted to a specific recipient are erased in a batch). However, images to be a erased may be classified into even more specific types. For instance, erase modes in which unreproduced images, unreproduced received images, reproduced images, reproduced received images, untransmitted images, untransmitted photographed images, untransmitted received images, transmission-allowed images, transmission-disallowed images, transfer allowed images, transfer disallowed images, print-allowed images, print-disallowed images and the like are specifically erased may be created. It is to be noted that an image can be judged as to whether it has never been reproduced/has already been reproduced, has never been transmitted/has already been transmitted, is set as erase allowed/disallowed, is set as transmission allowed/disallowed, is set as transfer allowed/disallowed, is set as print allowed/disallowed and the like based upon the relevant settings indicated in the additional information data appended to the image data. In this case, the user only needs to select a desired erase mode to erase a specific type of images with a high degree of efficiency without having to conduct a complicated image search.

In the embodiment described above, there are seven transmission modes, i.e., the individual transmission mode (in which images are individually selected from all the image files and the selected image files are transmitted), the batch transmission mode for all images (in which all the image files are transmitted in a batch), the batch transmission mode: photographed images (in which the photographed image files are transmitted in a batch), the batch transmission mode for received images (in which the received image files are transmitted to a specific recipient in a batch), the batch transmission mode for untransmitted images (in which all the image files that have not yet been transmitted are transmitted in a batch), the batch transmission mode for untransmitted photographed images (the photographed image files that have not yet been transmitted are transmitted in a batch), and the batch transmission mode for untransmitted received images (in which the received image files that have not yet been transmitted are transmitted in a batch). However, images to be transmitted may be classified into even more specific types. For instance, reproduction modes in which unreproduced images, reproduced images, unreproduced received images, reproduced received images, erase-allowed images, erase disallowed images, print-allowed images, print-disallowed images and the like are specifically reproduced may be created. It is to be noted that an image can the judged as to whether it has never been reproduced/has already been reproduced, has never been transmitted/has already been transmitted, is set as erase allowed/disallowed, is set as transmission allowed/disallowed, is set as transfer allowed/disallowed, is set as print allowed/disallowed and the like based upon the relevant settings indicated in the additional information data appended to the image data. In this case, the user only needs to select a desired erase mode to erase a specific desired images with a high degree of efficiency without having to conduct a complicated image search.

In the embodiment described above, the image sender attaches transfer disallow information to an image being transmitted or issues the image identification information and the transfer disallow information after the image is transmitted to disallow a transfer of the specific image to the outside from the image recipient. In this situation, the image sender may also transmit address information attached to the transfer disallow information to the image recipient either during the image transmission or after the image transmission to disallow a transfer of the specific image to the address corresponding to the address information from the image recipient or to disallow a transfer of the specific image to addresses other than the address corresponding to the address information. In addition, the image sender may transmit time length information or date/time point information attached to the transfer disallow information to the image recipient either during the image transmission or after the image transmission to disallow a transfer of the specific image before or after the length of time indicated in the time length information elapses following the reception of the specific image or following the reception of the transfer disallow information at the image recipient, or to disallow a transfer of the specific image prior to or following the date/time point indicated in the date/time point information. Since even more sensitive control can be implemented on the transfer of transmitted images, better image security is assured by adopting these measures.

In addition, by attaching personal identification information to display disallow information instead of the transfer disallow information, a display of a specific image by the image recipient to the individual corresponding to the personal identification information may be disallowed or a display of the specific image by the image recipient to parties other than the individual corresponding to the personal identification information may be disallowed.

Also, time length information or date/time point information may be attached to print disallow information, processing disallow information or display disallow information instead of the transfer disallow information to be transmitted to an image recipient. In such a case, it becomes possible to disallow printing, processing or display of a specific image by the image recipient before or after the length of time indicated in the time length information elapses following the reception of the specific image or following the reception of the print disallow information, the processing disallow information or the display disallow information at the image recipient can be disallowed, or printing, processing or displaying the specific image before or after the date/time point indicated in the date/time point information following the reception of the specific image or the reception of the disallow information can be disallowed. In addition, if the sender and the recipient have an advance agreement with regard to processing details, the time length information or the date/time point information alone may be transmitted to the image recipient. In this case, it becomes possible to disallow specific processing such as image printing, image processing, image display, image erasure or image transmission before or after the length of time indicated in the time length information elapses or before or after the date/time point indicated in the date/time point information following the reception of the specific image or following the reception of the time length information or the date/time point information at the image recipient.

In the embodiment described above, the image sender issues an erase command for a specific transmitted image to be erased to the image recipient after transmitting the image, and upon receiving the command, the image recipient erases the specific image. However, the image sender may transmit the erase command appended with time length information or date/time point information to the image recipient either during the image transmission or after the image transmission, and the image recipient, in turn, may erase the image when the length of time indicated in the time information elapses or at the date/time point indicated in the date/time point information following the reception of the specific image or the reception of the erase command at the image recipient, instead. Since even more sensitive control can be implemented on the transfer of transmitted images, better image security is assured by adopting these measures.

In the embodiment, the image sender issues a transmission disallow command, a transfer disallow command, and erase command, a print disallow command, a processing disallow command or a display limit command for a specific transmitted image received at the recipient after the image transmission. Instead, the image sender may issue a transmission disallow command, a transfer disallow command, an erase command, a print disallow command, a processing disallow command or a display the command for all the images having originated from a specific originator without specifying any images, either before or after the image transmission.

In the embodiment, after the image transmission, the image recipient receives a processing command (a transmission disallow command, a transfer disallow command, an erase command, a print disallow command, a processing disallow command or a display limit command) for the specific image issued by the image sender, and accepts the processing command if the sender of the processing command matches the sender of the specified image. However, such a processing command may be unconditionally accepted even when the processing command is issued by a party other than the image sender, or the processing command may be accepted if a predetermined condition is satisfied (e.g., if the command is issued by a party with the correct password). For instance, a given password may be attached to an image being transmitted and the same password may also be attached to a processing command so that the image recipient accepts the processing command if the password attached to the image matches the password attached to the processing command. Alternatively, the image recipient may unconditionally accept a processing command as long as the party who has issued the processing command is a sender pre-registered at the recipient. These measures enable a party other than the image sender (e.g., an administrator of an image database) to issue a processing command for an image having been transmitted by the image sender to the image recipient.

The attached image such as an icon image or a face image attached to an image being transmitted in the embodiment described above may include information such as the name, the employer and various addresses of the person in the icon image or the face image to make such information more readily available. For instance, e-mail address information indicating the e-mail address to which a response is to be sent upon receiving an image may be included in the icon image or the face image and this e-mail address information may be read by specifying the icon image or the face image superimposed over the received image on display through the touch tablet 66, so as to automatically set the address to which the reply mail is to be sent.

This provides significant convenience for an image recipient who wishes to use a received image for commercial purposes, since he can contact the photographer, the owner, the copyright holder or the like of the image immediately upon receiving the image.

Figure 96:
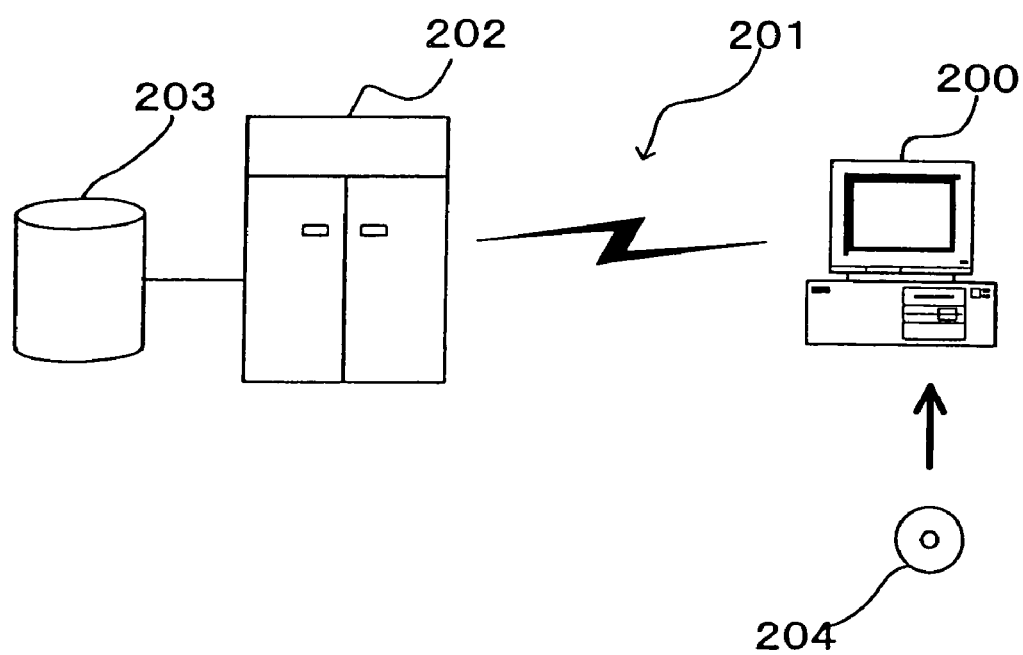
FIG. 96 illustrates how the program may be provided.

It is to be noted that if a program described in reference to the embodiment is to be executed on a personal computer or a portable apparatus, the program can be provided in a recording medium such as a CD-ROM or a PC card or as a data signal on the Internet or the like. FIG. 96 illustrates how this may be achieved. The program may be provided to a personal computer 200 via, for instance, a CD-ROM 204. The personal computer 200 has a function which allows it to be connected with a communication line 201. A computer 202 is a server computer that provides the program stored in a recording medium such as a hard disk 203. The communication line 201 is used for the Internet communication or personal computer communication, or it may be a dedicated communication line. The computer 202 reads out the program from the hard disk 203 and transmits the program to the personal computer 200 through the communication line 201. Namely, the program is embodied as a data signal on a carrier wave that is transmitted via the communication line 201. Thus, the program can be distributed as a computer-readable computer program product which may assume any of various modes including a recording medium and a carrier wave.

What is claimed is:

1. A digital image apparatus comprising:
   a storage unit in which digital image information is stored;
   a display unit that displays the digital image information stored in the storage unit;
   a setting unit that sets a recipient of the digital image information;
   a communication unit that transmits the digital image information stored in the storage unit to a recipient set through the setting unit; and an updating unit that updates transmission history information including recipient information indicating a recipient of the digital image information each time the digital image information is transmitted by the communication unit and stores the updated transmission history information into the storage unit in correspondence to the digital image information, wherein when the recipient of digital image information to be transmitted is set through the setting unit, the digital image information stored in the storage unit is displayed, the display unit also displays the recipient information included in transmission history information updated by the updating unit pertaining to the digital image information to be transmitted in correspondence to the digital image information;

wherein the transmission history information includes image reproduction information indicating a reproduction record at the recipient of the digital image information having been transmitted;

the communication unit receives the image reproduction information from the recipient of the digital image information which is external; and the updating unit updates the image reproduction information included in the transmission history information based upon the image reproduction information that has been received, when the digital image information stored in the storage unit is displayed, the display unit also displays the image reproduction information.

2. A digital image apparatus according to claim 1, wherein:
the display unit includes a substantially quadrangular display screen at which digital image information stored in the storage unit is displayed and the transmission history information is superimposed over the digital image information in a peripheral area of the display screen in a size smaller than the display screen.

3. A digital image apparatus according to claim 1, wherein:
the display unit ends display of the transmission history information without erasing display of the image information, when a predetermined length of time elapses following a start of the display of the transmission history information.

4. A digital image apparatus according to claim 1, wherein:
the storage unit stores recipient information that enables a visual identification of the recipient.

\* \* \* \* \*